US011356153B2

(12) United States Patent
Cao et al.

(10) Patent No.: US 11,356,153 B2
(45) Date of Patent: Jun. 7, 2022

(54) DEVICE AND METHOD IN RADIO COMMUNICATION SYSTEM, AND COMPUTER-READABLE STORAGE MEDIUM

(71) Applicant: Sony Corporation, Tokyo (JP)

(72) Inventors: Jianfei Cao, Beijing (CN); Tao Cui, Beijing (CN)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 16/754,748

(22) PCT Filed: Feb. 3, 2019

(86) PCT No.: PCT/CN2019/074664
§ 371 (c)(1),
(2) Date: Apr. 9, 2020

(87) PCT Pub. No.: WO2019/154386
PCT Pub. Date: Aug. 15, 2019

(65) Prior Publication Data
US 2021/0376888 A1    Dec. 2, 2021

(30) Foreign Application Priority Data

Feb. 11, 2018   (CN) .......................... 201810140997.9

(51) Int. Cl.
*H04B 7/0452*    (2017.01)
*H04L 1/00*       (2006.01)
(Continued)

(52) U.S. Cl.
CPC ......... *H04B 7/0452* (2013.01); *H04L 1/0038* (2013.01); *H04L 5/0048* (2013.01);
(Continued)

(58) Field of Classification Search
CPC ................................................... H04B 7/0452
(Continued)

(56) References Cited

U.S. PATENT DOCUMENTS

| 2014/0219196 A1* | 8/2014 | Patel | H04L 1/1812 370/329 |
| 2015/0319633 A1* | 11/2015 | Ji | H04W 24/08 370/252 |

(Continued)

FOREIGN PATENT DOCUMENTS

| CN | 102387598 A | 3/2012 |
| CN | 106488572 A | 3/2017 |
| CN | 107210898 A | 9/2017 |

OTHER PUBLICATIONS

International Search Report and Written Opinion dated Apr. 24, 2019 for PCT/CN2019/074664 filed on Feb. 3, 2019, 9 pages including English Translation of the International Search Report.

*Primary Examiner* — Lihong Yu
(74) *Attorney, Agent, or Firm* — Xsensus LLP

(57) ABSTRACT

Provided in the present disclosure are a device and method in a radio communication system, and a computer-readable storage medium. The device comprises a processing circuit configured to: decode a group common physical downlink control channel (group common PDCCH) of a user equipment group comprising a target user equipment so as to acquire control information related to multi-user multiple input multiple output (MU-MIMO) transmission of a control channel; and decode a user equipment-specific physical downlink control channel (UE-specific PDCCH) of the target user equipment on the basis of the control information so as to acquire specific transmission control information related to the target user equipment, where the UE-specific PDCCH of the target user equipment and UE-specific PDCCH of the other user equipment are stacked on a same (Continued)

transmission resource for transmission. MU-MIMO transmission with respect to a downlink control channel is effectively implemented, thus increasing resource utilization rate.

16 Claims, 36 Drawing Sheets

(51) Int. Cl.
　　*H04L 5/00*　　　(2006.01)
　　*H04W 72/04*　　(2009.01)
　　*H04W 72/12*　　(2009.01)
(52) U.S. Cl.
　　CPC ......... *H04L 5/0053* (2013.01); *H04W 72/042* (2013.01); *H04W 72/1289* (2013.01)
(58) Field of Classification Search
　　USPC ....................................................... 375/262
　　See application file for complete search history.

(56) References Cited

U.S. PATENT DOCUMENTS

2017/0273056 A1　　9/2017　Papasakellariou
2018/0041320 A1*　2/2018　Jin .................. H04L 5/0026

\* cited by examiner

DEVICE AND METHOD IN RADIO COMMUNICATION SYSTEM, AND COMPUTER-READABLE STORAGE MEDIUM

CROSS-REFERENCE TO RELATED APPLICATIONS

The present application is based on PCT filing PCT/CN2019/074664, filed Feb. 3, 2019, and claims priority to Chinese Patent Application No. 201810140997.9, filed Feb. 11, 2018 with the Chinese Patent Office, each of which is incorporated herein by reference in its entirety.

FIELD

The present disclosure relates to the field of wireless communications, in particular to a device and method in a wireless communication system for optimizing Multi-User Multiple Input Multiple Output (MU-MIMO) transmission, and a non-volatile computer readable storage medium.

BACKGROUND

As a next generation of radio access manner of Long Term Evolution (LTE), New Radio (NR) is radio access technology (RAT) different from LTE. NR is an access technology capable of dealing with various use cases such as Enhanced mobile broadband (eMBB). Massive machine type communication (mMTC) and Ultra reliable and low latency communications (URLLC). NR is studied by taking technical construction corresponding to utilization scenarios, request conditions and configuration scenarios in these use cases as a target. Detailed content of the scenarios and request conditions for NR is disclosed in non-patent document 1.

In an aspect, in the existing LTE (or referred to as 4G)/NR (or referred to as 5G) wireless communication system, "transparent" MU-MIMO transmission for a downlink data channel (that is, physical downlink shared channel PDSCH) has been supported. The so-called "transparent" MU-MIMO transmission refers to that target user equipment (UE) does not know existence of other user equipment which is scheduled simultaneously with the target user equipment to perform MU-MIMO transmission. That is, the target UE does not know accurate interference on a layer where a target data flow is located from a layer where a data flow of other user equipment is located, and thus a receiver of the target UE only tries to decode a target data flow and cannot efficiently process interference between layers.

In the "transparent" MU-MIMO transmission, the user equipment does not know interference conditions between multiple user equipment, thus interference measurement among multiple user equipment cannot be achieved and interference among multiple user equipment cannot be suppressed or removed, resulting in reducing of throughput and reliability of the system to a certain degree.

In another aspect, in the existing 4G/5G communication system, MU-MIMO transmission for a downlink control channel (physical downlink control channel, PDCCH) is not put forward. In the conventional technology, only UE-specific physical downlink control channel (UE-specific PDCCH) for certain user equipment is transmitted for a certain transmission resource, and the transmission resource cannot be shared between control channels of different user equipment by using a spatial domain processing capability of multiple antennas. That is, in the conventional technology, UE-specific PDCCHs of different user equipment cannot be superposed on the same transmission resource for transmission, resulting in reducing of utilization of the time-frequency resource.

CONVENTIONAL TECHNOLOGY DOCUMENT

Non-Patent Document

Non-patent document 1: 3rd Generation Partnership Project; Technical Specification Group Radio Access Network; Study on Scenarios and Requirements for Next Generation Access Technologies; (Release 14), 3GPP TR 38.913 V0.2.0 (2016-02).

SUMMARY

A brief summary of embodiments of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts in a simplified form, as preamble of a detailed description later.

In view of the above problems, an object of at least one aspect of the present disclosure is to provide a device and a method in a wireless communication system and a non-volatile computer readable storage medium, which can efficiently achieve MU-MIMO transmission for a downlink control channel.

An object of another aspect of the present disclosure is to provide a device and a method for a wireless communication system, and a non-volatile computer readable storage medium, so that target user equipment can indirectly acquire interferences from other user equipment which is scheduled simultaneously with the target user equipment to perform MU-MIMO transmission for a downlink data channel, thereby improving throughput and reliability of the system.

According to an aspect of the present disclosure, a device in a wireless communication system, the device comprising processing circuitry configured to: decode a group common physical downlink control channel (group common PDCCH) for a group of user equipment including target user equipment to obtain control information related to Multi-User Multiple Input Multiple Output (MU-MIMO) transmission of control channel; and decode, based on the control information, user specific physical downlink control channel (UE-specific PDCCH) of the target user equipment to obtain specific transmission control information for the target user equipment, where the UE-specific PDCCH of the target user equipment and UE-specific PDCCH of other user equipment in the group of user equipment are superposed on same transmission resource to be transmitted.

According to another aspect of the present disclosure, a device in a wireless communication system is further provided. The device includes processing circuitry. The processing circuitry is configured to: generate a group common physical downlink control channel (group common PDCCH) for a group of user equipment and user specific physical downlink control channel (UE-specific PDCCH) of each of the group of user equipment, the group common physical downlink control channel including control information related to Multi-User Multiple Input Multiple Output (MU-MIMO) transmission of control channel of all user equipment in the group of user equipment; control a base station to transmit the group common physical downlink control channel to the group of user equipment; and control, based on the control information, the base station to transmit the UE-specific PDCCH of each of the group of user equipment on same transmission resource.

According to another aspect of the present disclosure, a method in a wireless communication system is further provided. The method includes: decoding a group common physical downlink control channel (group common PDCCH) for a group of user equipment including target user equipment to obtain control information related to Multi-User Multiple Input Multiple Output (MU-MIMO) transmission of control channel; and decoding, based on the control information, user specific physical downlink control channel (UE-specific PDCCH) of the target user equipment to obtain specific transmission control information for the target user equipment, where the UE-specific PDCCH of the target user equipment and UE-specific PDCCH of other user equipment in the group of user equipment are superposed on same transmission resource to be transmitted.

According to another aspect of the present disclosure, a method in a wireless communication system is further provided. The method includes: generating a group common physical downlink control channel (group common PDCCH) for a group of user equipment and user specific physical downlink control channel (UE-specific PDCCH) of each of the group of user equipment, the group common physical downlink control channel including control information related to Multi-User Multiple Input Multiple Output (MU-MIMO) transmission of control channel of all user equipment in the group of user equipment; controlling a base station to transmit the group common physical downlink control channel to the group of user equipment; and controlling, based on the control information, the base station to transmit the UE-specific PDCCH of each of the group of user equipment on same transmission resource.

According to another aspect of the present disclosure, a device in a wireless communication system is provided. The device includes processing circuitry. The processing circuitry is configured to: determine, according to control information, which is related to Multi-User Multiple Input Multiple Output (MU-MIMO) transmission performed by user equipment and other user equipment scheduled simultaneously, from a base station, transmission related configuration of the other user equipment, where the control information includes information indirectly indicating the transmission related configuration of the other user equipment; and decode, based on the determined transmission related configuration of the other user equipment, signals transmitted with the MU-MIMO transmission and received from the base station to obtain a signal portion for the user equipment.

According to another aspect of the present disclosure, a device in a wireless communication system is provided. The device includes processing circuitry. The processing circuitry is configured to: for each of one or more user equipment in a group of user equipment which are simultaneously scheduled to perform Multi-User Multiple Input Multiple Output (MU-MIMO) transmission, generate control information related to the MU-MIMO transmission and control a base station to transmit the control information to this user equipment, where the control information includes information indirectly indicating transmission related configuration of other user equipment than this user equipment in the group of user equipment; and control the base station to simultaneously transmit signals to the group of user equipment on specific transmission resource.

According to another aspect of the present disclosure, a method in a wireless communication system is further provided. The method includes: determining, according to control information, which is related to Multi-User Multiple Input Multiple Output (MU-MIMO) transmission performed by user equipment and other user equipment scheduled simultaneously, from a base station, transmission related configuration of the other user equipment, where the control information includes information indirectly indicating the transmission related configuration of the other user equipment; and decoding, based on the determined transmission related configuration of the other user equipment, signals transmitted with the MU-MIMO transmission and received from the base station to obtain a signal portion for the user equipment.

According to another aspect of the present disclosure, a method in a wireless communication system is further provided. The method includes: for each of one or more user equipment in a group of user equipment which are simultaneously scheduled to perform Multi-User Multiple Input Multiple Output (MU-MIMO) transmission, generating control information related to the MU-MIMO transmission and controlling a base station to transmit the control information to this user equipment, where the control information includes information indirectly indicating transmission related configuration of other user equipment than this user equipment in the group of user equipment; and controlling the base station to simultaneously transmit signals to the group of user equipment on specific transmission resource.

According to another aspect of the present disclosure, a non-volatile computer readable storage medium storing executable instructions is further provided. When the executable instructions are executed by a processor, the processor is caused to perform the method in the wireless communication system or functions of the device in the wireless communication system described above.

According other aspect of the present disclosure, a computer program code and a computer program product for implementing the method according to the present disclosure are further provided.

According to at least one aspect of embodiments of the present disclosure, the control information of MU-MIMO transmission for the control channel of a group of user equipment is carried in the group common physical downlink control channel, so that each user equipment can obtain transmission related configuration (for example DMRS configuration) of its UE-specific PDCCH by decoding the group common physical downlink control channel, and extracts its UE-specific PDCCH from the received superposed signal according to the transmission related configuration, thereby efficiently implementing MU-MIMO transmission for the downlink control channel, and improving resource utilization.

According to at least another aspect of the present disclosure, for the MU-MIMO transmission of the downlink data channel, transmission related configuration of other user equipment scheduled simultaneously with the target UE is indirectly indicated to the target UE, so that the limited physical layer scheduling signaling can be effectively utilized and thus the target UE can determine, suppress and/or remove interferences from other user equipment according to the transmission related configuration, thereby decoding to obtain a target data flow for the target UE and improving the throughput and reliability of the system.

Other aspects of the embodiments of the present disclosure are given in the following specification. Preferred embodiments for fully disclosing the present disclosure are described in detail, and the preferred embodiments are not intended to limit the present disclosure.

BRIEF DESCRIPTION OF THE DRAWINGS

The present disclosure may be better understood with reference to the detailed description below given in conjunction the drawings. The same or similar components are represented by the same or similar reference numerals. The drawings together with the detailed description below are included in the specification and form a part of the specification, for illustrating preferred embodiments of the present disclosure and explaining the principles and advantages of the present disclosure by examples. In the drawings.

DETAILED DESCRIPTION OF EMBODIMENTS

Exemplary embodiments of the present disclosure are described below with reference to the drawings. For clarity and conciseness, not all characteristics of an actual embodiment are described in the specification. However, it should be understood that many embodiment-specific decisions, for example, conforming to restrictions related to system and business, must be made when developing any actual embodiment, so as to achieve a specific goal of a developer. These restrictions may vary depending on embodiments. In addition, it should be understood that, although development work may be complex and time-consuming, the development work is merely a routine task for those skilled in the art who benefit from the present disclosure.

Here, it should be further noted that, in order to avoid obscuring the present disclosure due to unnecessary details, the drawings show only device structures and/or processing steps that are closely related to technical solutions of the present disclosure, and other details have little relevance to the present disclosure are omitted.

Before the embodiments of the present disclosure are described, "transparent" MU-MIMO transmission and "non-transparent" MU-MIMO transmission are briefly introduced for facilitating understanding of the present disclosure.

Figure 1:
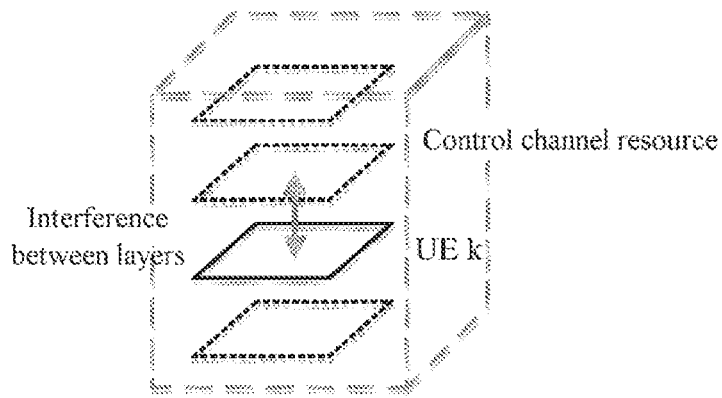
FIG. 1 is a schematic diagram of an example showing "transparent" MU-MIMO transmission.

In the "transparent" MU-MIMO transmission, as shown in FIG. 1, a base station simultaneously schedules multiple UE to perform downlink MU-MIMO transmission. A layer of signal flow for UE k and other three layers of signal flow (which may be for one or more other user equipment) share the same time-frequency resource by spatial multiplexing. However, the UE k does not know that there are other layers (which are shown by dotted line in FIG. 1). That is, the UE k does not know accurate interference from other layers. In this case, in detecting a downlink channel, a receiver of the UE k attempts to recover only a downlink signal sent to the UE k from the base station, and cannot perform effective processing for inter-layer interference.

Figure 2:
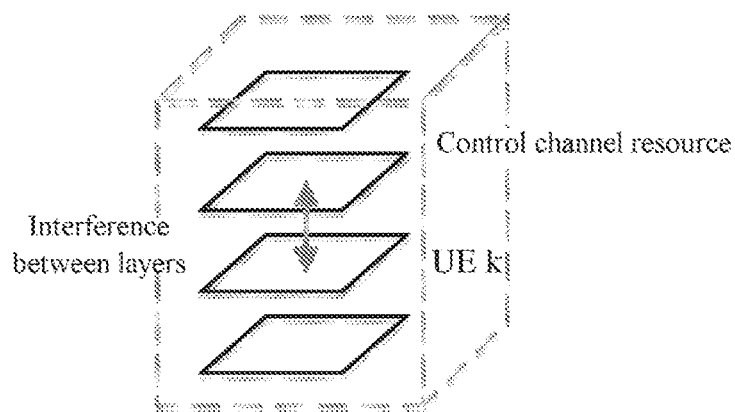
FIG. 2 is a schematic diagram of an example showing "non-transparent" MU-MIMO transmission.

In the "non-transparent" MU-MIMO transmission, as shown in FIG. 2, the base station schedules signal flows of the UE k and one or more other user equipment on the same time-frequency resource, and notifies the UE k of other layers (which are shown by solid lines in FIG. 2), so that the receiver of the UE k recovers the downlink signal sent to the UE k from the base station by processing interferences from other layers.

Compared with the "transparent" MU-MIMO, the "non-transparent" MU-MIMO transmission has the following advantages. The UE under the "non-transparent" transmission can know interferences between multiple users, and thus suppress or remove interferences between multiple users by using a more advanced receiver, thereby improving the throughout and reliability of the entire system. In addition, since cases of multiple uses are known, it is possible to measure interferences between multiple users. The interference measurement here is performed based on DMRS. Possible disadvantages of the "non-transparent" transmission are as follows. Extra signaling notification is required, so that the UE can know other user equipment which shares the scheduled time-frequency resource with the UE during multiple UE transmission. In addition, the advanced receiver generally causes higher detection complexity, resulting in that the receiver consumes more computation and time resource.

Therefore, in an embodiment according to at least one aspect of the present disclosure, "non-transparent" MU-MIMO transmission of a data channel is implemented with less signaling overhead and less computation and time resource, so as to optimize the "non-transparent" MU-MIMO transmission.

Hereinafter, description is performed in the following order. However, it should be noted that, for convenience of description, the embodiments of the present disclosure are described in the following chapter order, but such chapter division and order does not limit the present disclosure. Practically, in implementing the technology according to the present disclosure, those skilled in the art may combine the embodiments described blow according to the principle of the present disclosure and actual situations, unless the embodiments conflict with each other.

1. "non-transparent" MU-MIMO transmission for a downlink data channel (First embodiment)
   1-1. First schematic scheme
   1-2. Second schematic scheme
   1-3. Third schematic scheme
   1-4. Fourth schematic scheme 2. MU-MIMO transmission for a downlink control channel (Second embodiment)
   2-1. First schematic scheme
   2-2. Second schematic scheme
   2-3. Variation of the second schematic scheme
   2-4. Third schematic scheme 3. Method embodiments according to the present disclosure
   3-1. First embodiment
   3-2. Second embodiment 4. Computation device for implementing embodiments of the device and method according to the present disclosure 5. Application examples of the technology according to the present disclosure
  5-1. Application example for abase station
  5-2. Application example for user equipment Subsequently, embodiments of the present disclosure are described in detail with reference to FIG. 1 to FIG. 44.

1. "Non-Transparent" MU-MIMO Transmission for a Downlink Data Channel (First Embodiment)

Figure 3:
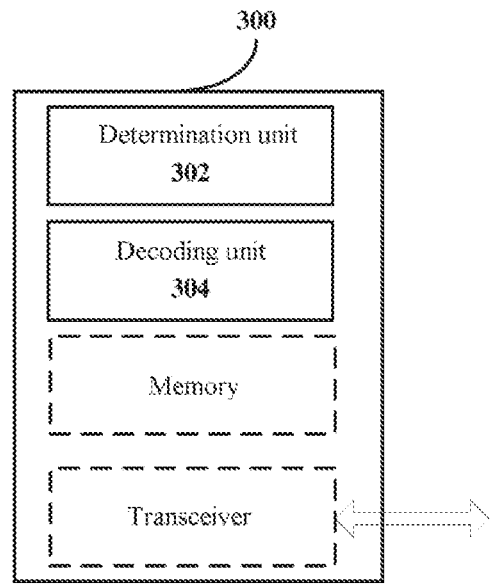
FIG. 3 is a block diagram of an example showing functional configuration of a device at a UE side according to a first embodiment of the present disclosure.

FIG. 3 is a block diagram of an example showing functional configuration of a device at a UE side according to a first embodiment of the present disclosure.

As shown in FIG. 3, a device 300 according to this example may include a determination unit 302 and a decoding unit 304.

It should be noted that, functional units in the device shown in FIG. 3 only represent logic modules divided according to the implemented specific functions, and are not intended to limit the implementations. In an actual implementation, the functional units and modules may be implemented as independent physical entities, or may be implemented by a single entity (for example a processor (CPU or DSP), an integrated circuit), which also adapts to description of other configuration examples at the UE side later. Configuration examples of the functional units are described in detail in the following.

The determining unit 302 may be configured to determine, according to control information, which is related to MU-MIMO transmission performed by target user equipment and other user equipment scheduled simultaneously, from a base station, transmission related configuration of the other user equipment. The control information includes information indirectly indicating the transmission related configuration of the other user equipment.

Presently, in the LTE system, the base station notifies, via a downlink control channel, respective UE in MU-MIMO transmission of a corresponding DMRS port index, a scrambling ID, and the number of layers occupied by a signal flow of the UE. Preferably, the transmission related configuration here includes DMRS configuration. Preferably, the DMRS configuration may directly refer to a DMRS port index. Alternatively, the DMRS configuration may refer to information on a pseudo random sequence and a corresponding orthogonal covered code (OCC) for generating DMRS. One pseudo random sequence may be used to generate multiple orthogonal DMRSs with multiple OCC codes. Therefore, the same pseudo random sequence may be applied to multiple UE.

It should be noted that, the technology of the present disclosure is described in the following detailed description by taking the DMRS port index as an example of the transmission related configuration for convenience. It should be understood that, the example does not limit the present disclosure, and this description also adapts to other cases in which the DMRS configuration of the user equipment is represented by information in other form.

In order to cause the target UE to know DMRS configuration of other UE so as to implement the "non-transparent" MU-MIMO transmission, as a direct and simple manner, the DMRS configuration of other UE (for example the DMRS port index) may be sent to the target UE one by one via a downlink control channel. However, particularly in a great data amount transmission service of the NR system, a total layer number of signal flow for the MU-MIMO transmission is generally great, that is, the number of the DMRS port indexes is great. In this case, the above manner results in great singling overhead and thus wasting valuable physical layer signal resource. Therefore, the above manner is not suitable for an application scenario in which the NR has great data amount transmission requirement.

In view of above, in solutions according to the present disclosure, the control information for the MU-MIMO transmission of the target UE includes information indirectly indicating DMRS configuration of other user equipment, so that the target UE can acquire the DMRS configuration of other user equipment based on the control information, with as few signaling overhead as possible.

The decoding unit 304 may be configured to decode, based on the determined transmission related configuration of other user equipment, a signal transmitted with MU-MIMO transmission and received from the base station, to obtain a signal portion for the user equipment.

The decoding operation of the decoding unit 304 is further described in detail by taking serial interference removing as an example.

It is assumed that target UE is UE k, and the signal transmitted with MU-MIMO transmission and received from the base station is expressed as follows:

$$y_k = H_k P_k x_k + \sum_{i \neq k} H_k P_i x_i + n_k.$$

In which, $H_k$ represents a channel from the base station to the UE k, $P_k$ represents a precoding vector of the UE k, and $n_k$ represents a receiver noise of the UE k. In addition, $H_k P_i x_i$ represents interference from UE i during the MU-MIMO transmission. In a case of acquiring the DMRS configuration information of the UE i, the UE k may first estimate an interference equivalent channel, that is, $H_k P_i$, from the UE i, and attempt to decode data $x_i$ of the UE i. If the UE k can decode $x_i$ and estimates $H_k P_i$, an interference on the UE k from the UE i can be recovered, and the interference is subtracted from the above equation. By removing the interference from all UE (i≠k), the following equation can be obtained:

$$y'_k = H_k P_k x_k + n_k.$$

Subsequently, the UE k may decode with the conventional linear receiver W to obtain the data sent to the UE k from the base station:

$$\widetilde{x_k} = W y'_k = W(H_k P_k x_k + n_k)$$

It should be noted that, the decoding operation that the target data flow is decoded based on the DMRS configuration information of other interference user equipment during the MU-MIMO transmission is only schematic. Those skilled in the art may decode the target data flow based on the DMRS configuration information of the interference UE by using other well-known decoding operation in the art or decoding operations which may appear in the future. The decoding manner is not limited in the present disclosure.

Here, it should be noted that the device 300 at the UE side may be implemented as a chip or a device. For example, the device 300 may function as the UE, and may include external devices such as a memory, a transceiver (optionally, shown by dotted line block in FIG. 3). The memory may be configured to store programs to be executed to achieve various function by the UE and related data information. The transceiver may include one or more communication interfaces to support communication with different devices (for example the base station, other UE). The implementation of the transceiver is not limited here. This also adapts to the description of other configuration examples for the UE side later.

Figure 4:
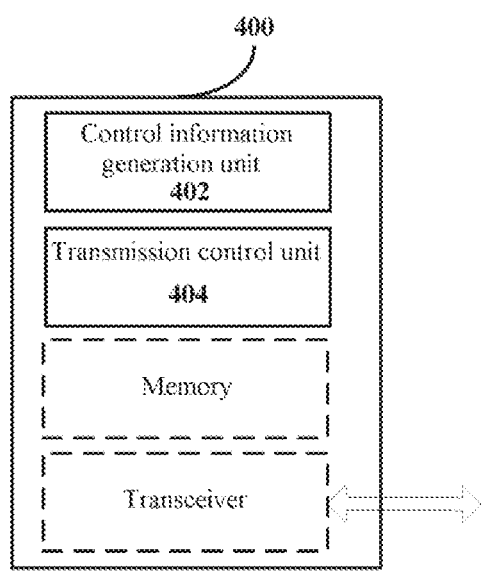
FIG. 4 is a block diagram of an example showing functional configuration of a device at a base station side according to a first embodiment of the present disclosure.

Corresponding to the configuration example of the device at the UE side shown in FIG. 3, examples of a base station side are further provided in the present disclosure. FIG. 4 is a block diagram of an example showing functional configuration of a device at the base station side according to the first embodiment of the present disclosure.

As shown in FIG. 4, a device 400 according to this example may include a control information generation unit 402 and a transmission control unit 404.

Similarly, it should be noted that, the functional units of the device shown in FIG. 4 represent only logic modules divided according to the achieved functions, and are not intended to limit the preset disclosure. In actual implementations, the functional units or modules may be implemented as independent physical entities, or may be implemented as a single entity (for example a processor (CPU or DSP), an integrated circuit), which also adapts to the description of other configuration examples of the base station side later. Configuration examples of the functional unit are described in detail hereinafter.

The control information generation unit 402 may be configured to: for each of one or more user equipment in a group of user equipment, which are simultaneously scheduled to perform MU-MIMO transmission, generate control information related to the MU-MIMO transmission and control a base station to transmit the generated control information to this user equipment. The generated control information includes information indirectly indicating transmission related configuration of other user equipment than this user equipment in the group of user equipment. Preferably, the transmission related configuration here includes DMRS configuration.

In some examples, for the group of user equipment which are scheduled simultaneously to perform MU-MIMO transmission, receivers of different user equipment may have different processing capacities. For some user equipment of which the receiver has poor processing capacity, the receivers of these user equipment cannot decode the target data flow by the above linear interference removing manner, even if the DMRS configuration of other UE is informed. In this case, if the DMRS configuration of the interference UE is informed to these user equipment via the control channel, it results in waste of the physical layer signaling resource. Therefore, for these user equipment, preferably, "transparent" MU-MIMO transmission may be configured, that is, only DMRS configuration of these user equipment is informed.

In another aspect, for other user equipment of which the receiver has strong processing capacity, preferably, the "non-transparent" MU-MIMO transmission according to the present disclosure may be configured. That is, information indirectly indicating the transmission related configuration of other UE in the group is included in the control information to inform these user equipment, so that these user equipment can acquire and remove interference from other UE. The "one or more user equipment in the group of user equipment" described above indicate the user equipment which can support and implement the "non-transparent" MU-MIMO transmission. In addition, in the description, the target user equipment refers to any user equipment in the one or more user equipment.

In this case, the MU-MIMO transmission for the data channel according to the present disclosure includes both the "transparent" MU-MIMO transmission and the "non-transparent" MU-MIMO transmission, which may also be referred to as hybrid transparent MU-MIMO transmission.

However, it should be noted that, in a case that the receivers of all user equipment in the group performing the MU-MIMO transmission have strong processing capacity and thus can support and implement the "non-transparent" MU-MIMO transmission, the control information generation unit 402 at the base station side may generate the above control information for each of the group of user equipment. The base station can flexibly determine UE to perform "transparent" MU-MIMO transmission and UE to perform "non-transparent" MU-MIMO transmission according to the present disclosure, based on the acquired related information of the user equipment. This is not limited in the present disclosure.

The transmission control unit 404 may be configured to control the base station to simultaneously send signals to respective UE in the group of UE on the same specific transmission resource.

In this way, the UE receiving the generated control information can acquire DMRS configuration of other UE in the group, and removes, as interference, a signal of other UE which is superposed with a target signal of this UE for transmission, thereby demodulating the target signal from the received signal. In another aspect, for the UE which is configured to perform the "transparent" MU-MIMO transmission, the UE directly attempts to recover the target signal from the received superposed signals according to its DMRS configuration.

It should be noted that, the configuration example of the device at the base station side described here corresponds to the configuration example of the device at the UE side described above. Therefore, for the content not described in detail here, one may refer to the corresponding description above, and the details are not repeated here.

In addition, it should be noted that the device 400 at the base station side may be implemented as a chip or a device. For example, the device 400 may function as the base station, and may include external devices such as a memory, a transceiver (optionally, shown by a dotted line box in FIG. 4). The memory may be configured to store programs to be executed to achieve various functions by the base station and related data information. The transceiver may include one or more communication interfaces to support communication with different devices (for example, UE, other base station). The implementations of the transceiver are not limited here. This also adapts to the description of other configuration example of the base station side later.

As examples rather than limiting, a first to a fourth schematic schemes for indirectly indicating the DMRS configuration of an interference UE are described in detail respectively. However, it should be understood that, those skilled in the art can make appropriate amendments on the schematic schemes according to the principles of the present disclosure, to obtain other schemes for indirectly indicating the DMRS configuration of the interference UE. Such amendments apparently fall within the protection scope of the present disclosure.

1-1. First Schematic Scheme)

In the first schematic scheme, the control information from the base station may include DMRS configuration of target user equipment and a total layer number for MU-MIMO transmission. In the MU-MIMO transmission, one layer of data flow corresponds to one DMRS port. Therefore, the total layer number for MU-MIMO transmission may be regarded as the total number of DMRS configurations or DMRS ports, or the total number of data flow. Hereinafter, how to infer DMRS configuration of the interference UE from the DMRS configuration of the target UE and the total layer number for MU-MIMO transmission is described in detail hereinafter.

Figure 5:
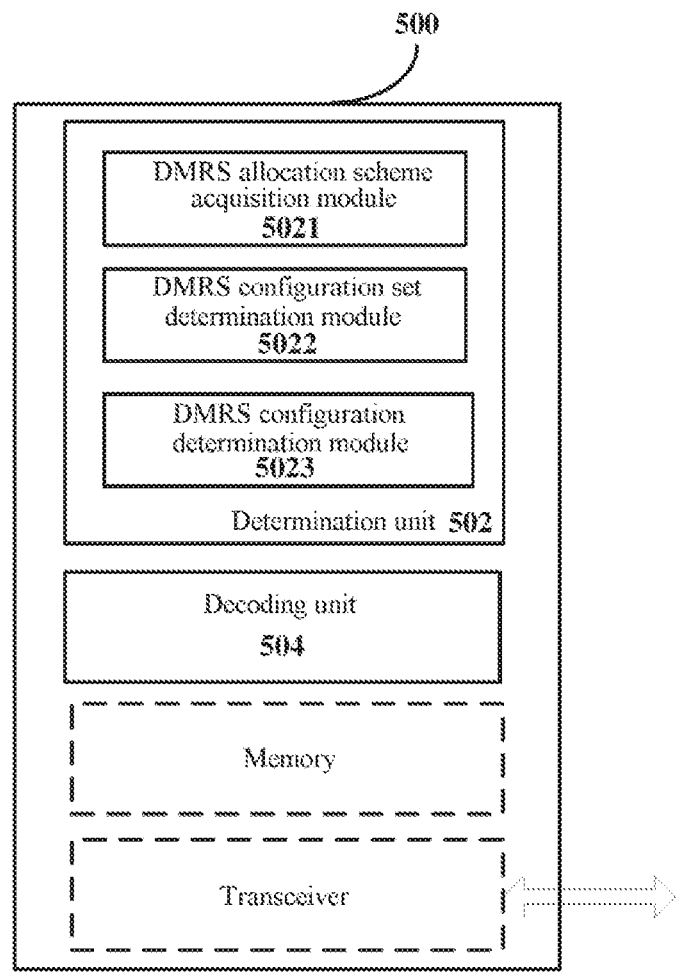
FIG. 5 is a block diagram of another example showing functional configuration of the device at the UE side according to the first embodiment of the present disclosure.

FIG. 5 is a block diagram of another example showing the functional configuration of the device at the UE side according to the first embodiment of the present disclosure.

As shown in FIG. 5, a device 500 according to this example may include a determination unit 502 and a decoding unit 504. A functional configuration example of the decoding unit 504 is substantially the same as the functional configuration example of the decoding unit 304 described above with reference to FIG. 3, and details are not repeated here.

The determining unit 502 may include: a DMRS allocation scheme acquisition module 5021, a DMRS configuration set determination module 5022 and a DMRS configuration determination module 5023.

The DMRS allocation scheme acquisition module 5021 may be configured to acquire a DMRS allocation scheme for MU-MIMO transmission by receiving from a base station or reading from a memory.

The DMRS allocation scheme here may indicate an allocation manner for DMRS ports, may be dynamically configured by the base station via high layer signaling (for example RRC signaling), or may be a default allocation manner pre-stored in the memory. In a case that the DMRS allocation scheme is dynamically configured by the base station via the high layer signaling, the DMRS allocation scheme acquisition module 5021 may decode the high layer signaling from the base station to obtain the DMRS allocation scheme.

The DMRS configuration set determination module 5022 may be configured to determine a DMRS configuration set for the MU-MIMO transmission according to at least the DMRS allocation scheme and the total layer number. The DMRS configuration set here refers to a set consisting of DMRS configurations of a group of UE participating in MU-MIMO transmission.

The DMRS configuration determination module 5023 may be configured to determine DMRS configuration other than DMRS configuration of this UE in the DMRS configuration set, as DMRS configuration of other UE.

In a schematic implementation, the DMRS allocation scheme may include a sequence of DMRS configurations. The sequence indicates multiple DMRS configurations which are arranged in an order and are used for MU-MIMO transmission one time. In addition, the DMRS configuration set determination module 5022 may read DMRS configurations, the number of which is equal to the total lay number, from the sequence of DMRS configuration in a predetermined order, as the DMRS configuration set.

In an example, in the LTE system, indexes of eight DMRS ports are antenna ports 7 to 14. It is assumed that the DMRS configuration sequence configured by the base station via RRC signaling is [7, 8, 11, 13, 9, 10, 12, 14], the total layer number for MU-MIMO transmission is 6 and the predetermined order or the usage order configured by the base station is to read from the end of the sequence sequentially for example. The DMRS configuration set determination module 5022 reads the last six DMRS configurations 11, 13, 9, 10, 12, 14 from the sequence as the DMRS configuration set for this MU-MIMO transmission. It is assumed that the DMRS port index of the target UE is 10, and the DMRS configuration determination module 5023 of the target UE may determine 11, 13, 9, 12, 14 as DMRS ports corresponding to interference data flow of other UE. In the NR system, indexes of the DMRS ports differ from that in the LTE system. Indexes of the DMRS ports in the NR system are 1000-1011, which adapts to various examples described based on the LTE system in the present disclosure. Details are not repeated for briefness.

In another schematic implementation, the DMRS allocation solution may include a sequence of DMRS configurations. The sequence may not indicate a usage order of the included DMRS configurations. In addition to the DMRS configuration of the target UE and the total layer number, the control information may further include a beginning layer number for MU-MIMO transmission in the configuration sequence. In this case, the DMRS configuration set determination module 5022 may be further configured to read, starting from a DMRS configuration corresponding to the beginning layer number in the sequence of DMRS configurations, DMRS configurations, the number of which is equal to the total layer number, from the sequence of DMRS configurations sequentially, as the DMRS configuration set.

Specifically, the configured DMRS configuration sequence [7, 8, 11, 13, 9, 10, 12, 14] is taken as an example again, and an index of each DMRS port in the sequence may be considered to correspond to a layer number for MU-MIMO transmission. For example, DMRS port 7 corresponds to layer 1, DMRS port 11 corresponds to layer 3, and so on. It is assumed that the total layer number for MU-MIMO transmission is 6 and the beginning layer number is 2, the DMRS configuration set determination module 5022 reads sequentially, starting from a second DMRS port in the sequence, six DMRS configurations 8, 11, 13, 9, 10, 12 as the DMRS configuration set for the MU-MIMO transmission. It is assumed that the DMRS port of the target UE is 10, the DMRS configuration determination module 5023 of the target UE may determine 8, 11, 13, 9, 12 as DMRS ports corresponding to interference data flow of other UE.

According to the schematic implementation, the beginning layer number for MU-MIMO transmission is specified in the control information, thereby supporting more flexible use of the DMRS configuration for MU-MIMO transmission.

In another schematic implementation, the DMRS allocation scheme may include information indicating a usage order of the DMRS configurations. For example, the DMRS allocation scheme indicates that the DMRS configurations are used in an ascending order (7 to 14) of the indexes of DMRS ports, in a descending order (14 to 7) of the indexes of DMRS ports, or in a specified specific order. For example a sequence [7, 8, 11, 13, 9, 10, 12, 14] indicating a usage order. In this case, the DMRS configuration set determination module 502 may be further configured to acquire DMRS configurations, the number of which is equal to the total layer number, to form the DMRS configuration set, according to a usage order indicated by the DMRS allocation scheme.

Specifically, it is assumed that the DMRS allocation solution indicates that the DMRS ports are used in an ascending order of indexes of the DMRS ports and the total layer number is 6, the DMRS configuration set determination module 5022 may directly acquire 7, 8, 9, 10, 11, 12 as the DMRS configuration set for MU-MIMO transmission. It is assumed that a DMRS port index of the target UE is 10, and the DMRS configuration determination module 5023 of the target UE may determine 7, 8, 9, 11, 12 as DMRS ports corresponding to interference data flow of other UE.

The schematic scheme in which the DMRS configuration of other UE in the group is inferred according to the DMRS configuration of the target UE and the total layer number for MU-MIMO transmission is described above as an example. However, it should be understood that, the above examples are only for illustration rather than restrictive, those skilled in the art may make appropriate amendments on the schematic scheme according to the principles of the present disclosure in conjunction with actual cases, and such amendments apparently fall within the protection scope of the present disclosure.

Figure 6:
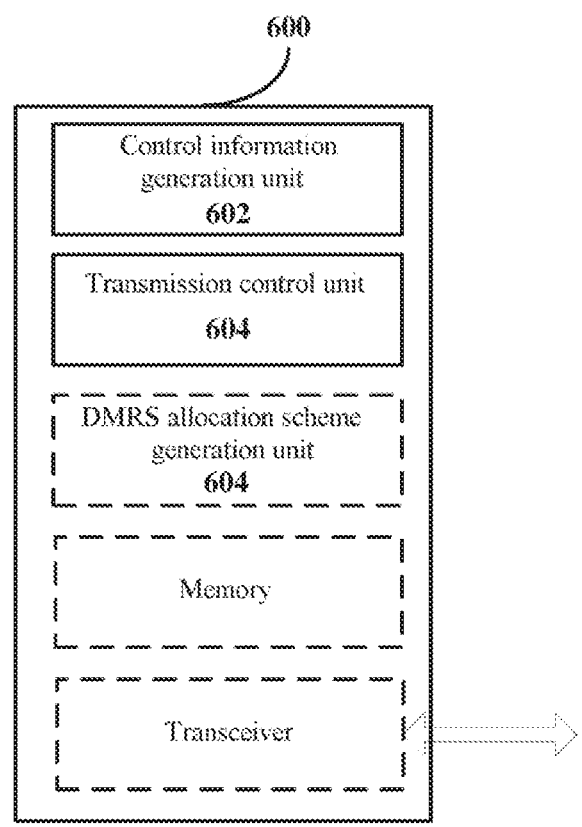
FIG. 6 is a block diagram of another example showing functional configuration of the device at the base station side according to the first embodiment of the present disclosure.

Corresponding to the configuration example of the device at the UE side, a configuration example of the device at the base station side in the first schematic scheme is described in detail hereinafter. FIG. 6 is a block diagram of another example showing the functional configuration of the device at the base station side according to the first embodiment of the present disclosure.

As shown in FIG. 6, a device 600 according to this example may include a control information generation unit 602 and a transmission control unit 604. A functional configuration example of the transmission control unit 604 is substantially the same as the functional configuration example of the transmission control unit 404 described above with reference to FIG. 4. Details are not repeated here.

The control information generation unit 602 may be configured to generate, for target user equipment in a group of user equipment performing MU-MIMO transmission, control information by including DMRS configuration of this user equipment and a total layer number of the MU-MIMO transmission, and control the base station to send the generated control information to the target UE, so that the target user equipment infers DMRS configuration of other interference UE according to the control information and a DMRS allocation solution pre-stored or configured by the base station.

Preferably, in a case that the DMRS allocation solution is configured by the base station, the device 600 may include a DMRS allocation solution generation unit 606.

The DMRS allocation scheme generation unit 606 may be configured to generate a DMRS allocation scheme for MU-MIMO, and control the base station to send the generated DMRS allocation scheme to the target user equipment, so that the user equipment determines DMRS configuration of other user equipment in the group of user equipment, based on at least the DMRS allocation scheme, the DMRS configuration of the user equipment and the total layer number.

Preferably, the DMRS allocation scheme generation unit 606 includes the generated DMRS allocation scheme in high layer signaling (for example RRC signaling) to send to the target user equipment.

In a schematic implementation, the generated DMRS allocation scheme may include a sequence of DMRS configurations, so that the user equipment may read DMRS configurations, the number of which is equal to the total layer number, from the sequence in a predetermined order, as the DMRS configuration set for MU-MIMO transmission.

In another schematic implementation, the generated DMRS allocation scheme may include a sequence of DMRS configurations. The control information generation unit 602 may be further configured to generate control information by including a beginning layer number for MU-MIMO transmission in the DMRS configuration sequence, in addition to the DMRS configuration of the target UE and the total layer number, so that the user equipment can read, starting from DMRS configuration corresponding to the beginning layer number, DMRS configurations, the number of which is equal to the total layer number, sequentially from the DMRS configuration sequence, as the DMRS configuration set for MU-MIMO transmission.

In another schematic implementation, the generated DMRS allocation scheme may include information for a usage order of DMRS configurations, so that the user equipment can read DMRS configurations, the number of which is equal to the total layer number, in the usage order, as the DMRS configuration set for MU-MIMO transmission.

It should be noted that, the DMRS allocation scheme generation unit 606 shown in FIG. 6 (shown by dotted line block in FIG. 6) is optional. In a case that the DMRS allocation scheme is configured and stored in advance in the memory at the UE side, the DMRS allocation scheme generation unit 606 may be omitted.

In addition, it should be noted that, the configuration example of the base station side described here with reference to FIG. 6 corresponds to the configuration example of the UE side described above with reference to FIG. 5. Therefore, for the content not described here, one may refer to the corresponding description above, and details are not repeated here.

Figure 7:
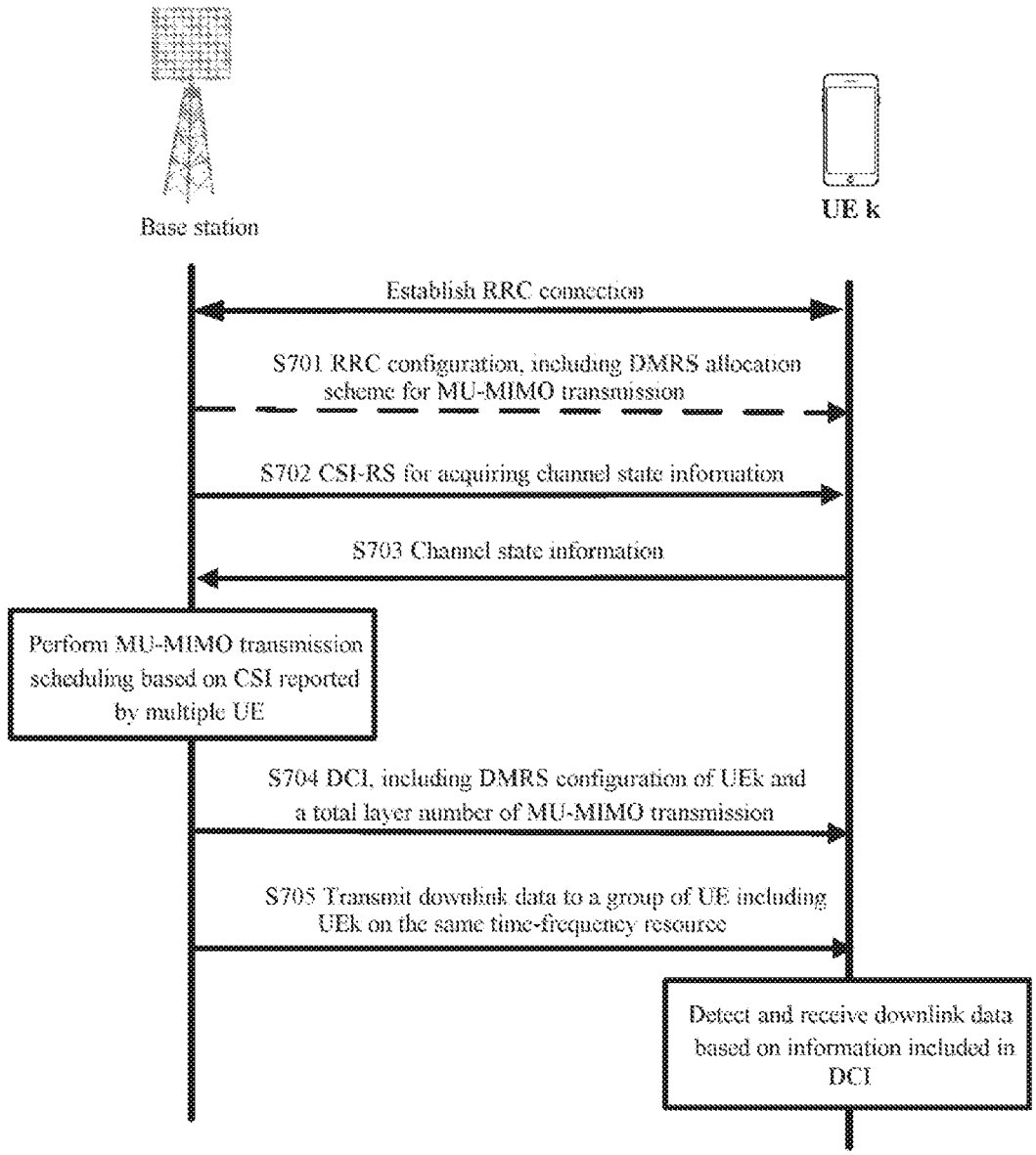
FIG. 7 is a flowchart showing signaling interaction process for implementing a first schematic scheme according to the first embodiment of the present disclosure.

In order to further facilitate understanding the first schematic scheme, signaling interaction process for implementing the first schematic scheme is described with reference to a flowchart shown in FIG. 7. FIG. 7 is a flowchart showing signaling interaction process for implementing the first schematic scheme according to the first embodiment of the present disclosure.

As shown in FIG. 7, first, in step S701, after RRC connection is established, the base station notifies UE k of DMRS allocation scheme via RRC signaling. Then, in step 702, the base station sends a downlink reference signal (for example, channel state information-reference signal CSI-RS) to the UE k to obtain a channel state. In step S703, the UE k feeds back measured channel state information to the base station. The base station performs MU-MIMO transmission scheduling based on channel state information reported by multiple user equipment. In step S704, the base station sends control information including DMRS configuration of the UE k and a total layer number for MU-MIMO transmission to the UE k. The control information may be included in user specific downlink control information (UE-specific DCI) transmitted on PDCCH. Then, in step S705, the base station transmits downlink data to a group of user equipment including the UE k on the same time-frequency resource according to the determined MU-MIMO transmission configuration. The UE k can obtain DMRS configurations of the UE k and other UE by decoding the received DCI, and thus demodulate the received data information based on the DMRS configurations.

It should be noted that, the signaling interaction process described above with reference to FIG. 7 is only schematic rather than restrictive. Those skilled in the art may make amendments on the above signaling interaction process according to the principle of the present disclosure in conjunction with actual cases. For example, the order of steps in FIG. 7 is schematic rather than restrictive. For example, in order to avoid obscuring the subject of the present disclosure, some interaction process less related to the technology of the present disclosure is omitted in the above flowchart. In addition, some steps in the above flowchart may be omitted. For example, in a case that the DMRS allocation solution is configured and stored in advance, the configuration of the DMRS allocation scheme in step S701 may be omitted (step S701 in FIG. 7 is shown by dotted line). All such amendments shall be regarded to fall within the protection scope of the present disclosure, which are not listed one by one here.

It can be seen that according to the first schematic scheme described above, the DMRS configuration of other UE in the group is indirectly indicated to the target UE by using the DMRS configuration of the target UE and the total layer number for MU-MIMO transmission, so that the "non-transparent" MU-MIMO transmission can be achieved with less signaling overhead, thereby being beneficial to optimize the system performance of MU-MIMO transmission.

1.2 Second Schematic Scheme

In a second schematic scheme according to the present disclosure, information on transmission related configuration of interference UE in the group is indirectly informed to the target UE by using interference measurement resource. Preferably, the interference measurement resource may include Non-Zero Power CSI-RS (NZP CSI-RS) resource. In addition, the interference measurement resource may further include channel state information interference measurement (CSI-IM) resource. The technology of the present disclosure is described below by taking the NZP CSI-RS resource as an example of the interference measurement resource. It should be understood that, this is only schematic rather than restrictive, and the technology described below may be similarly applied to other interference measurement resource.

Presently, in the NR system, multiple user interference measurement based on NZP CSI-RS is supported. Therefore, in the present disclosure, interference information in MU-MIMO transmission is indirectly indicated based on CSI-RS resource selected in the multiple user interference measurement, so that the user equipment can indirectly infer DMRS configuration corresponding to data flow of the interference UE according to information of the CSI-RS resource.

Figure 8:
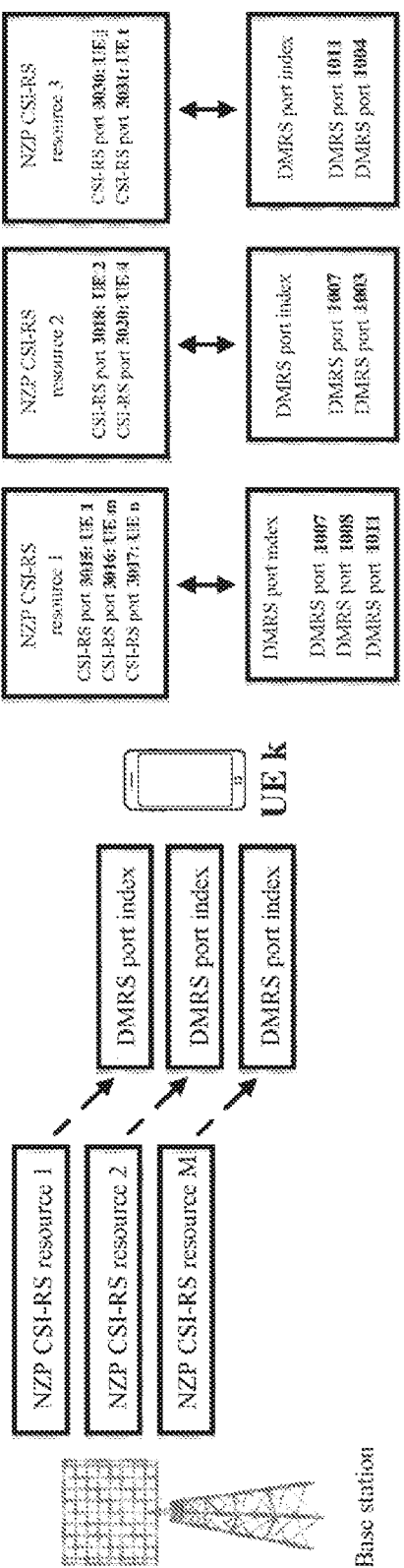
FIG. 8 is a schematic diagram of an example showing a mapping relationship between CSI-RS resource or a CSI-RS port and a DMRS port according to the first embodiment of the present disclosure.

Specifically, a mapping relationship between DMRS ports and CSI-RS resource or antenna ports for transmitting CSI-RS resource (also referred to as CSI-RS port) is established in advance. FIG. 8 is a schematic diagram of an example showing a mapping relationship between DMRS ports and CSI-RS resource or CSI-RS ports according to the first embodiment of the present disclosure.

In a schematic implementation, a mapping relationship between CSI-RS resource and DMRS ports may be established. For example, as shown in FIG. 8, taking the NR system as an example, CSI-RS resource 1 is mapped to DMRS port 1007, 1008 and 1011; CSI-RS resource 2 is mapped to DMRS port 1007, 1003; and CSI-RS resource 3 is mapped to DMRS ports 1011, 1004.

Alternatively, in another schematic implementation, a mapping relationship between CSI-RS ports and DMRS ports may be established. CSI-RS supports setting of a part or all of 1, 2, 4, 8, 12, 16, 24 and 32 antenna ports. For example, CSI-RS supports 32 antenna ports, that is, CSI-RS may be transmitted via 32 antenna ports. In the LTE, CSI-RS is transmitted via one or more in antenna ports 15-46 (port indexes are 15-46). In addition, the supported antenna port may be determined according to the capability of the terminal device, setting of RRC parameters and/or set transmission modes. In the NR, there are 32 CSI-RS ports (actual antenna port indexes are 3000 to 3031 in the NR system) and 12 DMRS ports (actual antenna ports indexes are 1000 to 1011 in the NR system) in total, and thereby mapping of CSI-RS ports to DMRS ports can be implemented. For example, one CSI-RS port may be uniquely mapped to one DMRS port, while one DMRS port may be mapped to multiple CSI-RS ports, and thereby a unique DMRS port can be determined according to the corresponding CSI-RS port. For example, as shown in FIG. 8, CSI-RS ports 3015 and 3018 each are mapped to DMRS port 1007, CSI-RS port 3016 is mapped to DMRS port 1008, CSI-RS ports 3017 and 3030 are mapped to DMRS port 1011, and so on. Examples are not listed one by one here.

In addition, it should be noted that, a certain correspondence exists between CSI-RS resources and CSI-RS ports. The correspondence may be configured in advance by the base station via RRC. In this way, the user equipment can determine a corresponding DMRS port according to indication information on the CSI-RS resource or CSI-RS port from the base station and the mapping relationship, regardless of the mapping relationship being established as a mapping relationship between the CSI-RS resource and the DMRS port or between the CSI-RS port and the DMRS port.

Subsequently, in a multiple user interference measurement phase, the base station may configure multiple interference measurement resources corresponding to multiple user combinations, for example CSI-RS resources, for multiple UE on an RRC layer. A mapping relationship known by both the base station and the UE exists between the DMRS ports and the CSI-RS resource or CSI-RS port.

Each CSI-RS resource may correspond to a MU combination. As shown in FIG. 8, NZP CSI-RS resource 1 corresponds to a MU combination of UE 1, UE m and UE n, NZP CSI-RS resource 2 corresponds to a MU combination of UE 2 and UE 4, and NZP CSI-RS resource 3 corresponds to a MU combination of UE j and UE t. The user equipment measures multiple CSI-RS resources and reports measurement results to the base station. The base station runs a multiple user scheduling algorithm after receiving the measurement results reported by multiple user equipment, to determine a group of user equipment to perform MU-MIMO transmission. Then, the base station may select CSI-RS resource corresponding to a MU scheduling result from the configured multiple CSI-RS resource, and inform the user equipment of the selected CSI-RS resource. The user equipment can obtain a DMRS port of other UE participating in MU-MIMO transmission according to the known mapping relationship, thereby implementing the "non-transparent" MU-MIMO transmission.

It should be noted that, in the second schematic scheme described above, interference during MU-MIMO transmission of the data channel is simulated based on the antenna port of NZP CSI-RS, and beamforming consistent with DMRS is used for NZP CSI-RS. The NZP CSI-RS should occupy the same or similar frequency band resource as DMRS, for example, occupying the same sub-band resource.

Configuration examples of the UE side and the base station for implementing the second schematic scheme are described in detail hereinafter.

Figure 9:
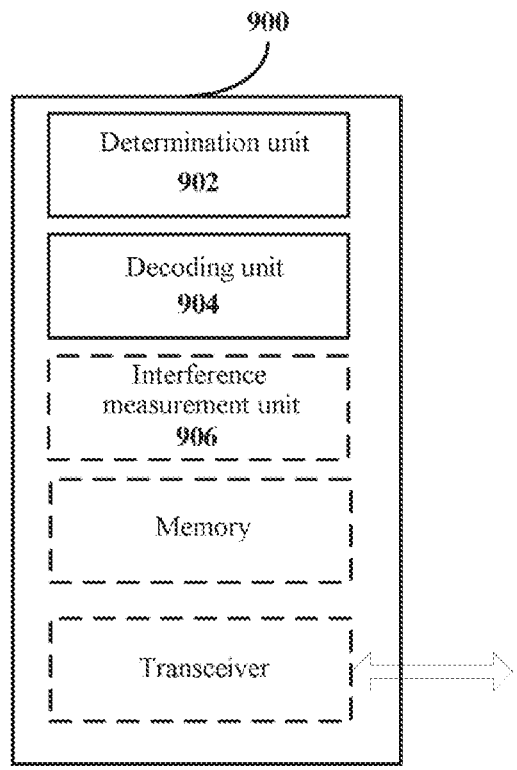
FIG. 9 is a block diagram of another example showing the functional configuration of the device at the UE side according to the first embodiment of the present disclosure.

FIG. 9 is a block diagram of another example showing the functional configuration of the device at the UE side according to the first embodiment of the present disclosure.

As shown in FIG. 9, a device 900 according to this example may include a determination unit 902 and a decoding unit 904. The functional configuration example of the decoding unit 904 is substantially the same as a functional configuration example of the decoding unit 304 described above with reference to FIG. 3, and details are not repeated here.

The determination unit 902 may be configured to determine transmission related configuration of interference UE based on control information from the base station. The control information may include information indicating interference measurement resource selected form one or more interference measurement resource by the base station or information indicating an antenna port for sending the selected interference measurement resource.

Preferably, the interference measurement resource may include NZP CSI-RS resource. In addition, preferably, the information indicating the selected interference measurement resource may include CSI-RS resource indicator (CRI), and thus the base station may include CRI of the selected CSI-RS resource in UE-specific downlink control information (UE-specific DCI) for example, to notify the target UE.

Figure 10:
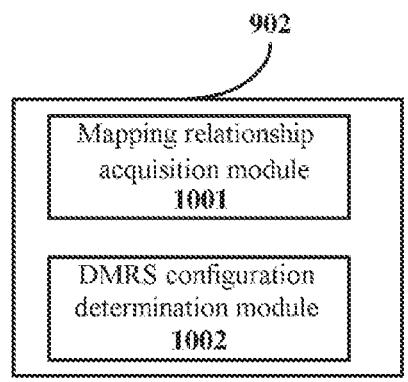
FIG. 10 is a block diagram of an example showing specific functional configuration of a determination unit in the device at the UE side according to the first embodiment of the present disclosure.

A specific functional configuration example of the determination unit 902 is described in detail with reference to FIG. 10. FIG. 10 is a block diagram of an example showing the functional configuration of the determination unit in the device at the UE side according to the first embodiment of the present disclosure.

As shown in FIG. 10, the determination unit 902 may further include a mapping relationship acquisition module 1001 and a DMRS configuration determination module 1002.

The mapping relationship acquisition module 1001 may be configured to acquire information indicating a mapping relationship between the DMRS configuration and interference measurement resource or an antenna port for sending the interference measurement resource, by receiving from the base station or reading from the memory.

Specifically, the mapping relationship between the DMRS port and the CSI-RS resource or CSI-RS port described above with reference to FIG. 8 may be stored in the memory at the UE side in advance, or may be dynamically configured by the base station via high layer signaling (for example RRC signaling). In a case that the mapping relationship is dynamically configured by the base station, the mapping relationship acquisition module 1001 may decode the high layer signaling (for example the RRC signaling) from the base station, to acquire the mapping relationship.

The DMRS configuration determination module 1002 may be configured to determine, based on the acquired mapping relationship, the DMRS configuration corresponding to the interference measurement resource selected by the base station, as DMRS configuration of other user equipment.

Specifically, as an example, returning to refer to FIG. 8, if the CRI included in the control information from the base station indicates that the selected interference measurement resource is CSI-RS resource 1 and the acquired mapping relationship is a mapping relationship between the CSI-RS resource and the DMRS port, the DMRS configuration determination module 1022 may directly determine that DMRS ports corresponding to CSI-RS resource 1 are 7, 8, 11, and determine these three ports as DMRS configurations of interference UE in the group. Alternatively, if the acquired mapping relationship is a mapping relationship between the CSI-RS port and DMRS port, the DMRS configuration determination module 1002 is required to determine a CSI-RS port corresponding to CSI-RS resource indicated by CRI, according to a correspondence between CSI-RS resources and CSI-RS ports configured via RRC by the base station or pre-stored. Then, the DMRS configuration determination module 1002 determines the DMRS port corresponding to the CSI-RS port as the DMRS configuration of the interference UE, according to the mapping relationship between the CSI-RS port and the DMRS port.

In another aspect, in a case that the control information from the base station includes information indicating the CSI-RS port, the DMRS configuration of the interference UE can be determined similarly. Details are not repeated herein.

It should be noted that, the DMRS configuration of the interference UE is indirectly indicated by using CRI with a priority, so as to reduce signaling overhead of the physical layer.

Figure 11:
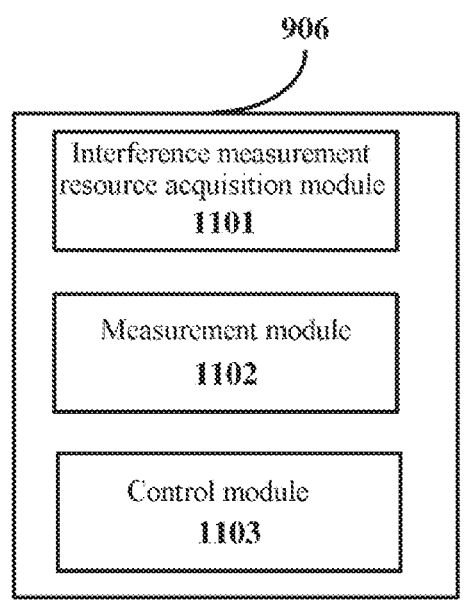
FIG. 11 is a block diagram of an example showing specific functional configuration of an interference measuring unit in the device at the UE side according to the first embodiment of the present disclosure.

Returning to refer to FIG. 9, preferably, the device 900 may include an interference measurement unit 906. The interference measurement unit 906 may be configured to perform multiple user interference measurement based on the interference measurement resource configured by the base station and report measurement results to the base station, so that the base station selects from the configured multiple interference measurement resources based on the measurement results. A functional configuration example of the interference measurement unit 906 is described in detail with reference to FIG. 11. FIG. 11 is a block diagram of an example showing specific functional configuration of an interference measurement unit in a device at the UE side according to the first embodiment of the present disclosure.

As shown in FIG. 11, the interference measurement unit 906 according to this example may include an interference measurement resource acquisition module 1101, a measurement module 1102 and a control module 1103.

The interference measurement resource acquisition module 1101 may be configured to decode high layer signaling received from the base station, to acquire one or more interference measurement resources.

Specifically, in an example, if the base station configures M NZP CSI-RS resource, that is, CSI-RS resource 1 to CSI-RS resource M, for the user equipment via high layer signaling, the interference measurement resource acquisition module 1101 may acquire M NZP CSI-RS resources by decoding the RRC signaling.

The measurement module 1102 may be configured to perform interference measurement based on one or more interference measurement resources, and generates measurement result indication corresponding to each of the one or more interference measurement resources.

Specifically, in an example, the measurement module 1102 may measure the M CSI-RS resources respectively, and generates measurement result indications corresponding to the M CSI-RS resources. Preferably, the measurement result indication may include at least one of multiple user channel quality indication (MU-CQI), reference signal receiving power (RSRP) and reference signal receiving quality (RSRP). Taking the MU-CQI as an example here, the measurement module 1102 generates MU-CQI 1 to MU-CQI M corresponding to the M CSI-RS resources respectively.

The control module 1103 may be configured to control the user equipment to feed back all or a part of the multiple measurement indications to the base station, so that the base station selects the selected interference measurement resource from one or more interference measurement resources.

Specifically, in an example, the control module 1103 may control the user equipment to report all M MU-CQIs to the base station, so that the base station selects appropriate CSI-RS resources from the M CSI-RS resources based on measurement results from other user equipment and a specific network status. In another aspect, in order to reduce transmission overhead and signaling overhead, the control module 1103 may control the user equipment to report only a part of MU-CQI to the base station. For example, only MU-CQI greater than a predetermined threshold is reported. The base station selects from only CSI-RS resources for which the measurement results are received.

Figure 12:
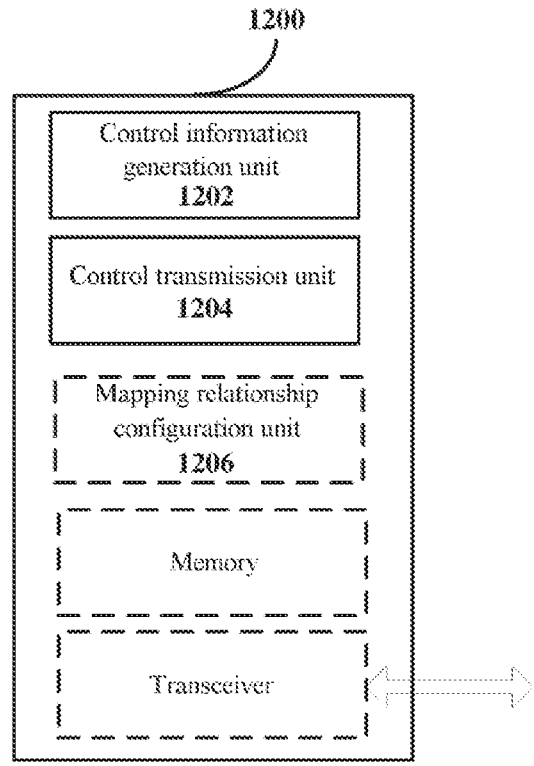
FIG. 12 is a block diagram of another example showing the functional configuration of the device at the base station side according to the first embodiment of the present disclosure.

Corresponding to the configuration example of the UE side, a configuration example of the base station side is described hereinafter. FIG. 12 is a block diagram of another example showing a device at the base station side according to the first embodiment of the present disclosure.

As shown in FIG. 12, a device 1200 according to this example may include a control information generation unit 1202 and a transmission control unit 1204. A functional configuration example of the transmission control unit 1204 is substantially the same as the functional configuration example of the transmission control unit 404 described above with reference to FIG. 4. Details are not repeated here.

The control information generation unit 1202 may be configured to generate control information for MU-MIMO transmission based on multiple user interference measurement, to indirectly indicate transmission related configuration of interference UE to the target UE.

Figure 13:
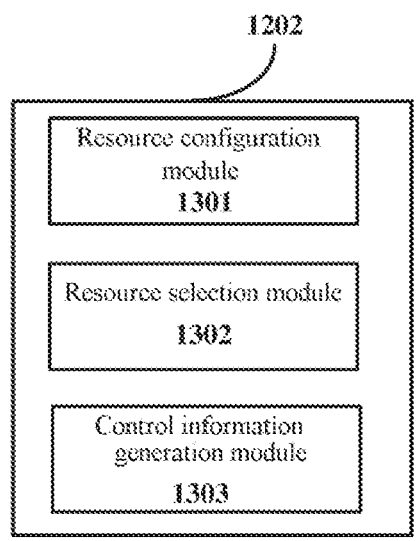
FIG. 13 is a block diagram of an example showing specific functional configuration of a control information generation unit in the device at the base station side according to the first embodiment of the present disclosure.

A specific functional configuration example of the control information generation unit 1202 is described in detail with reference to FIG. 13 below. FIG. 13 is a block diagram of an example showing specific functional configuration of the control information generation unit of the device at the base station side according to the first embodiment of the present disclosure.

As shown in FIG. 13, the control information generation unit 1202 according to this example may include a resource configuration module 1301, a resource selection module 1302 and a control information generation module 1303.

The resource configuration module 1301 may be configured to configure one or more interference measurement resources for each of a group of user equipment which is to perform MU-MIMO transmission.

Specifically, the resource configuration module 1302 may configure multiple NZP CSI-RS resources for each user equipment, for example via high layer RRC signaling. The multiple CSI-RS resources may correspond to multiple MU combinations.

The resource selection module 1302 may be configured to, for target user equipment according to measurement result indications fed back by the target user equipment and other user equipment based on the configured one or more interference measurement resources, select interference measurement resources from one or more interference measurement resources, that is, select a multiple user combination for MU-MIMO transmission, and generate indication information of the selected interference measurement resource or indication information of an antenna port for sending the selected interference measurement resource.

Specifically, the base station sends a downlink reference signal CSI-RS to each user equipment based on the configured multiple CSI-RS resources, and receives measurement result indications for one or more of multiple CSI-RS resources reported by the user equipment. The measurement result indication may include at least one of MU-CQI. RSRP and RSRQ. Then, the resource selection module 1302 of the base stations side can determine, based on for example MU-CQI reported by multiple user equipment, a group of user equipment to perform MU-MIMO transmission by using the known MU scheduling algorithm, thereby determining the CSI-RS resource for the target user equipment. For the specific MU scheduling algorithm, one may refer to the description in the conventional technology, and details are not repeated here.

The control information generation module 1303 may be configured to generate control information by including the indication information, for target user equipment in the determined group of user equipment.

Specifically, the control information generation module 1303 may include indication information of the selected CSI-RS resource (for example CRI) or indication information of the corresponding CSI-RS port (for example CSI-RS port index) in the control information, to send to the target user equipment via UE-specific DCI on PDCCH, for example. Thus, the target user equipment may acquire the included CRI or CSI-RS port index by decoding the received DCI, and determine DMRS configuration of the interference UE further based on known mapping relationship.

Returning to refer to FIG. 12, preferably, the device 1200 may include a mapping relationship configuration unit 1206.

The mapping relationship configuration unit 1206 may be configured to, for the target user equipment, generate information indicating a mapping relationship between the interference measurement resource or an antenna port for sending the interference measurement resource and the DMRS configuration, and controls a base station to send the information indicating the mapping relationship to the target user equipment, so that the target user equipment determines DMRS configuration of interference UE in the group based on the CSI-RS resource or port indicated by the control information, and the mapping relationship.

Preferably, the mapping relationship configuration unit 1206 may configure for example the mapping relationship described with reference to FIG. 8 via high layer signaling, for example, includes the mapping relationship in the RRC signaling to send to the target user equipment.

It should be noted that, the mapping relationship configuration unit 1206 is optional (shown by a dotted line box in FIG. 12). In a case that the mapping relationship is pre-configured and stored in the memory at the UE side, the user equipment may directly read the mapping relationship from the memory. Thus the mapping relationship configuration unit 1206 may be omitted.

In addition, it should be noted that, the configuration examples of the base station side described with reference to FIG. 12 and FIG. 13 correspond to the configuration example of the UE side described above. Therefore, for content not described in detail here, one may refer to the description at the above corresponding position, and details are not repeated here.

Figure 14:
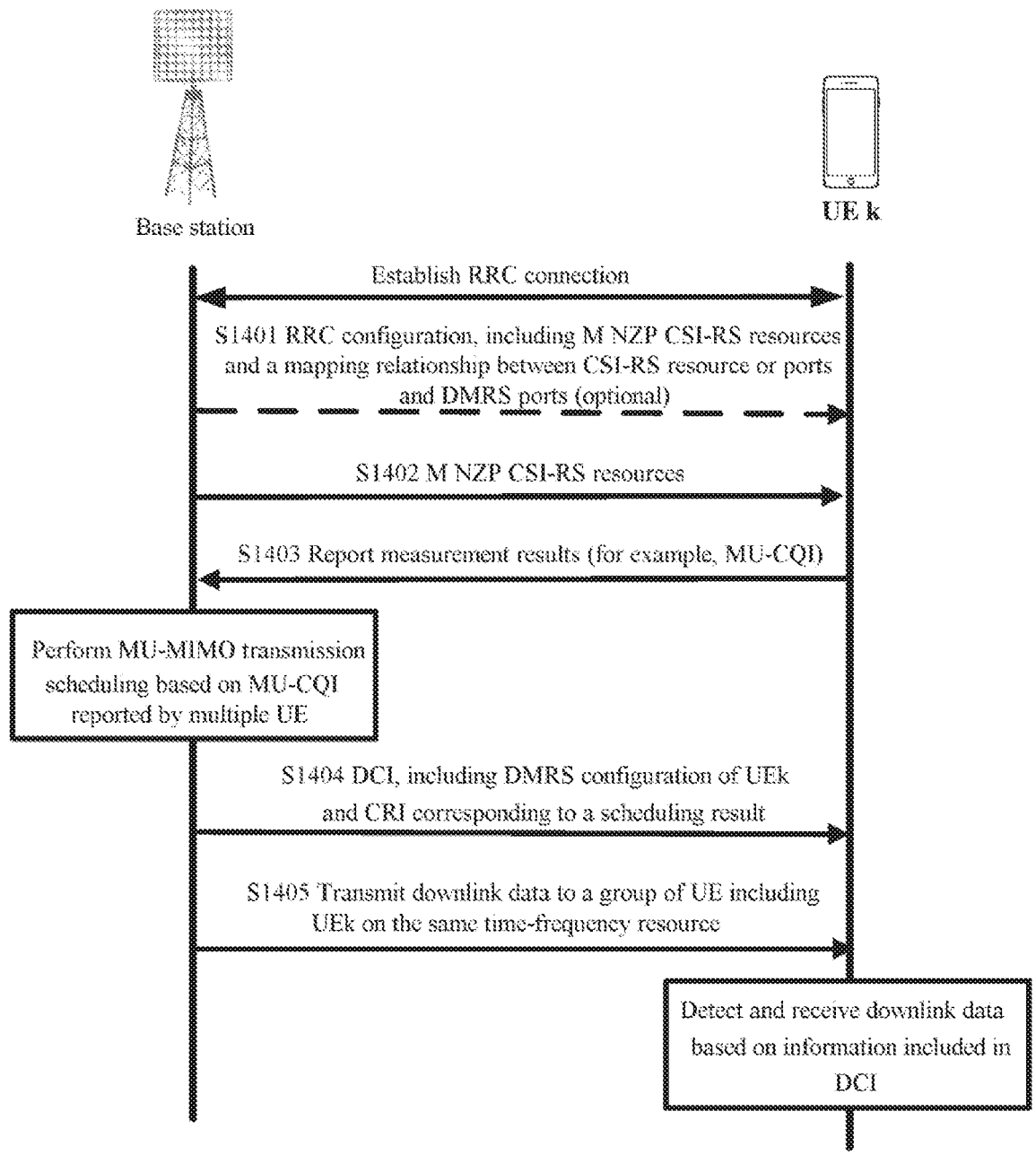
FIG. 14 is a flowchart showing signaling interaction process for implementing a second schematic solution according to the first embodiment of the present disclosure.

In order to further understand the above second schematic scheme, signaling interaction process for implementing the second schematic scheme is described below with reference to a flowchart shown in FIG. 14. FIG. 14 is a flowchart showing signaling interaction process for implementing the second schematic scheme according to the first embodiment of the present disclosure.

As shown in FIG. 14, first, after RRC connection is established, in step S1401, the base station configures, via RRC signaling, for example M NZP CSI RS resources and a mapping relationship between DMRS port and CSI-RS resource or CSI-RS port, for user equipment k. Then, in step S1402, the base station sends a downlink reference signal CSI-RS to the user equipment k based on the M NZP CSI-RS resources. The user equipment k measures M NZP CSI RS resources, and reports, for example, MU-CQIs as the measurement result to the base station in step S1403. The user equipment k may report all M MU-CQIs to the base station, or report, for example, only MU-CQIs greater than a predetermined threshold to the base station. The base station performs MU-MIMO transmission scheduling based on MU-CQIs reported by multiple user equipment, to select one NZP CSI-RS resource from M NZP CSI-RS resources. In step S1404, the DMRS configuration of the user equipment k and the control information including for example CRI of the selected CSI-RS resource is sent to the user equipment k via for example DCI. Then, in step S1405, the base station transmits downlink data to a group of user equipment including the user equipment k on the same time-frequency resource. The user equipment k may obtain its DMRS configuration and DMRS configuration of other UE in the group by decoding the received DCI, and thus demodulate the received data information based on the DMRS configurations.

It should be noted that, the signaling interaction process described above with reference to FIG. 14 is only schematic rather than restrictive, those skilled in the art may make amendments on the above interaction process according to the principle of the present disclosure in conjunction with actual situations. For example, the order of steps in FIG. 14 is schematic rather than restrictive. For example, in order to avoid obscuring the subject of the present disclosure, some interaction process less related to the technology of the present disclosure is omitted in the above flowchart. In a case that the mapping relationship is preconfigured and stored, the base station may not inform the user equipment of the mapping relationship in step S1401. All such amendments shall be regarded to fall within the scope of the present disclosure, and details are not repeated here.

According to the second schematic scheme of the present disclosure, according to the existing multiple user interference measurement based on the interference measurement resources and the pre-established mapping relationship between the DMRS configuration and the interference measurement resource or corresponding antenna ports, the DMRS configuration corresponding to the interference data flow during the MU-MIMO transmission is indirectly indicated to the target user equipment by using the interference measurement resource, so that the user equipment can obtain the related interference information without significantly increasing a processing load and signaling overhead, thereby implementing the "non-transparent" MU-MIMO transmission and being beneficial to optimize the system performance.

1-3. Third Schematic Scheme

In a third schematic scheme of the present disclosure, the DMRS configuration for MU-MIMO transmission is indirectly informed based on a transmission configuration indicator (TCI) mechanism. The existing TCI mechanism is introduced simply hereinafter.

In the present 3GPP 5G standardized development, a mechanism that Quasi co-location (QCL) relationship is informed with TCI is determined. Specifically, two antenna ports can be represented as QCL in a case of meeting a predetermined condition. The predetermined condition is that a wide domain performance of a transmission channel for bearing symbols in a certain antenna port can be inferred from a transmission channel for bearing symbols in other antenna port. The wide domain performance includes delay extension, Doppler extension, Doppler frequency shift, average gain, average delay and/or spatial reception. For example, if the TCI indicates CSI-RS port 15 and DMRS port 7 have QCL relationship in the space dimension, that is, two reference signals have consistent spatial features from a transmission end to a reception end. TCI is a mechanism supporting the base station to inform the user equipment of the QCL relationship. The existing TCI mechanism is briefly introduced hereinafter.

For example, it is assumed that for a certain antenna port or CSI-RS resource (for example CSI-RS port 3015 or CSI-RS resource ID5), the base station configures M TCI states for each UE via UE-specific RRC. The M TCI states include {downlink reference signal 1|QCL_type1, downlink reference signal 2|QCL_type2, . . . , downlink reference signal M|QCL_typeM}, which indicates that downlink reference signal 1 and CSI-RS port 3015 have co-location of QCL_type1, downlink reference signal 2 and CSI-RS port 3015 have co-location of QCL_type 2, and so on.

The downlink reference signal may include CSI-RS, CRS, DMRS and so on. QCL_type indicates a type of co-location. Presently, there are four types of co-location in total: QCL type A: Doppler frequency shift, Doppler extension, average delay, delay extension (frequency domain and time domain); QCL type B: Doppler frequency shift, Doppler extension (frequency domain); QCL type C: average delay, Doppler frequency shift (simplified frequency domain and time domain); and QCL type D: spatial reception (spatial domain).

According to the third schematic scheme of the present disclosure, the DMRS configuration of the MU-MIMO transmission group is indirectly indicated to the user equipment based on the TCI mechanism. Configuration examples of the UE side and the base station side for implementing the third schematic scheme are respectively described in detail hereinafter.

Figure 15:
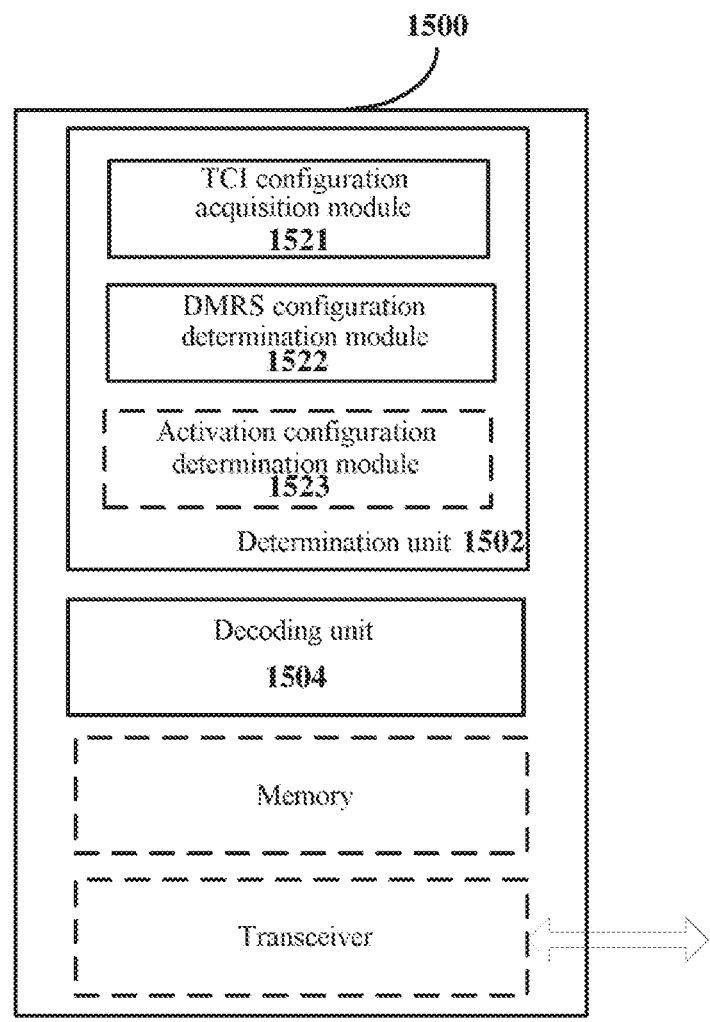
FIG. 15 is a block diagram of another example showing the functional configuration of the device at the UE side according to the first embodiment of the present disclosure.

FIG. 15 is a block diagram of another example showing the functional configuration of the device at the UE side according to the first embodiment of the present disclosure.

As shown in FIG. 15, a device 1500 according to this example may include a determination unit 1502 and a decoding unit 1504. A function configuration example of the decoding unit 1504 is substantially the same as the functional configuration example of the decoding unit 304 described with reference to FIG. 3. Details are not described here.

The determination unit 1502 may include a TCI configuration acquisition module 1521 and a DMRS configuration determination module 1522.

The TCI configuration acquisition module 1521 may be configured to acquire TCI configuration including a first number of TCI states from the base station. Each TCI state in the TCI configuration includes one DMRS configuration and a co-location type indication. The co-location type indication indicates the DMRS configuration is an interference DMRS configuration during MU-MIMO transmission.

Specifically, for target user equipment, the base station may configure TCI configuration including a first number of TCI states (indicated as M TCI states here) for example via UE-specific RRC, to indicate M DMRS ports which can be used for MU-MIMO transmission. In the scheme according to the present disclosure, the TCI state in the TCI configuration indicates interference DMRS configuration in MU-MIMO transmission, rather than QCL relationship between two antenna ports. Therefore, in a schematic implementation, one co-location type may be added in addition to the existing four co-location types A to D. The added co-location type may be indicated as QCL type E for example, for distinguishing from the existing TCI usage. As an example, the configured M TCI states may include {DMRS 1|QCL_typeE, DMRS 2|QCL_typeE, . . . DMRS M|QCL_typeE}, to indicate that DMRS 1 to DMRS M are interference ports during MU-MIMO transmission in this case.

Alternatively, in another example, for the TCI configuration for MU-MIMO transmission, the co-location type included in each TCI state may be default, and information of one bit for example is added in the RRC signaling to indicate whether the configured TCI is used to indicate QCL or used for MU-MIMO transmission.

In this way, the TCI configuration acquisition module 1521 at the UE side may acquire M TCI states configured for MU-MIMO transmission by decoding high layer RRC signaling from the base station, and know that DMRS ports indicated by the M TCI states may function as interference ports in the MU-MIMO transmission.

The DMRS configuration determination module 1522 may be configured to determine, according to information indicating usage configuration of the TCI state included in control information from the base station, DMRS configuration corresponding to a used TCI state in the first number of configured TCI states as DMRS configuration of other user equipment.

Specifically, for the target user equipment, the base station may generate, according to DMRS configuration of other UE which is simultaneously scheduled with the target user equipment to perform MU-MIMO transmission, usage configuration information indicating TCI states in the configured M TCI states, whose corresponding DMRS configuration functions as DMRS configuration of other UE.

Preferably, in a schematic implementation, the usage configuration information may indicate information on the number of the TCI states whose DMRS configuration functions as interference DMRS configuration in MU-MIMO transmission, among the M TCI states. The usage configuration information is included in UE-specific DCI to send to the user equipment, and thus the DMRS configuration determination module 1522 at the UE side can read the TCI states of the predetermined number indicated by the usage configuration information from the configured M TCI states in a predetermined order (for example, in a descending order, in an ascending order or reading sequentially from head to end), and determine DMRS configuration corresponding to the read TCI state as the interference DMRS configuration.

Preferably, in another schematic implementation, the usage configuration information may be bitmap information. For example, the used DMRS port is indicated as 1 in a bitmap, and the unused DMRS port is indicated as 0 in the bitmap. The usage configuration information may be included in UE-specific DCI and transmitted to the user equipment, and thus the DMRS configuration determination module 1522 at the UE side can acquire the bitmap information by decoding the DCI from the base station, and determine a DMRS port corresponding to the TCI state indicated as "1" in the bitmap information as the interference DMRS port. Therefore, the user equipment can perform corresponding interference removing and data demodulation, thereby implementing the "non-transparent" MU-MIMO transmission using the TCI mechanism.

In addition, it should be noted that, bits of the information indicating the usage configuration of the TCI state in the DCI may be fixed, so as to facilitate demodulating physical layer signaling by the user equipment. For example, in a case that the usage configuration information is used to indicate the number of the used TCI states, the usage configuration information may be fixed as 3 bits for example, and thus can indicate at most 8 interference DMRS configurations. In another aspect, in a case that the usage configuration information is bitmap information, the usage configuration information may be fixed as 8 bits for example. In a case that M is less than 8, deficient digits in the bitmap information indicating usage configuration of M TCI states may be supplemented with 0.

In another aspect, in a case that M is greater than 8, in order to save physical layer signaling overhead and solve the problem that reserved bits in DCI are insufficient, preferably, the base station may activate a second number (for example N=8) of TCI states from the M TCI states via UE-specific MAC control element (MAC CE). The activation operation may be implemented by bitmap information. For example, an activated TCI state is indicated as 1, and a non-activated TCI state is indicated as 0. Then, the base station informs the target user equipment of usage configuration of the activated N TCI states in MU-MIMO transmission by using DCI of the physical layer.

Therefore, preferably, the determination unit 1502 at the UE side may further include an activation configuration determination module 1523.

The activation configuration determination module 1523 may be configured to determine, according to information indicating activation configuration of the TCI state from the base station, a second number of activated TCI states among the first number of TCI states. Preferably, the second number is 8.

Specifically, the activation configuration determination module 1523 may obtain activation configuration information of the TCI states in a form of bitmap by decoding the MAC CE from the base station, and determine the TCI state corresponding to the bit "1"" as the activated TCI state. In this way, the activation configuration determination module 1523 can determine the activated TCI states, for example 8, among the M TCI states.

In this case, the usage configuration information indicating the TCI state from the base station may be information indicating usage configuration of the activated 8 TCI states. For example, the usage configuration information may be information indicating the number of TCI states for MU-MIMO transmission among 8 TCI states (3 bits), or may be bitmap information indicating whether each of the 8 TCI states is used for MU-MIMO transmission (8 bits), and thus the DMRS configuration determination module 1522 can read, according to usage configuration information, the indicated number of TCI states in a predetermined order from the activated 8 TCI states, and determines the corresponding DMRS configuration as the interference DMRS configuration. Alternatively, the DMRS configuration determination module 1522 may determine, according to the bitmap information of 8 bits, DMRS configuration corresponding to the TCI state indicated as "1" among the activated 8 TCI states, as DMRS configuration of other user equipment.

It should be noted that, the activation configuration determination module 1523 is optional (shown by a dotted line box in FIG. 15). In a case that M is less than or equal to 8, it is unnecessary for the base station to perform activation by using MAC CE, and thus it is unnecessary to provide the activation configuration determination module 1523 at the UE side.

Figure 16:
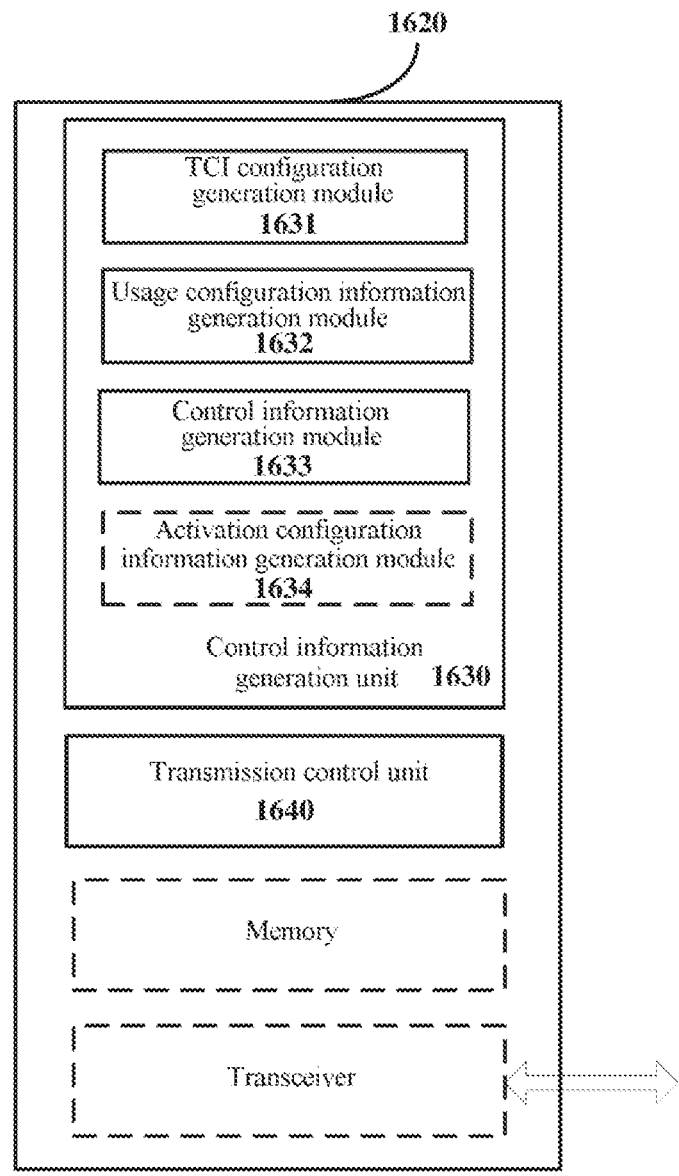
FIG. 16 is a block diagram of another example showing the functional configuration of the device at the base station side according to the first embodiment of the present disclosure.

Corresponding to the configuration example at the UE side, a configuration example at the base station side is described hereinafter. FIG. 16 is a block diagram showing another example of the functional configuration of the device at the base station side according to the first embodiment of the present disclosure.

As shown in FIG. 16, a device 1620 according to this example may include a control information generation unit 1630 and a transmission control unit 1640. A functional configuration example of the transmission control unit 1640 is substantially the same as the functional configuration example described above with reference to FIG. 4. Details are not repeated here.

The control information generation unit 1630 may further include a TCI configuration generation module 1631, a usage configuration information generation module 1632 and a control information generation module 1633.

The TCI configuration generation module 1631 may be configured to generate TC configuration including a first number of TCI states, and control a base station to send the TC configuration to target user equipment. In the TCI configuration, each TCI state includes one DMRS configuration and a co-location type indication. The co-location type indication indicates that the DMRS configuration is interference DMRS configuration in MU-MIMO transmission.

Specifically, the TCI configuration generation module 1631 may generate TC configuration including for example M TCI states, and include the TCI configuration in for example UE-specific RRC signaling to send to the target user equipment. In an example, the configured M TCI states may include {DMRS 1|QCL_typeE. DMRS 2|QCL_typeE, . . . DMRS M|QCL_typeE}. In which, QCL_typeE indicates that the DMRS port is an interference port in MU-MIMO transmission, to distinguish from the TCI state indicating the co-location type in the conventional technology.

The usage configuration information generation module 1632 may be configured to generate information indicating usage configuration of a first number of TCI states, according to DMRS configuration of interference UE other than the target UE in a group of user equipment performing MU-MIMO transmission.

Preferably, for example, the usage configuration information may be information indicating the number of TCI states whose DMRS configuration functions as interference DMRS configuration in MU-MIMO transmission, among the first number of TCI states. Alternatively, preferably, for example, the information indicating usage configuration of the TC states may be bitmap information. For example, the usage configuration information generation module 1632 may mark a TCI state corresponding to DMRS configuration of interference UE as 1, and mark other non-used TCI state as 0, to generate the bitmap information.

The control information generation module 1633 may be configured to generate control information by including the generated information indicating usage configuration of the TCI states. Preferably, the usage configuration information may be included in UE-specific DCI to send to the target UE, to indirectly indicate DMRS configuration of interference UE in the MU-MIMO transmission group to the target UE. Thus, the target UE performs interference removing and data demodulation to recover a target data flow, thereby implementing the "non-transparent" MU-MIMO transmission.

Preferably, the control information generation unit 1630 may include an activation configuration information generation module 1634. The activation configuration information generation module 1634 may be configured to active a second number of TCI states from the first number of TCI states, and generate activation configuration information indicating the activated second number of TCI states.

Specifically, in a case that the number M of TCI states configured by RRC is too large, for example M is greater than 8, the base station may activate N (for example N is 8) TCI states from M TCI states and indicate the activation operation by activation configuration information in a form of bitmap, in order to save physical layer signaling overhead and maintain consistency of formats of the physical layer signaling. For example, the activated TCI state is indicated as 1 in the bitmap information, and the non-activated TCI state is indicated as 0 in the bitmap information. The activation configuration information in a form of bitmap may be included in UE-specific Mac CE to send to the target UE.

Then, the usage configuration information generation module 1632 may generate, according to DMRS configuration of interference UE in MU-MIMO transmission, usage configuration information indicating usage of the activated TCI states, for example, information on the number of TCI states for MU-MIMO transmission among the activated N TCI states. For example, among the activated N TCI states, the TCI state corresponding to interference DMRS configuration is marked as 1, and the non-used TCI state is marked as 0, thereby generating bitmap information of N bits.

In this way, the target UE may determine DMRS configuration of the interference UE according to activation configuration information received from the MAC layer and the usage configuration information received from the physical layer, thereby performing interference removing and data demodulating.

It should be noted that, the activation configuration information generation module 1634 is optional (shown by a dotted line block in FIG. 16). In a case that the number of TCI states configured by RRC is less than or equal to 8 for example, the activation operation may be omitted. Thus, it is unnecessary to provide the activation configuration information generation module 1634.

In addition, it should be noted that, the configuration example at the base station side described here with reference to FIG. 16 corresponds to the configuration example at the UE side. Therefore, for content not described in detail here, one may refer to the description at the corresponding position above, and details are not repeated here.

Figure 17:
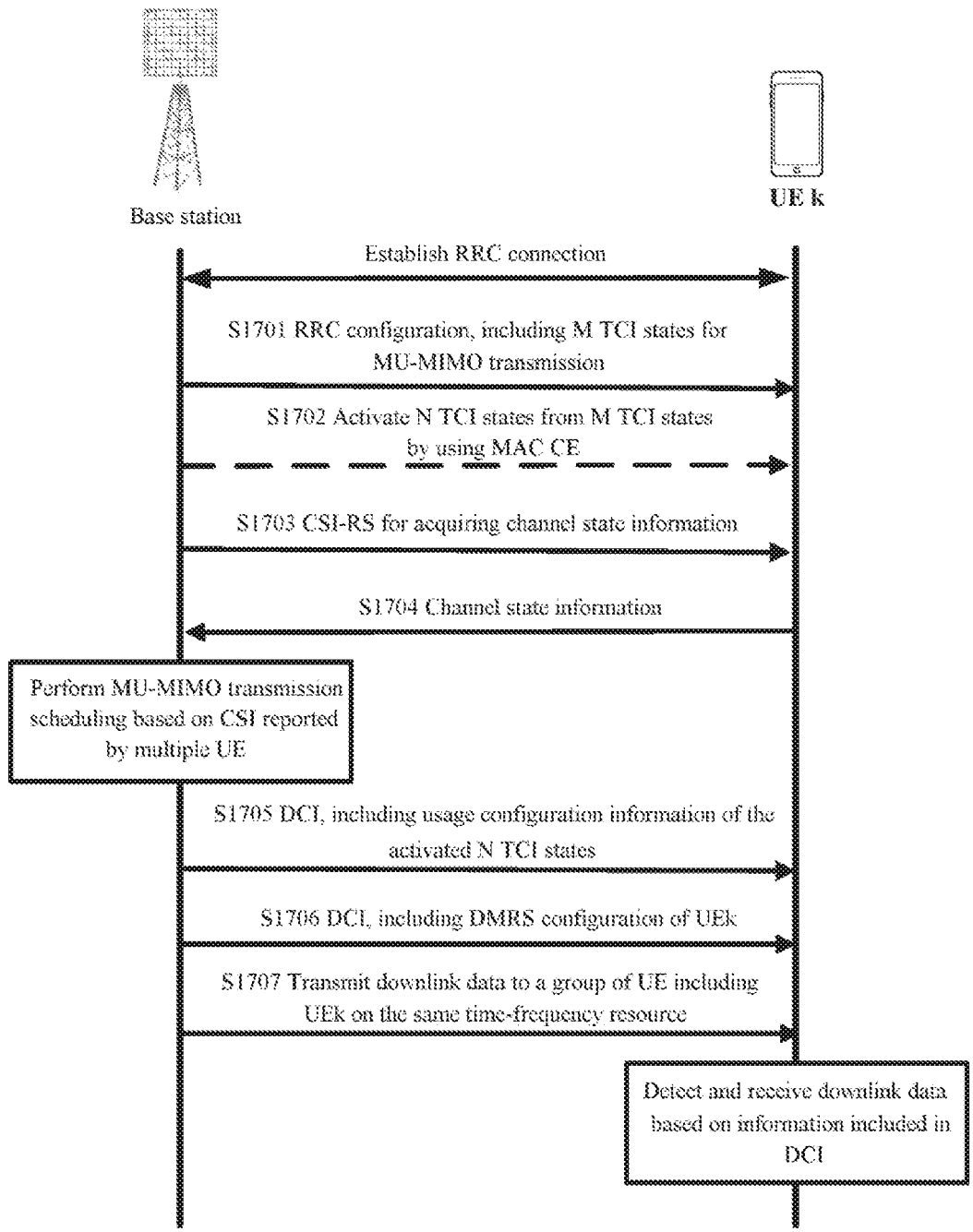
FIG. 17 is a flowchart showing signaling interaction process for implementing a third schematic scheme according to the first embodiment of the present disclosure.

In order to further understand the third schematic scheme, signaling interaction process for implementing the third schematic scheme is described below with reference to a flowchart shown in FIG. 17. FIG. 17 is a flowchart showing signaling interaction process for implementing the third schematic scheme according to the first embodiment of the present disclosure.

As shown in FIG. 17, first, after RRC connection is established, the base station configures TCI configuration for MU-MIMO transmission including for example M TCI states for user equipment k via RRC signaling, in step S1701. Then, in step S1702, the base station activates N TCI states from M TCI states, and includes information indicating activation configuration of the TCI states in MAC CE to send to the user equipment k. Subsequently, in step S1703, the base station sends downlink reference signal CSI-RS to the user equipment k to obtain channel state information, and the use equipment k sends measured channel state information to the base station in step 1704. Then, in step S1705, the base station performs MU-MIMO transmission scheduling based on channel state information reported by the user equipment device k and other user equipment in conjunction with specific network status, thus generates information indicating usage configuration of the activated N TCI states according to scheduling results, and includes the usage configuration information in for example DCI to send to the user equipment k, to indicate interference DMRS configuration in MU-MIMO transmission to the user equipment k. At the same time, in step S1706, the base station sends information including DMRS configuration of the user equipment k to the user equipment k via DCI. Subsequently, in step S1707, the base station transmits downlink data to a group of user equipment including the user equipment k simultaneously on the same transmission resource. The use equipment k can obtain its DMRS configuration and DMRS configuration of other UE in the group by decoding the received DCI, and demodulates the received data information according to the DMRS configurations.

It should be noted that, the signaling interaction process described above with reference to FIG. 17 is only schematic rather than restrictive, those skilled in the art may make amendments on the interaction process according to the principles of the present disclosure in conjunction with actual cases. For example, the order of steps in FIG. 17 is schematic rather than restrictive. For example, as described above, DCI including usage configuration information of the TCI state is sent in step S1705, and DCI including DMRS configuration of the user equipment k is sent in step S1706 respectively, and this is just to illustrate that the UE k can infer the interference DMRS configuration according to the usage configuration information including the TCI state without the DMRS configuration of the UE k itself. In practice, the two steps may be performed simultaneously. That is, two types of information is sent on the same DCI. For example, in order to avoid obscuring the subject of the present disclosure, some interaction process less related to the technology of the present disclosure is omitted. In addition, some steps in FIG. 17 may be omitted. For example, in a case that M is less, the activation operation in step S1702 (shown by a dotted line in FIG. 17) may be omitted. All such amendments shall be regarded to fall within the protection scope of the present disclosure, and are not listed one by one here.

According to the third schematic scheme of the present disclosure, DMRS configuration corresponding an interference data flow in MU-MIMO transmission is indirectly indicated to the target user equipment using the existing TCI mechanism, so that the user equipment can obtain related interference information without significantly increasing a process load and signaling overhead, thereby implementing the "non-transparent" MU-MIMO transmission, and thus being beneficial to optimize the system performance.

1-4. Fourth Schematic Scheme

In a fourth schematic scheme of the present disclosure, interference DMRS configuration in MU-MIMO transmission group is indirectly informed based on DMRS configuration of target user equipment and information related to a Code Division Multiplexing (CDM) group in which the DMRS configuration is located.

First, related concepts of the DMRS and CDM group are briefly introduced. The DMRS consists of an orthogonal sequence of Walsh code (orthogonal code), and a scrambling sequence based on a pseudo random sequence. In addition, downlink DMRSs (DL-DMRS) for different antenna ports are independent, and can be multiplexed in respective resource block pairing. DL-DMRSs are orthogonal to each other at antenna ports by using CDM and/or Frequency Division Multiplexing (FDM). DL-DMRSs are code division multiplexed with the orthogonal codes in the CDM group. DL-DMRSs are frequency division multiplexed between CDM groups. DL-DMRSs in the same CDM group are mapped to the same resource element. DL-DMRSs in the same CDM group use different orthogonal sequences between the antenna ports, and the orthogonal sequences are orthogonal to each other. DL-DMRSs for downlink data channel PDSCH can use a part or all of at most 12 antenna ports (antenna ports 1000 to 1011). That is, in a case of singe user-multiple input multiple output (SU-MIMO) transmission, the PDSCH associated with DL-DMRS can transmit at most 8 ranks of MIMO. In a case of MU-MIMO transmission, at most 4 ranks are allocated for each UE, and at most 12 ranks are allocated for all UE DL-DMRS for the downlink control channel PDCCH uses, for example, a part or all of 4 antenna ports (antenna ports 1007 to 1010). In addition, the DL-DMRS can change the diffusion coding length and the number of mapped resource elements of the CDM according to the number of ranks of associated channels.

Figure 18:
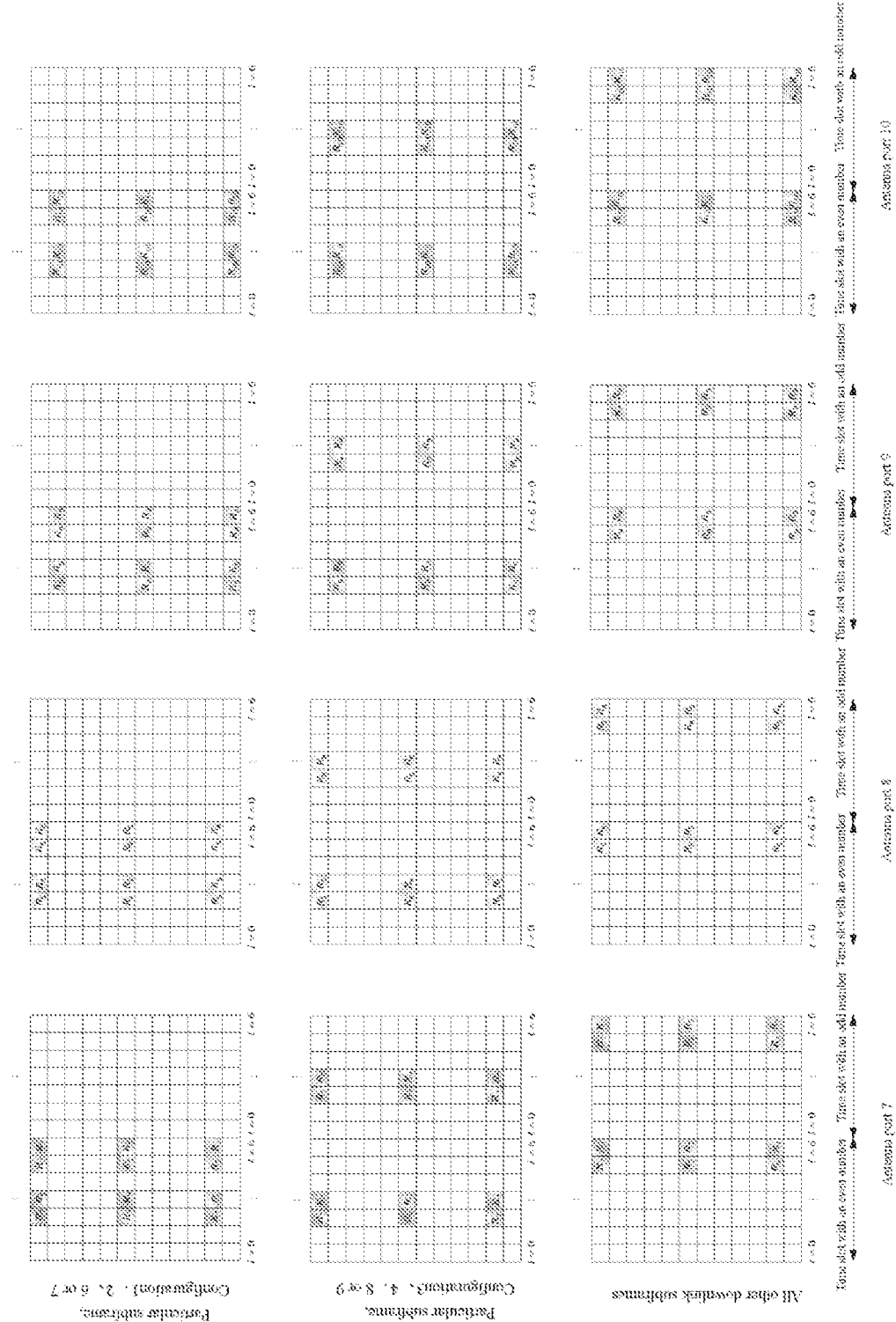
FIG. 18 is a schematic diagram of an example showing mapping patterns of DMRS ports 7-10 on resource elements (RE)

FIG. 18 is a schematic diagram showing an example of mapping patterns of DMRS ports 7 to 10 on resource elements (RE). In FIG. 18, shadow filled cells indicate resource elements mapped to the antenna ports 7 to 10 (that is, the DMRS ports 7 to 10). Specifically, in LTE, as shown in FIG. 18 for example, DMRS ports 7 and 8 in the same CDM group are mapped to the same resource elements, and thus codeword [+1 +1 +1 +1] and codeword [+1 −1 +1 −1] are used in a CDM group CDM4. DMRS ports 9 and 10 are mapped to the same resource elements, and codeword [+1 +1 +1 +1] and codeword [+1 −1 +1 −1] are used in the CDM group CDM4.

Generally, in a case that a DMRS port and a CDM group in which the DMRS port is included are determined, other DMRS ports included in the CDM group are also determined. In view of this, in the fourth schematic scheme of the present disclosure, the base station may inform the target UE of usage of all or a part of codewords in a CDM group in which the target UE is included via for example DCI, and thus indirectly informs the target UE of usage of respective DMRS ports in the MU-MIMO transmission. For example, if in the CDM4, the base station allocates DMRS port 7 to the target UE via DCI and informs the target UE of a case that all codewords in the CDM group are used by DMRS ports for MU-MIMO transmission, the target UE can infer that other DMRS ports 8, 11, 13 are interference ports in the MU-MIMO transmission, and thus performs interference removing and data demodulating to recover a target data flow, thereby implementing the "non-transparent" MU-MIMO transmission.

Configuration examples at the UE side and the base station side for implementing the fourth schematic scheme are respectively described in detail hereinafter.

Figure 19:
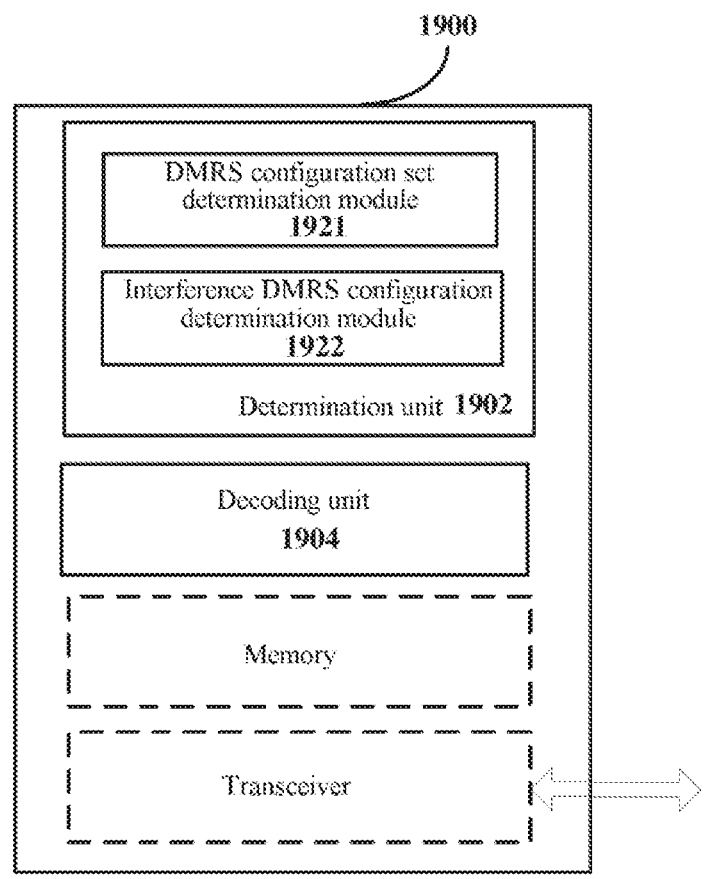
FIG. 19 is a block diagram of another example showing the functional configuration of the device at the UE side according to the first embodiment of the present disclosure.

FIG. 19 is a block diagram showing another example of the functional configuration of the device at the UE side according to the first embodiment of the present disclosure.

As shown in FIG. 19, a device 1900 according to this example may include a determination unit 1902 and a decoding unit 1904. A functional configuration example of the decoding unit 1904 is substantially the same as the functional configuration example of the decoding unit 304 described above with reference to FIG. 3, and details are not repeated here.

The determination unit 1902 may include a DMRS configuration set determination module 1921 and an interference DMRS configuration determination module 1922.

The DMRS configuration set determination module 1921 may be configured to determine a DMRS configuration set corresponding to a CDM group for MU-MIMO transmission.

Presently. NR supports CDM2, CDM4 and CDM8. After RRC connection is established, the base station may notify, for example via UE-specific high layer RRC signaling, the target UE of a CDM group in which a DMRS port configured for the target UE is included, that is, which of CDM2, CDM4 and CDM8. In addition, in the RRC layer, if a type of the DMRS configuration is determined, a relationship between DMRS and the CDM group is also determined. For example, generally, a DMRS associated with PDSCH mainly supports CDM4. In this way, the DMRS configuration set determination module 1921 at the UE side can obtain the CDM group for MU-MIMO transmission of a data channel by decoding high layer signaling from the base station, and thus uniquely determine a DMRS configuration set corresponding to the CDM group.

The interference DMRS configuration determination module 1922 may be configured to determine DMRS configuration of other user equipment as interference DMRS interference, according to configuration information on the CDM group included in the control information.

For example, the configuration information on the CDM group may include information indicating whether all codewords are used by the DMRS ports for MU-MIMO transmission. For example, the configuration information may be indicated by a bit of information, 1 indicates that all codewords are used, and 0 indicates that a part of codewords are used. The interference DMRS configuration determination module 1922 may determine DMRS configuration other than the DMRS configuration of the target UE in the DMRS configuration set as the interference DMRS configuration, when determining that all codewords in the CDM groups are used according to the configuration information.

In another aspect, if the configuration information indicates that not all codewords in the CDM group are used, it is required to determine codewords used and codewords not used according to additional information, to determine the interference DMRS configuration.

Preferably, the configuration information on the CDM group included in control information from the base station may be information indicating usage of codewords in the CDM group. The information may be bitmap information, preferably. For example, a codewrod occupied by the DMRS port is indicated as 1 in a bitmap, and a codeword not occupied by the DMRS port is indicated as 0 in the bitmap. For example, if bitmap information corresponding to the CDM 4 is "1010", it is indicated that codewords [+1 +1 +1 +1] and [+1 −1 +1 −1] in the CDM4 are occupied by two interference DMRS ports, and two remaining codewords [+1 +1 −1 −1] and [−1 +1 −1 −1] are not occupied.

In this way, the interference DMRS configuration determination module 1922 may determine occupied codewords in the CDM group according to bitmap information indicating usage of codewords in the CDM group included in the control information, and thus determine a DMRS port corresponding the occupied codeword in the DMRS configuration set as the interference DMRS port.

It can be seen that, the usage of codewords in the CDM group is notified by the bitmap, so that the solution according to the present disclosure can adapt to both the case that a part of the CDM group is used and the case that the entire CDM group is used. However, in the latter case, as described above, the usage may be indicated by information "1" of 1 bit for example, thus signaling overhead of the bitmap information can be saved, particularly in the case of CDM 4 and CDM8. Therefore, in actual implementation, the two manners for information notification may be combined. For example, in a case that it is determined that the entire CDM group is used according to information of 1 bit, the interference DMRS configuration can be directly inferred according to the DMRS configuration of the target UE. In a case that it is determined that a part of the CDM group is used according to information of 1 bit, the interference DMRS may be determined further based on bitmap information indicating specific usage of the CDM group.

Corresponding to the configuration example at the UE side, a configuration example at the base station side is described hereinafter.

Figure 20:
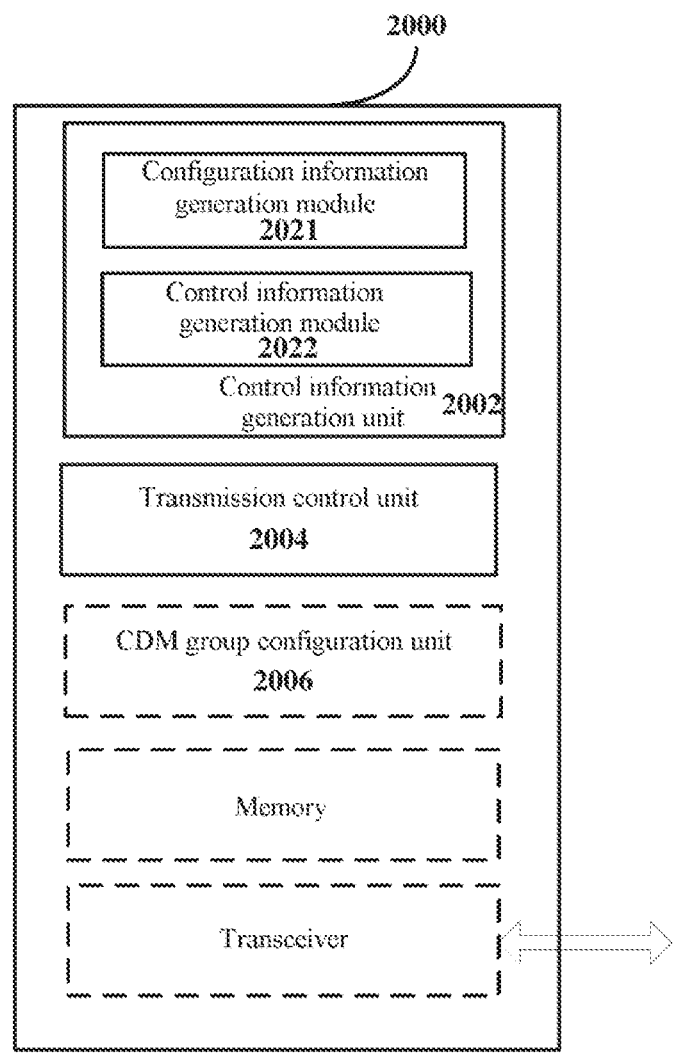
FIG. 20 is a block diagram of another example showing the functional configuration at the base station side according to the first embodiment of the present disclosure.

FIG. 20 is a block diagram showing another example of the functional configuration at the base station side according to the first embodiment of the present disclosure.

As shown in FIG. 20, a device 200) according to this example may include a control information generation unit 2002 and a transmission control unit 2004. A functional configuration example of the transmission control unit 2004 is substantially the same as the functional configuration example of the transmission control unit 404 described above with reference to FIG. 4. Details are not repeated here.

The control information generation unit 2002 may include a configuration information generation module 2021 and a control information generation module 2022.

The configuration information generation module 2021 may be configured to generate configuration information on a CDM group for MU-MIMO transmission, according to DMRS configurations of a group of user equipment performing MU-MIMO transmission. In a schematic implementation, the configuration information may be used to indicate whether an entire DMRS configuration set corresponding to the CDM group is used for the MU-MIMO transmission, that is, indicating whether all codewords in the CDM group are used by interference DMRS ports in the MU-MIMO transmission. For example, 1 indicates that all codewords are used, and 0 indicates that a part of codewords are used.

The control information generation module 2022 may be configured to generate control information by including the configuration information on the CDM group and DMRS configuration of target UE, to indirectly indicate the interference DMRS configuration in the MU-MIMO transmission. The control information may be sent to the target UE via for example UE-specific DCI of a physical layer. In a case that the configuration information in the received control information indicates that the entire CDM group is used, the target UE may determine DMRS configuration other than DMRS configuration of the target UE in the DMRS configuration set corresponding to the CDM group as the interference DMRS configuration.

In another aspect, as described above, a part of the codewords in the CDM group may be used. Preferably, in another schematic implementation, the configuration information generated by the configuration information generation module 2021 may include bitmap information indicating usage of the codewords in the CDM group. For example, 1 indicates that the codeword is used by the interference DMRS port, and 0 indicates that the codeword is not used by the DMRS port. The control information generation module 2022 may generate the control information by including the configuration information in a bitmap form, and sends the control information to the target UE via for example UE-specific DCI of the physical layer, to indirectly indicate the interference DMRS configuration to the target UE.

In addition, preferably, the device 200 may further include a CDM group configuration unit 2006 configured to configure a CDM group for MU-MIMO transmission to the target UE.

The CDM group configuration unit 2006 may be configured to, for the target UE, generate information indicating the CDM group for MU-MIMO transmission, to indicate which of CDM2. CDM4 and CDM4 is used. The indication information may be included in for example high layer RRC signaling to send to the target UE.

It should be understood that, for different CDM groups (CDM2/4/8), the configuration information, for example in the form of bitmap described above, indicating the usage of codewords in the CDM group included in the DCI may have different lengths. Therefore, the base station informs the user equipment of the used CDM group in advance via RRC, and the user equipment can interpret bitmap information with different lengths in the DCI according to the RRC configuration, thereby avoiding information demodulation failure.

In addition, it should be noted that, the configuration example at the base station side described here with reference to FIG. 20 corresponds to the configuration example at the UE side. Therefore, for contents not described here, one may refer to the description at the above corresponding position, and details are not repeated here.

Figure 21:
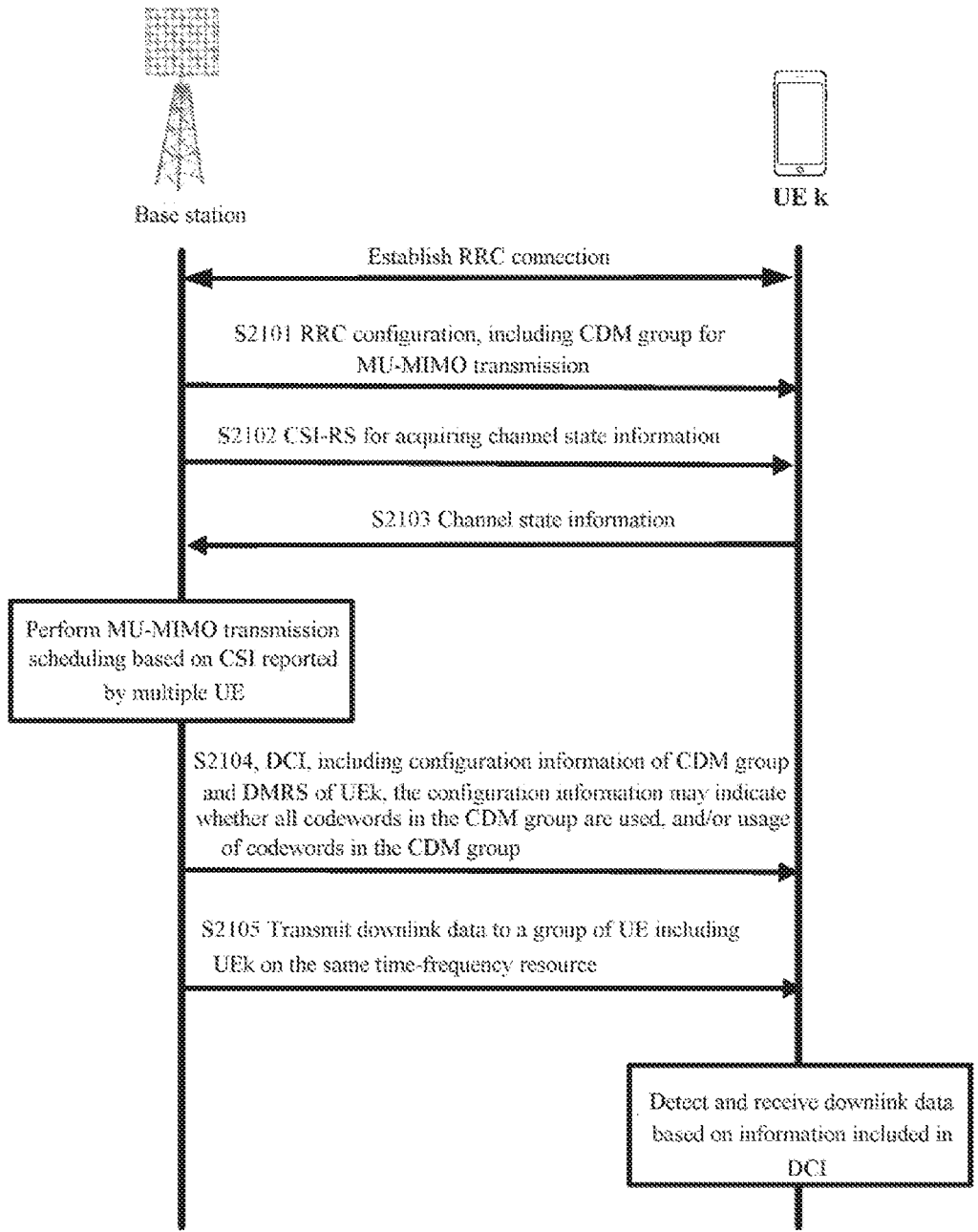
FIG. 21 is a flowchart showing signaling interaction process for implementing a fourth schematic scheme according to the first embodiment of the present disclosure.

In order to further understand the fourth schematic scheme, signaling interaction process for implementing the fourth schematic scheme is described below with reference to a flowchart shown in FIG. 21. FIG. 21 is a flowchart showing signaling interaction process for implementing the fourth schematic scheme according to the first embodiment of the present disclosure.

As shown in FIG. 21, first, after an RRC connection is established, a base station configures a CDM group for MU-MIMO transmission for user equipment k via RRC signaling, in step S2101. Then, in step S2102, the base station sends downlink reference signal CSI-RS to the user equipment k to obtain channel state information. In step S2103, the user equipment k sends measured channel state information to the base station. Then, in step S2104, the base station performs MU-MIMO transmission scheduling based on channel state information reported by the user equipment k and other user equipment in conjunction with a specific network state, thus generates configuration information indicating the CDM group according to a scheduling result, and includes the configuration information and DMRS configuration of the user equipment k in for example DCI to send to the user equipment k. The configuration information may include information of 1 bit indicating whether all codewords in the CDM group are used, and/or bitmap information indicating usage of the codewords in the CDM group, to indicate interference DMRS configuration in MU-MIMO transmission to the user equipment k. Subsequently, in step S2105, the base station transmits downlink data to a group of user equipment including the user equipment k simultaneously on the same transmission resource. The user equipment k can obtain its DMRS configuration and DMRS configuration of other UE in the group by decoding the received DCI, and thus demodulates the received data information according to the DMRS configurations.

It should be understood that, the signaling interaction process described above with reference to FIG. 21 is only schematic rather than restrictive. Those skilled in the art may make amendments on the above signaling interaction process according to the principle of the present disclosure further based on actual cases. For example, the order of steps in FIG. 21 is schematic rather than restrictive. For example, in order to avoid obscuring the subject of the present disclosure, some interaction process less related to the technology of the present disclosure is omitted in the above flowchart. All such amendments shall be regarded to fall in the protection scope of the present disclosure, which are not listed one by one here.

It can be seen that according to the fourth schematic scheme described above, the target UE is notified of the DMRS configuration of the target UE and the usage of the CDM group including the DMRS configuration, according to the determined correspondence of various types between DMRS configurations and CDM groups, so that the user equipment obtains the related interference information without significantly increasing the processing load and signaling overhead, to achieve the "non-transparent" MU-MIMO transmission, thereby being beneficial to optimize the system performance.

It should be noted here that, according to the first to the fourth schematic scheme, interference condition for MU-MIMO transmission is indirectly informed to the user equipment according to the first embodiment of the present disclosure, thereby achieving the "non-transparent" MU-MIMO transmission for the downlink data channel. It should be understood that, the schematic schemes are preferable implementations rather than restrictive. Those skilled in the art may make appropriate amendment or combination on the schemes according to the principle of the present disclosure, and such variation shall be regarded as falling within the scope of the present disclosure.

2. MU-MIMO Transmission for Downlink Control Channel (Second Embodiment)

MU-MIMO transmission for downlink control channel according to a second embodiment of the present disclosure is described hereinafter. The MU-MIMO transmission for downlink control channel refers to that downlink control channels of multiple different user equipment (that is, UE-specific PDCCH) are superposed on the same time and frequency resource to perform transmission, so as to improve utilization efficiency of the time and frequency resource.

As described above, in the conventional technology, only a control channel for a certain UE (that is, UE-specific PDCCH) is transmitted at a certain time and frequency resource, and control channels for multiple UE are not superposed on the same time and frequency resource to perform transmission as the data channel. The reason is recognized by the inventor as follows. As described in the first embodiment, MU-MIMO transmission for the data channel of the target UE may be assisted by control signaling (for example UE-specific DCI) carried by the control channel UE-specific PDCCH of the target UE. For example, control information related to the MU-MIMO transmission for the data channel (including DMRS configuration of the target UE and information directly or indirectly indicating the interference DMRS configuration) is included in UE-specific DCI. However, if MU-MIMO transmission is also performed for a control channel of the user equipment itself, the control channel cannot be used to provide control information related to its MU-MIMO transmission, that is, DMRS configuration corresponding to the UE-specific PDCCH of the target UE and optionally DMRS configuration corresponding to UE-specific PDCCH of other UE. For the above problem, no solution for efficiently achieving the MU-MIMO transmission of the control channel is put forward in the conventional technology.

In the NR system, it is supported to carry information on a time slot structure by using group common PDCCH (GC-PDCCH), for example slot format indicator (SFI).

It is required to simply illustrate a relationship between GC-PDCCH and common search space (CSS). For CSS, all UE may try to perform blind decoding, and for UE-specific search space, the UE may try to perform blind decoding only in a case that the UE is configured in advance. The GC- PDCCH in the present disclosure may be located in CSS, and thus is easily decoded by UE in a group of UE.

In the second embodiment of the present disclosure, control information related to MU-MIMO transmission for the control channel can be carried by using GC-PDCCH. That is, in the embodiment of the present disclosure, GC-PDCCH includes not only time slot information such as SFI, but also includes control information for controlling MU-MIMO transmission of the control channel. The base station may configure time and frequency resource available to GC-PDCCH for the user equipment via RRC. The user equipment receives GC-PDCCH by detecting on the corresponding time and frequency resource, so as to obtain control information related to MU-MIMO transmission for the control channel from GC-PDCCH, and thus recovers its UE-specific PDCCH from the received superposed signal flow according to the control information. The structure for sending GC-PDCCH and UE-specific PDCCH to the user equipment may also be referred to as dual-stage DCI structure. In order to facilitate understanding the process, signaling interaction process of the dual-stage DCI structure for implementing MU-MIMO transmission of the control channel is briefly described with reference to a flowchart shown in FIG. 22.

Figure 22:
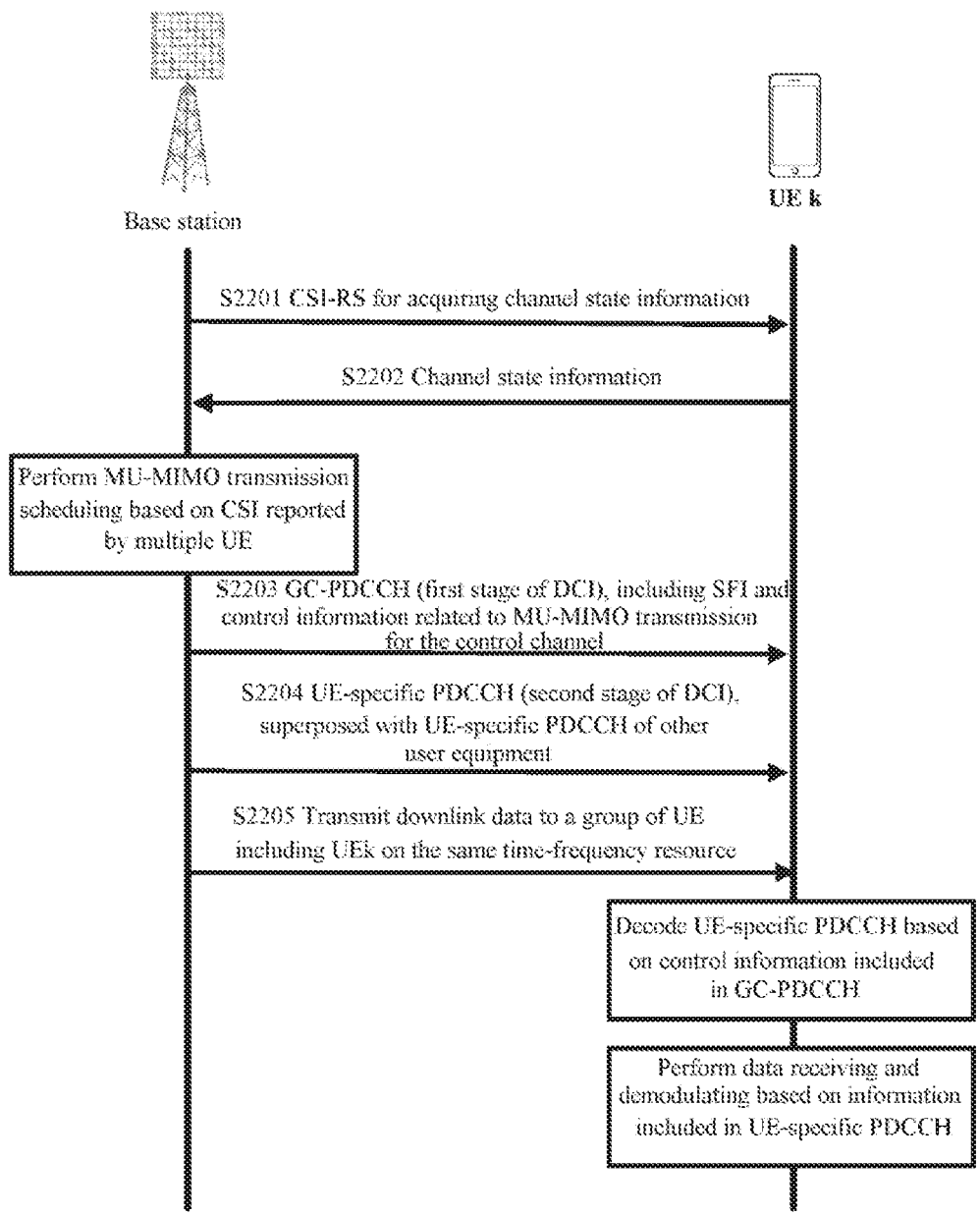
FIG. 22 is a flowchart showing signaling interaction process for implementing dual stage DCI structure for MU-MIMO transmission of a control channel according to a second embodiment of the present disclosure.

As shown in FIG. 22, first, in step S2201, the base station sends downlink reference signal CSI-RS to user equipment k to obtain channel state information. The user equipment k sends measured channel state information to the base station in step S2202. Then, in step S2203, the base station performs MU-MIMO transmission scheduling based on channel state information reported by the user equipment k and other user equipment in conjunction with a specific network state, and sends GC-PDCCH (a first stage of DCI) to the user equipment k according to a scheduling result. The GC-PDCCH includes SFI and control information related to MU-MIMO transmission of the control channel. Then, in step S2204, the base station sends its UE-specific PDCCH (a second stage of DCI) to the user equipment k. Different from the conventional technology, the UE-specific PDCCH and UE-specific PDCCH of other user equipment in the group for MU-MIMO transmission are superposed on the same time and frequency resource to perform transmission. Therefore, a signal received by the user equipment includes not only its UE-specific PDCCH, but also includes superposed UE-specific PDCCH of other user equipment. Subsequently, in step S2205, the base station sends a data flow to the user equipment k, and the data flow and a data flow of other user equipment in the group for MU-MIMO transmission are superposed to perform transmission. In this way, the user equipment k recovers its UE-specific PDCCH from the received superposed signal flow according to control information related to MU-MIMO transmission included in the received GC-PDCCH, and then recovers a target data flow from the received superposed data flow according to control information related to MU-MIMO transmission of the data channel included in UE-specific PDCCH. For the process of demodulating the target data flow according to the control information related to MU-MIMO transmission of the data channel included in UE-specific PDCCH, one may refer to the solution in the first embodiment or other solutions in the conventional technology may be adopted. Details are not repeated in the second embodiment.

It should be noted here that, in the flowchart shown in FIG. 22, both the MU-MIMO transmission for the control channel and the MU-MIMO transmission for the data channel are described, this is only schematic rather than restrictive, and the two types of transmission may be performed independently. Even if the two types of transmission are performed simultaneously, the MU-MIMO manner for the control channel may differ from the MU-MIMO manner for the data channel. For example, it is assumed that UE-specific PDCCH of one UE includes only one layer in MU-MIMO transmission, and data information of the UE includes multiple layers in MU-MIMO transmission. Specifically, for example, it is assumed that three UE performs MU-MIMO transmission, the MU-MIMO transmission of the control channel may include only three layers, each layer belongs to one UE; and the MU-MIMO transmission of the data channel may include 6 layers, each UE includes two layers of data flow.

In addition, DMRS configuration for transmitting PDCCH (also referred to as PDCCH associated DMRS configuration) may differ from DMRS configuration for transmitting PDSCH (also referred to as PDSCH associated DMRS configuration). For example, the PDCCH associated DMRS is sent with one or more of antenna ports 107 to 114, and the PDSCH associated DMRS is sent with one or more of antenna ports 7 to 14.

In addition, it should be noted that, the number of layers occupied by UE-specific PDCCH of one UE in MU-MIMO transmission is not limited, which may be one or more. That is, one or more DCIs for one UE may exist in one time slot.

Configuration examples of the UE side and the base station side for implementing schemes of MU-MIMO transmission for the control channel by assisting with GC-PDCCH according to the second embodiment of the present disclosure are described in detail below.

Figure 23:
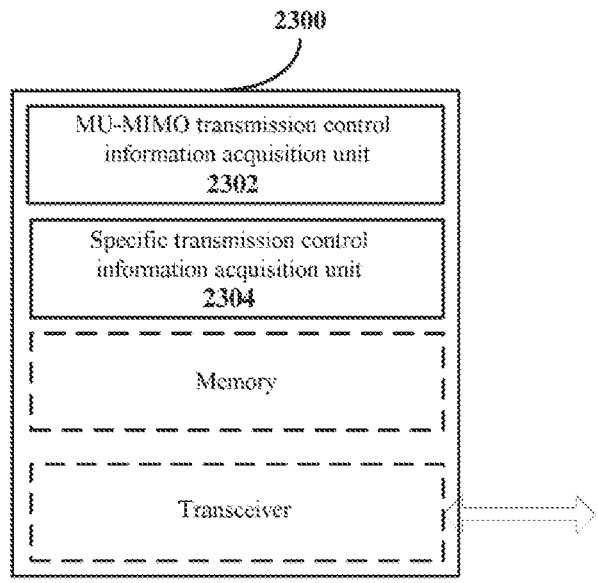
FIG. 23 is a block diagram of an example showing functional configuration of a device at a UE side according to the second embodiment of the present disclosure.

FIG. 23 is a block diagram showing an example of functional configuration of a device at a UE side according to the second embodiment of the present disclosure.

As shown in FIG. 23, a device 2300 according to this example may include MU-MIMO transmission control information acquisition unit 2302 and specific transmission control information acquisition unit 2304.

It should be noted that, functional units in the device shown in FIG. 23 only represent logic modules divided according to the implemented specific functions, and are not intended to limit the implementations. In an actual implementation, the functional units and modules may be implemented as independent physical entities, or may be implemented by a single entity (for example a processor (CPU or DSP), an integrated circuit), which also adapts to description of other configuration examples at the UE side later. Configuration examples of the functional units are described in detail in the following.

The MU-MIMO transmission control information acquisition unit 2302 may be configured to decode for GC-PDCCH of a group of user equipment including target user equipment, to obtain control information related to MU-MIMO transmission for control channels of the group of user equipment.

GC-PDCCH from the base station may include control information related to MU-MIMO transmission of the group of user equipment where respective UE-specific PDCCHs are superposed together. The control information may, for example, include information related to DMRS configuration corresponding to UE-specific PDCCH of each UE, including a DMRS port number, scrambling ID and a layer number or may be information of a pseudo random sequence and corresponding orthogonal cover code (CCC) for generating DMRS.

The specific transmission control information acquisition unit 2304 may be configured to decode, according to the acquired control information on MU-MIMO transmission, UE-specific PDCCH of the target UE which is superposed with UE-specific PDCCH of other user equipment on the same transmission resource to perform transmission, to acquire transmission control information related to the target UE.

PDCCH associated DMRS is sent by using subframes and frequency bands for sending DMRS associated PDCCH. DMRS is used to demodulate DMRS associated PDCCH. PDCCH is sent by using an antenna port for sending DMRS. Therefore, similar to the data information, after obtaining at least DMRS configuration corresponding to UE-specific PDCCH of the target UE, the target UE can recover its UE-specific PDCCH from the received superposed signal flow, to obtain target UE-specific transmission control information. The specific transmission control information may be used to perform transmission control on physical downlink shared channel (PDSCH) and physical uplink shared channel (PUSCH), and may be also used to perform future transmission control on sidelink, for example, transmission control on sidelink-shared channel (SL-SCH) and physical sidelink control channel (PSCCH). The transmission control here includes resource allocation, transmission format/modulation coding format, hybrid automatic repeat transmission request (HARQ) information, DMRS allocation and so on.

It should be noted here that, the device 2300 at the UE side may be implemented as a chip or a device. For example, the device 2300 may functions as the UE, and may include an external device such as a memory and a transceiver (optional, shown by a dotted line block in FIG. 23). The memory may be configured to store program and related data information for implementing various functions by the user equipment. The transceiver may include one or more communication interfaces to support communication with different devices (for example, a base station, other user equipment), and the implementation of the transceiver is not limited, which also adapts to the description of other configuration example of the UE side described later.

Figure 24:
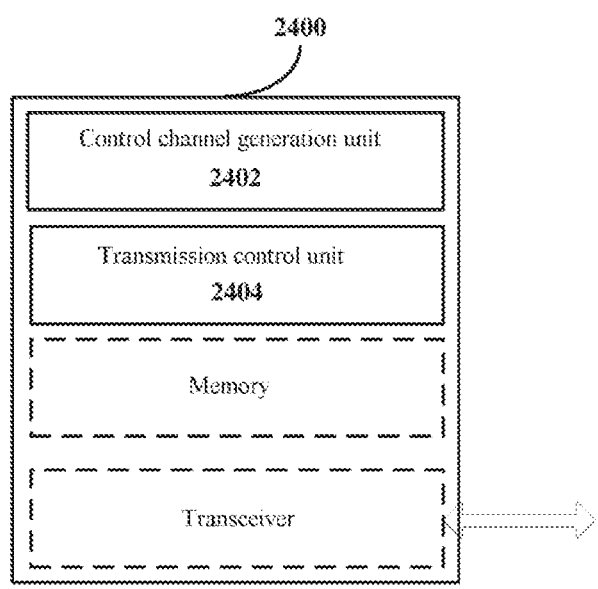
FIG. 24 is a block diagram of an example showing functional configuration of a device at a base station side according to the second embodiment of the present disclosure.

Corresponding to the configuration example of the device at the UE side shown in FIG. 23, a configuration example of the base station side is further provided according to the present disclosure. FIG. 24 is a block diagram showing a functional configuration example of the base station side according to the second embodiment of the present disclosure.

As shown in FIG. 24, a device 2400 according to this example may include a control channel generation unit 2402 and a transmission control unit 2404.

Similarly, it should be noted that functional units in the device shown in FIG. 24 only represent logic modules divided according to the implemented specific functions, and are not intended to limit the implementations. In an actual implementation, the functional units and modules may be implemented as independent physical entities, or may be implemented by a single entity (for example a processor (CPU or DSP), an integrated circuit), which also adapts to description of other configuration examples at the base station side later. Configuration examples of the functional units are described in detail in the following.

The control information generation unit 2402 may be configured to generate group common physical downlink control channel (GC-PDCCH) for a group of user equipment and UE-specific physical downlink control channel (UE-specific PDCCH) for each of the group of user equipment. In which, the GC-PDCCH includes control information related to multiple user multiple input multiple output (MU-MIMO) for control channels of all user equipment in the group of user equipment. The control information may include, for example, DMRS configuration corresponding to UE-specific PDCCH of each user equipment.

The transmission control unit 2404 may be configured to send the generated GC-PDCCH to the group of user equipment, and control the base station, based on the control information related to MU-MIMO transmission for the control channel in GC-PDCCH, to send respective UE-specific PDCCH to all user equipment simultaneously on the same transmission resource.

It should be noted that, the configuration example of the device at the base station side described here corresponds to the configuration example of the device at the UE side. For content not described in detail here, one may refer to the description at the above corresponding position, and details are not repeated here.

In addition, it should be noted that the device 2400 at the base station side may be implemented as a chip or a device. For example, the device 2400 may function as the base station, and may include external devices such as a memory, a transceiver (optionally, shown by dotted line block in FIG. 24). The memory may be configured to store programs to be executed to achieve various function by the base station and related data information. The transceiver may include one or more communication interfaces to support communication with different devices (for example the UE, other base station). The implementation of the transceiver is not limited here. This also adapts to the description of other configuration examples for the base station side later.

In addition to the time slot information such as SFI, GC-PDCCH according to the technology of the present disclosure further incudes control information related to MU-MIMO transmission for the control channel. However, as described above, GC-PDCCH relates to all UE, that is, all UE may try to decode GC-PDCCH. The included MU-MIMO transmission control information relates to only a group of user equipment, for whose control channel, MU-MIMO transmission is performed. Therefore, preferably, in order to avoid decoding to obtain the control information by UE other than the group of UE, scrambling is to be performed on the GC-PDCCH. The conventional DCI scrambling technology is briefly introduced below.

A cyclic redundancy check (CRC) parity bit is added for DCI. The CRC parity bit is scrambled by radio network temporary identifier (RNTI). The RNTI is an identifier which can be specified or set according to objects of DCI and so on. The RNTI is an identifier pre-specified according to standard, an identifier set as cell-specific information, an identifier set as terminal device-specific information, or an identifier set as information specific to a group to which the terminal device belongs. For example, during monitoring of PDCCH, the terminal device descrambles the CRC parity bit added to the DCI with predetermined RNTI, to identify whether CRC is correct. In a case that the CRC is correct, it can be determined that the DCI is DCI for the terminal device.

In the present disclosure, a group common identifier for specifically scrambling control information related to MU-MIMO transmission for the control channel in GC-PDCCH is put forward. According to a scrambling object, the group common identifier may be referred to as MU-PDCCH RNTI or MU-MIMO RNTI, to distinguish from RNTI for other objects. For example, an identifier for scrambling SFI in GC-PDCCH may be referred to as SFI RNTI.

Figure 25:
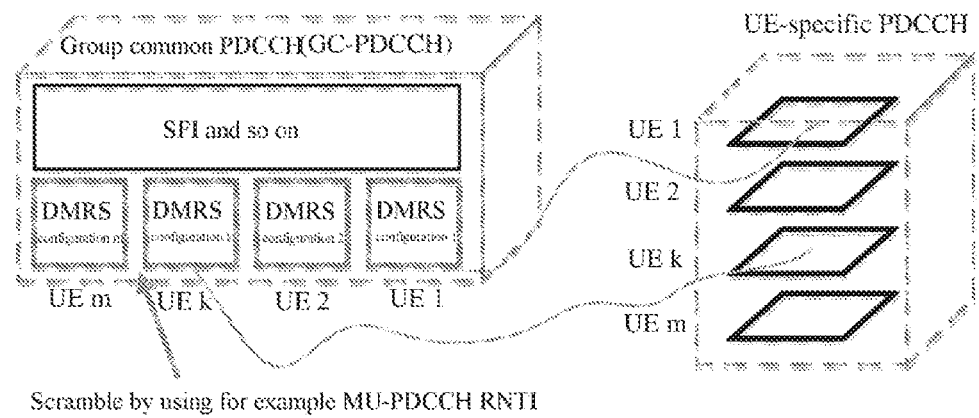
FIG. 25 is a schematic diagram showing a schematic architecture of GC-PDCCH, and a relationship between the GC-PDCCH and UE-specific PDCCH according to the second embodiment of the present disclosure.

In order to further understand the technology of the present disclosure, a relationship between GC-PDCCH and UE-specific PDCCH and information included in GC-PDCCH are described below with reference to FIG. 25. FIG. 25 is a schematic diagram showing a schematic structure of GC-PDCCH and a relationship between GC-PDCCH and UE-specific PDCCH according to the second embodiment of the present disclosure.

In an example shown in FIG. 25, MU-MIMO transmission of the control channel includes four layers. As shown by the right side of FIG. 25, specific transmission control information for four UE is superposed in UE-specific PDCCH received by the UE. From top to bottom, transmission control information for UE 1, UE 2, UE k and UE m are sequentially shown. The left side of FIG. 25 shows group common PDCCH, including information such as SFI and MU-MIMO transmission control information scrambled with, for example, MU-PDCCH RNTI. Four blocks in the MU-MIMO transmission control information respectively indicate DMRS configuration associated with UE-specific PDCCH of UE 1, UE 2, UE k and UE m (including DMRS port number, scrambling ID and layer number). It is assumed that DMRS configurations corresponding to UE 1. UE 2, UE k and UE m are referred to as DMRS configuration 1, DMRS configuration 2, DMRS configuration k and DMRS configuration m. In this case, the UE K may try to demodulate to recover its transmission control information from the received UE-specific PDCCH after obtaining at least its RMRS configuration k by decoding GC-PDCCH.

In the following description, as an example, a scrambling scheme for control information related to MU-MIMO transmission of the control channel in GC-PDCCH is described in detail in conjunction with a first schematic scheme, a second schematic scheme and variations of the second schematic scheme.

2.1 First Schematic Scheme

Figure 26:
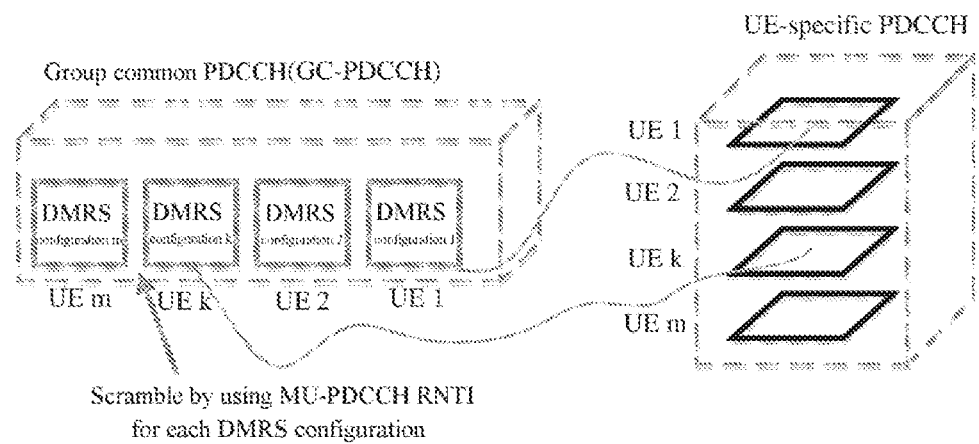
FIG. 26 is a schematic diagram showing a first schematic scheme according to the second embodiment of the present disclosure.

In the first schematic scheme according to the present disclosure, DMRS configuration of each UE included in GC-PDCCH is scrambled by using group common identifier MU-PDCCH RNTI. FIG. 26 is a schematic diagram showing the first schematic scheme according to the second embodiment of the present disclosure.

It should be noted that, in the schematic diagram shown in FIG. 26, information such as SFI included in GC-PDCCH is omitted for clarity, and only parts closely related to the technology of the present disclosure are shown.

As shown in FIG. 26, DMRS configurations of UE 1, UE 2, UE k and UE m included in GC-PDCCH are scrambled with MU-PDCCH RNTI respectively. Since the group common identifier MU-PDCCH RNTI is known to a group of user equipment performing MU-MIMO transmission (for example, the base station may configure MU-PDCCH RNTI for user equipment which may participate in MU-MIMO transmission in advance via for example high layer RRC signaling), UE 1, UE 2, UE k and UE m each may descramble the scrambled GC-PDCCH with the MU-PDCCH RNTI, thereby obtaining four DMRS configurations. However, in this case, each UE does not know which DMRS configuration is its DMRS configuration or which DMRS configuration is interference DMRS configuration. Therefore, the user equipment may try to perform blind decoding on UE-specific PDCCH based on the acquired all DMRS configurations. That is, the user equipment perform different interference DMRS configuration assumption to try whether UE-specific PDCCH can be decoded, and verifies information obtained by decoding with UE-specific identifiers (for example, cell radio network temporary identifier C-RNTI). That is, the CRC parity bit of the UE-specific PDCCH is descrambled with C-RNTI, to identify whether CRC is correct. If the CRC is correct, the verification is successful, and it is indicated that the decoded information is the transmission control information for the user equipment itself.

It may be seen that, in the first schematic scheme, DMRS configurations of all user equipment in the MU-MIMO transmission group are scrambled with the group common identifier MU-PDCCH RNTI. This scrambling scheme may be referred to as "one stage scrambling scheme". Each user equipment may obtain DMRS configuration of the whole group by decoding GC-PDCCH with MU-PDCCH RNTI, and decode UE-specific PDCCH by performing interference removing based on different interference DMRS assumptions. That is, the user equipment knows not only its DMRS configuration, but also DMRS configuration of the interference UE. Therefore, the first schematic scheme is equivalent to the "non-transparent" MU-MIMO transmission of the control channel.

Configuration examples of the UE side and the base station side for implementing the first schematic scheme are described in detail below.

Figure 27:
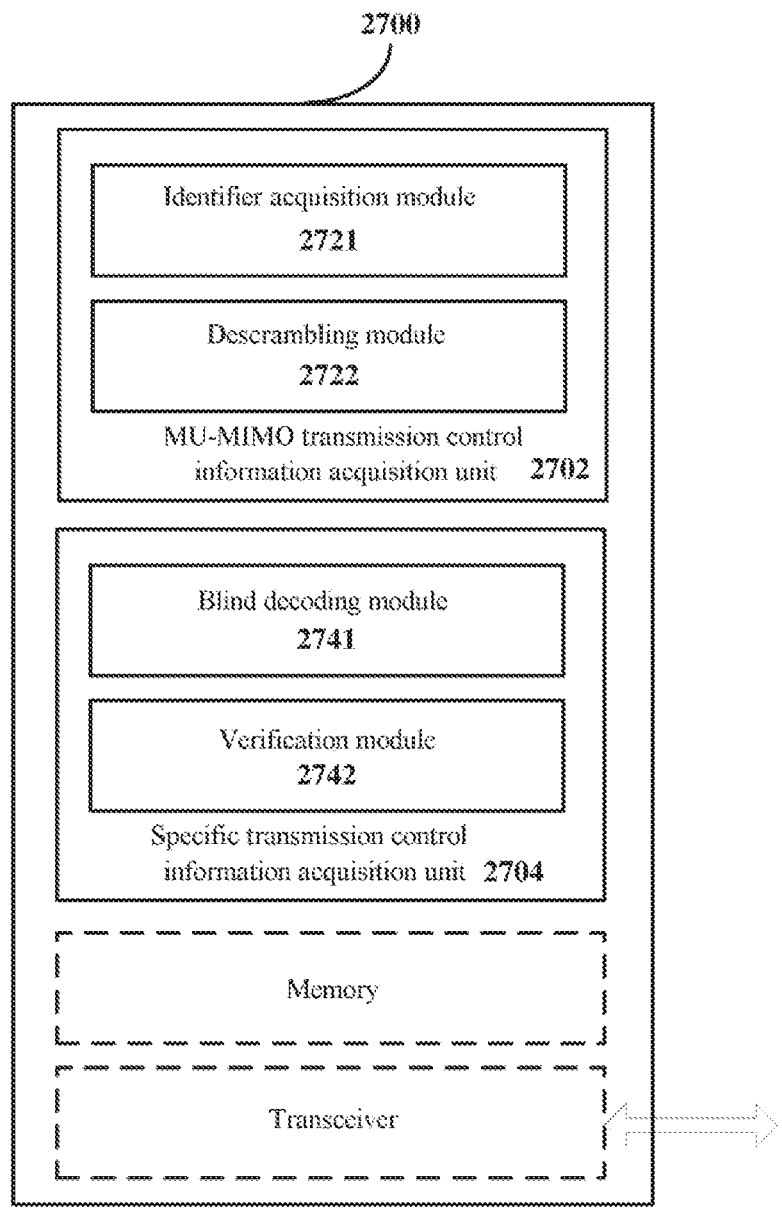
FIG. 27 is a block diagram of another example showing the functional configuration of the device at the UE side according to the second embodiment of the present disclosure.

FIG. 27 is a block diagram showing another example of the functional configuration at the UE side according to the second embodiment of the present disclosure.

As shown in FIG. 27, a device 2700 according to this example may include a MU-MIMO transmission control information acquisition unit 2702 and a specific transmission control information acquisition unit 2704.

The MU-MIMO transmission control information acquisition unit 2702 may be configured to decode GC-PDCCH from the base station with a group common identifier, to obtain control information related to MU-MIMO transmission of the control channel. The MU-MIMO transmission control information acquisition unit 2702 may include an identifier acquisition module 2721 and a descrambling module 2722.

The identifier acquisition module 2721 may be configured to acquire a group common identifier (for example MU-PDCCH RNTI) and UE-specific identifier (for example C-RNTI) of the UE from the base station. The descrambling module 2722 may be configured to decode GC-PDCCH with the group common identifier MU-PDCCH RNTI, to obtain control information related to MU-MIMO transmission for the control channel of all user equipment. Taking the configuration shown in FIG. 26 as an example, it is assumed that DMRS configurations corresponding to UE 1, UE 2, UE k and UE m are referred to as DMRS configuration 1, DMRS configuration 2, DMRS configuration k and DMRS configuration m respectively. Taking UE k as an example of the target UE, the descrambling module 2722 of the UE k may perform decoding to obtain DMRS configuration 1. DMRS configuration 2, DMRS configuration k and DMRS configuration m.

The specific transmission control information acquisition unit 2704 may be configured to decode UE-specific PDCCH of the target user equipment, based on the control information obtained by the MU-MIMO transmission control information acquisition unit 2702 and the target UE-specific identifier, to obtain transmission control information related to the target UE.

Preferably, the specific transmission control information acquisition unit 2704 may include a blind decoding module 2741 and a verification module 2742.

The blind decoding module 2741 may be configured to perform blind decoding on UE-specific PDCCH of the target UE by taking UE-specific PDCCH of other user equipment as interference, based on the control information obtained by the MU-MIMO transmission control information acquisition unit 2702.

Taking UE k in the example shown in FIG. 26 as an example of the target UE, the blind decoding module 2741 of the UE k may assume one of the obtained four DMRS configurations (DMRS configuration 1, DMRS configuration 2, DMRS configuration k and DMRS configuration m) as its DMRS configuration, and assume other three DMRS configurations as interference DMRS configurations, thereby decoding the received UE-specific PDCCH by the linear interference removing manner described above, for example.

However, it cannot be ensured that the decoded information is the transmission control information for the UE k. Therefore, verification is to be performed.

The verification module 2742 may be configured to verify the decoded information by using specific identifier (for example C-RNTI) of UE k, and obtain the decoded information which is successfully verified as the transmission control information for the target user equipment.

The UE k sequentially descrambles CRC parity bits in the decoded transmission control information by using its C-RNTI, to identify whether CRC is correct. If the CRC is correct, the verification is successful, and it is indicated that this transmission control information is transmission control information for the UE k.

Figure 28:
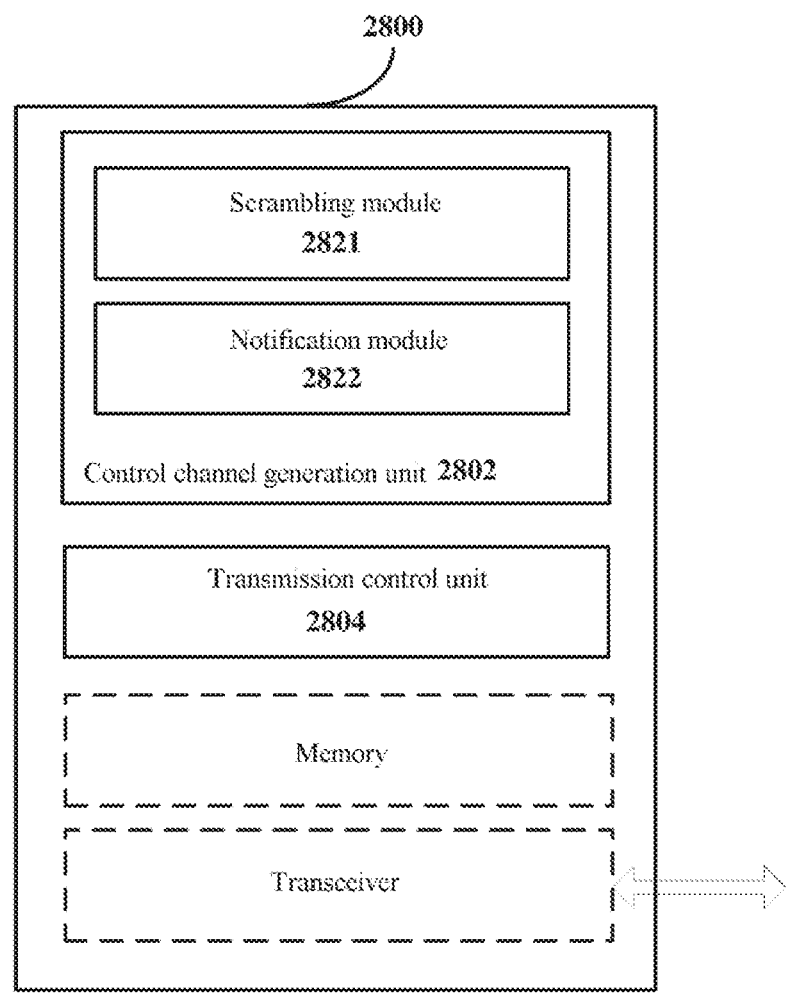
FIG. 28 is a block diagram of another example showing the functional configuration of the device at the base station side according to the second embodiment of the present disclosure.

Corresponding to the configuration example at the UE side, a configuration example at the base station side is described below. FIG. 28 is a block diagram showing another example of the functional configuration of the device at the base station side according to the second embodiment of the present disclosure.

As shown in FIG. 28, a device 2800 according to this example may include a control channel generation unit 2802 and a transmission control unit 2804. A functional configuration example of the transmission control unit 2804 is substantially the same as the functional configuration example of the transmission control unit 2404 described above with reference to FIG. 24. Details are not repeated here.

The control channel generation unit 2802 includes a scrambling module 2821 and a notification module 2822.

The scrambling module 2821 may be configured to scramble, by using a group common identifier (for example MU-PDCCH RNTI), control information related to MU-MIMO transmission for the control channel included in GC-PDCCH, to generate GC-PDCCH.

With reference FIG. 26 above, the scrambling module 2821 scrambles, by using MU-PDCCH RNTI, four DMRS configurations (including DMRS configuration 1, DMRS configuration 2, DMRS configuration k and DMRS configuration m) included in GC-PDCCH, to obtain scrambled GC-PDCCH.

The notification module 2822 may be configured to control the base station to send the group common identifier (for example, MU-PDCCH RNTI) to each user equipment, and thus a group of user equipment performing MU-MIMO transmission for the control channel may decode the received GC-PDCCH by using MU-PDCCH RNTI, to obtain DMRS configurations included in the GC-PDCCH.

It should be noted that, the configuration example of the device at the base station side described here corresponds to the configuration example of the device at the UE side described above. Therefore, for contents not described in detail here, one may refer to the description at the above corresponding position, and details are not repeated here.

It may be seen that, according to the first schematic scrambling solution, the descrambling operation at the UE side and the scrambling operation at the base station side each are simple. However, the user equipment is required to perform blind decoding on UE-specific PDCCH based on multiple interference assumptions, resulting in a great processing load at the UE side. In order to support the user equipment to perform blind decoding on UE-specific PDCCH, and thus avoid a problem that a receiver of the user equipment cannot demodulate corresponding information since a total layer of MU-MIMO transmission is excessive, preferably, the total layer number may be two or four for MU-MIMO transmission of the control channel.

In addition, according to the first schematic scrambling solution, the user equipment can obtain interference condition and perform interference removing and signal demodulation, thereby actually implementing the "non-transparent" MU-MIMO transmission of the control channel, and thus improving the throughput and reliability of the system.

2-2. Second Schematic Scheme

Figure 29:
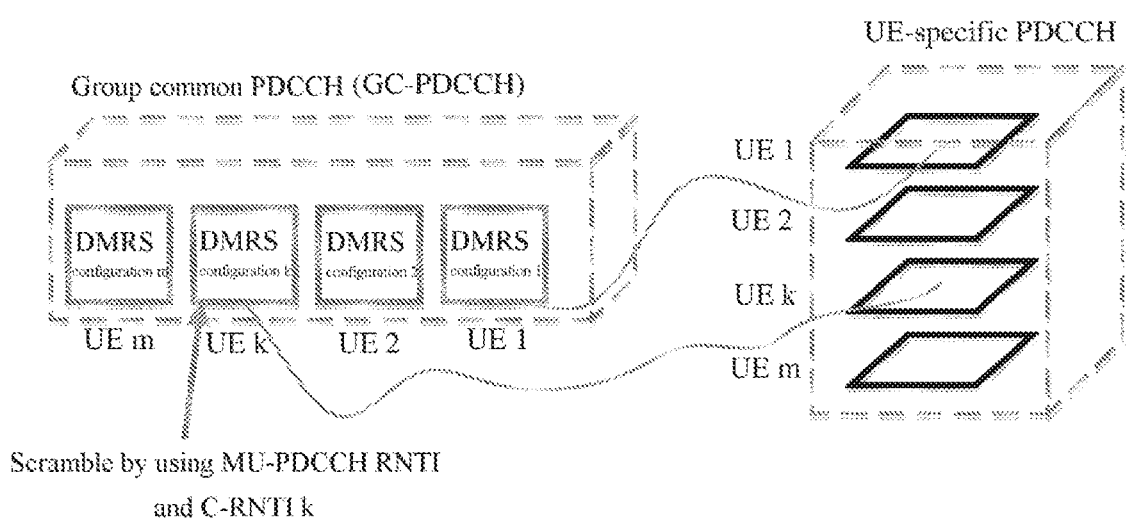
FIG. 29 is a schematic diagram showing a second schematic scheme according to the second embodiment of the present disclosure.

In a second schematic scheme of the present disclosure, a dual stage scrambling scheme is put forward. The dual stage scrambling scheme is described in detail with reference to FIG. 29. FIG. 29 is a schematic diagram showing a second schematic example according to the second embodiment of the present disclosure.

As shown in FIG. 29, for DMRS configurations included in GC-PDCCH, two scrambling processes are performed by utilizing a group common identifier and a user specific identifier respectively. Taking UE k as an example, DMRS configuration k included in CG-PDCCH is scrambled by using the group common identifier MU-PDCCH RNTI and specific identifier of UE k (C-RNTI k) respectively. For example, a first stage of scrambling may be performed by using MU-PDCCH RNTI first to obtain first, scrambled content, and then a second stage of scrambling is performed on the first content by using C-RNTI k to obtain second content. It should be noted that, an order of the used scrambling RNTIs in the two scrambling processes is not limited. Preferably, scrambling is performed first with C-RNTI k, and then scrambling is performed by using MU-PDCCH RNTI. Accordingly, the UE k performs descrambling as follows: determining the occurrence of PDCCH MU-MIMO transmission by using the group common MU-MIMO RNTI first, and determining its PDCCH participating MU-MIMO transmission and related information by using C-RNTI k. In this case, only the UE k knowing both MU-PDCCH RNTI and C-RNTI k can demodulate DMRS configuration k included in GC-PDCCH. Similarly, each of other user equipment UE 1, UE 2 and UE m can demodulate only its own DMRS configuration.

It may be seen that, with the dual stage scrambling scheme according to the second schematic scheme, the user equipment can obtain only its DMRS configuration and cannot obtain interference condition of other UE in the same group. Therefore, this scheme is equivalent to "transparent" MU-MIMO transmission in essence.

Configuration examples of the UE side and the base station side for implementing the second schematic scheme are described in detail below.

Figure 30:
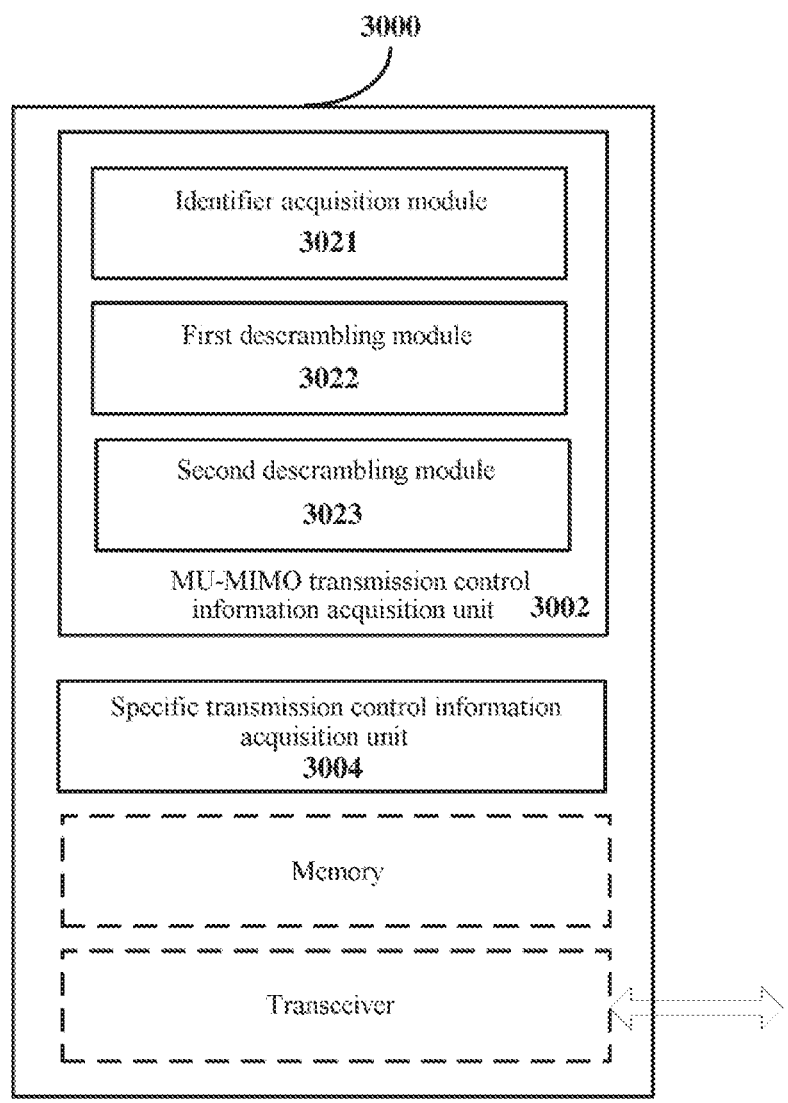
FIG. 30 is a block diagram of another example showing the functional configuration of the device at the UE side according to the second embodiment of the present disclosure.

FIG. 30 is a block diagram showing another example of the functional configuration of the device at the UE side according to the second embodiment of the present disclosure.

As shown in FIG. 30, a device 3000 according to this example may include a MU-MIMO transmission control channel information acquisition unit 3002 and a specific transmission control information acquisition unit 3004.

The MU-MIMO transmission control information acquisition unit 3002 may be configured to decode GC-PDCCH from the base station by using a group common identifier and a UE-specific identifier, to obtain control information related to MU-MIMO transmission for a control channel of the target user equipment.

The MU-MIMO transmission control information acquisition unit 3002 may include an identifier acquisition module 3021, a first descrambling module 3022 and a second descrambling module 3023.

The identifier acquisition module 3021 may be configured to acquire the group common identifier (for example, MU-PDCCH RNTI) and UE-specific identifier (for example C-RNTI) from the base station.

The first descrambling module 3022 may be configured to decode the received GC-PDCCH by using one of the group common identifier and the UE-specific identifier (for example, MU-PDCCH RNTI), to acquire first content.

The second descrambling module 3023 may be configured to decoded the first content obtained by the first descrambling module 3022 by using the other of the group common identifier and the UE-specific identifier (for example C-RNTI), to obtain control information related to MU-MIMO transmission for the control channel of the target UE.

Taking UE k in FIG. 29 as an example, the first descrambling module 3022 and the second descrambling module 3023 perform dual stage descrambling by using the group common identifier MU-PDCCH RNTI and specific identifier of UE k, i.e. C-RNTI k, thereby uniquely obtaining DMRS configuration k included in GC-PDCCH. It should be noted that, although the example that the first descrambling module 3022 performs the first stage of descrambling on GC-PDCCH by using the group common identifier MU-PDCCH RNTI first and then the second descrambling module 3023 performs the second stage of descrambling by using the UE-specific identifier C-RNTI is described above, the example is not intended to be limiting. The order of the used descrambling RNTIs in the dual stage scrambling may be exchanged.

The specific transmission control information acquisition unit 3004 may be configured to decode the received UE-specific PDCCH based on the obtained control information related to MU-MIMO transmission for the control channel of the target UE, thereby obtaining transmission control information for UE k included in the control information.

Taking the UE k in the embodiment shown in FIG. 29 as an example of the target UE, the specific transmission control information acquisition unit 3004 of the UE k may decode the received UE-specific PDCCH based on the acquired DMRS configuration k of the UE k.

In the schematic scheme, the UE k cannot know DMRS configuration of other UE in the group, and thus cannot perform interference removing. Therefore, the requirement on the processing performance of a receiver of the UE k is low.

Figure 31:
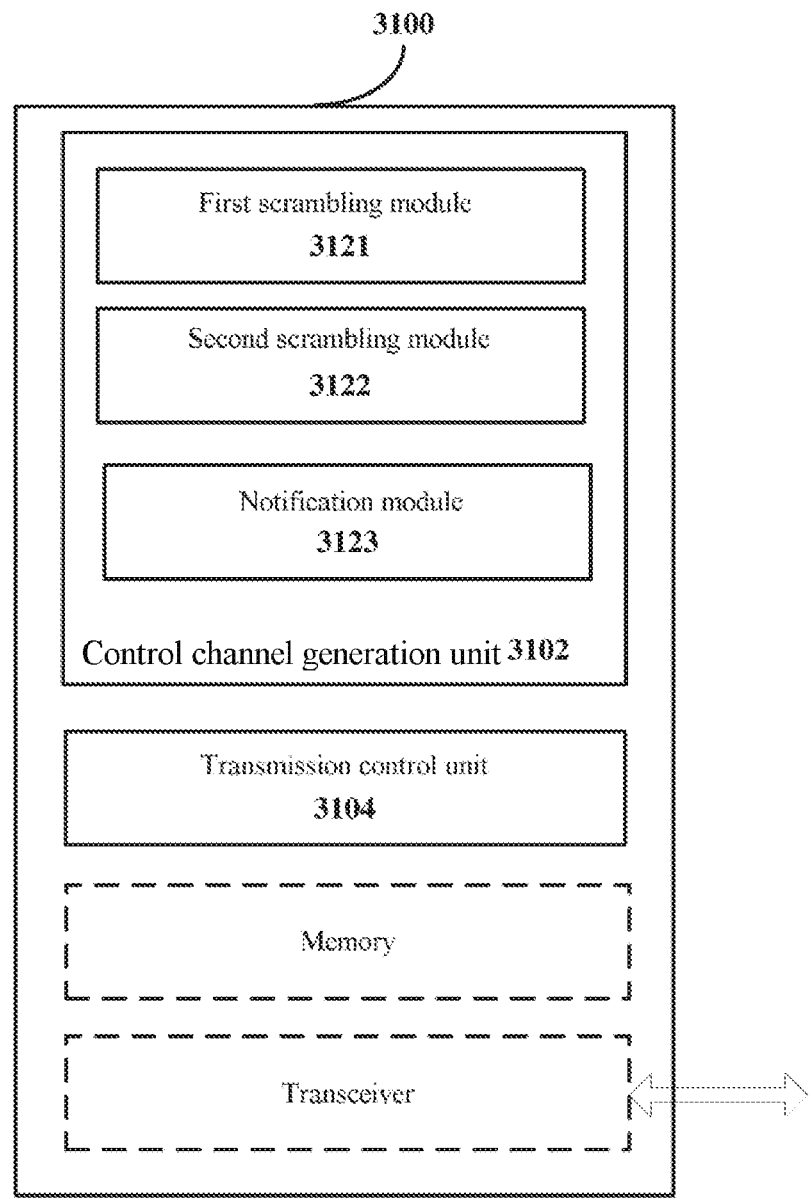
FIG. 31 is a block diagram of another example showing the functional configuration of the device at the base station side according to the second embodiment of the present disclosure.

Corresponding to the configuration example at the UE side, a configuration example at the base station is described below. FIG. 31 is a block diagram showing another example of the functional configuration of the device at the base station side according to the second embodiment of the present disclosure.

As shown in FIG. 31, a device 3100 according to this example may include a control channel generation unit 3102 and a transmission control unit 3104. A functional configuration example of the transmission control unit 3104 is substantially the same as the functional configuration example of the transmission control unit 2404 described above with reference to FIG. 24. Details are not repeated here.

The control channel generation unit 3102 may be configured to scramble, by using a group common identifier and a UE-specific identifier, control information related to MU-MIMO transmission for each UE included in GC-PDCCH, to generate GC-PDCCH, and control a base station to sends the group common identifier and a specific identifier of each UE to the UE. The control channel generation unit 3102 may include a first scrambling module 3121, a second scrambling module 3122 and a notification module 3123.

The first scrambling module 3121 may be configured to, for a group of user equipment, scramble control information related to MU-MIMO transmission for the control channel of each user equipment by using one of the group common identifier and the specific identifier of each user equipment (for example MU-PDCCH RNTI), to generate first content for each user equipment.

With reference to the example shown in FIG. 29, the first scrambling module 3121 may perform a first stage of scrambling on four DMRS configurations (DMRS configuration 1. DMRS configuration 2, DMRS configuration k) by using the group common identifier MU-PDCCH RNTI first, thereby obtaining first content about UE 1, UE 2, UE k and UE m, respectively.

The second scrambling module 3122 may be configured to scramble first content of each user equipment by using the other of the group common identifier and the specific identifier of each user equipment (for example C-RNTI), thereby generating GC-PDCCH including control information related to MU-MIMO transmission for the control channel of a group of user equipment.

With reference to the example shown in FIG. 29, the second scrambling module 3122 may perform a second stage of scrambling on the first content obtained by the first scrambling module 3121 by using the specific identifier of each user equipment, for example. Specifically, the second scrambling module 3122 performs, by using C-RNTI 1 of UE 1, a second stage of scrambling on the DMRS configuration 1 scrambled with MU-PDCCH RNTI, performs, by using C-RNTI 2 of UE 2, a second stage of scrambling on DMRS configuration 2 scrambled with MU-PDCCH RNTI, performs, by using C-RNTI k of UE k, a second stage of scrambling on DMRS configuration k scrambled with MU-PDCCH RNTI, and performs, by using C-RNTI m of UE m, a second stage of scrambling on DMRS configuration m scrambled with MU-PDCCH RNTI, thereby obtaining GC-PDCCH including MU-MIMO transmission control information after dual stage scrambling.

The notification module 3123 may be configured to, for each user equipment, control the base station to send the group common identifier and the UE-specific identifier to the user equipment.

With reference to the example shown in FIG. 29, the notification module 3123 sends the group common identifier MU-PDCCH RNTI to the entire group of user equipment; but sends specific identifier of UE 1. i.e. C-RNTI 1 to the UE 1, sends specific identifier of UE 2, i.e. C-RNTI 2 to the UE 2, sends specific identifier of UE k, i.e. C-RNTI k to the UE k, and sends specific identifier of UE m, i.e. C-RNTI m to the UE m. In this way, only the user equipment knowing the two RNTIs can successfully decodes control information for the user equipment included in GC-PDCCH, thereby decoding the received UE-specific PDCCH superposed with specific transmission control information of other UE according to the control information, to recover the specific transmission control information of the user equipment itself.

It should be noted that the configuration example of the device at the base station side described here correspond to the configuration example of the device at the UE side. Therefore, for content not described in detail here, one may refer to the above corresponding position, and details are not repeated here.

It may be seen that, according to the second schematic scrambling scheme, the descrambling operation at the UE side and the scrambling operation at the base station side are relatively complex. However, each user equipment can know only its DMRS configuration, and thus can try to decode UE-specific PDCCH without interference removing. Therefore, a receiver at the UE side can be implemented simply, and thereby the processing load is low.

In addition, according to the second schematic scrambling scheme, the user equipment can demodulate the information according to its DMRS configuration without interference removing, thereby actually "transparent" MU-MIMO transmission for the control channel and thus simplifying design of the receiver and reducing the cost.

2-3. Variation of the Second Schematic Scheme

According to the second schematic scheme, each UE can recover its DMRS configuration only from GC-PDCCH, and cannot know interference condition of other UE. In the variation, the first embodiment may be combined with the second embodiment, and thereby the "transparent" MU-MIMO transmission in the second schematic scheme is converted into the "non-transparent" MU-MIMO transmission.

Figure 32A:
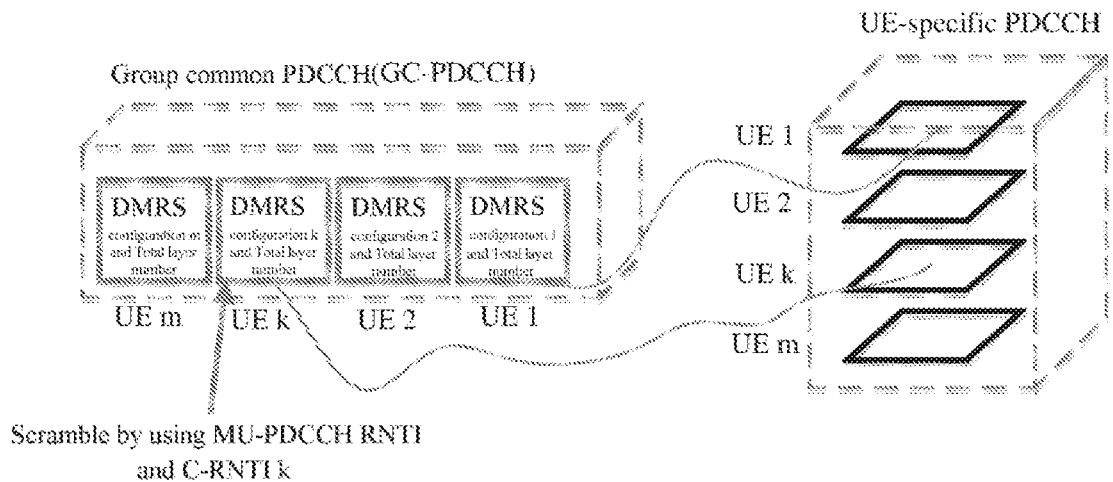
FIG. 32A is a schematic diagram of a first example showing variation of the second schematic scheme according to the second embodiment of the present disclosure.

In a schematic implementation, the total layer number for MU-MIMO transmission may be included in the control information related to MU-MIMO transmission for the control channel in GC-PDCCH. FIG. 32A is a schematic diagram showing a first example of variations of the second schematic scheme according to the second embodiment of the present disclosure.

Compared with the example shown in FIG. 29, as shown in FIG. 32A, blocks indicating control information for MU-MIMO transmission of UE 1, UE 2, UE k and UE m each include the total layer number for MU-MIMO transmission, in addition to the DMRS configuration of the corresponding UE.

In the variation, as described in the second schematic scheme according to the second embodiment, scrambling is performed on information in blocks corresponding to each UE (including DMRS configuration and the total layer number) by using a group common identifier and a specific identifier, and thus each UE can decode GC-PDCCH to obtain its DMRS configuration and the total layer number for MU-MIMO transmission of the control channel. Then, in combination with the first schematic scheme in the first embodiment, with the DMRS allocation scheme informed to the user equipment via high layer signaling in advance or the stored default DMRS allocation scheme, the user equipment may indirectly infer DMRS configuration of other UE which is scheduled simultaneously with the user equipment to perform MU-MIMO transmission of the control channel according to the DMRS allocation scheme, its DMRS configuration and the total layer number for MU-MIMO transmission, thereby performing interference removing and information demodulating, and thus implementing the "non-transparent" MU-MIMO transmission of the control channel. For the process of inferring DMRS configuration of other UE according to the DMRS allocation scheme, the total layer number and the DMRS configuration of the user equipment itself, one may refer to the description of the first embodiment above, and details are not repeated here.

According to the example shown in FIG. 32A, information on the total layer number of MU-MIMO transmission is set in control information of MU-MIMO transmission for each UE, and the information is scrambled by using the group common identifier and the specific identifier of each UE respectively. However, for a group of user equipment performing MU-MIMO transmission, the information on the total layer number is same. Therefore, preferably, in order to reduce signaling resource occupied by the information on the total layer number in GC-PDCCH, the information on the total layer number may be set as information shared by the group of UE.

Figure 32B:
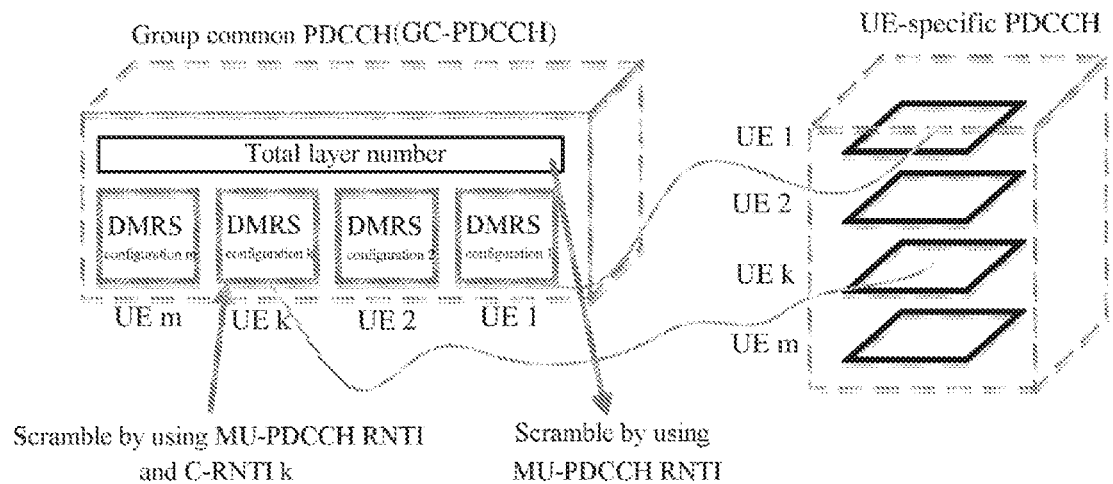
FIG. 32B is a schematic diagram of a second example showing variation of the second schematic scheme according to the second embodiment of the present disclosure.

FIG. 32B is a schematic diagram showing a second example of variations of the second schematic scheme according to the second embodiment of the present disclosure. As shown in FIG. 32B, the information on the total layer number is indicated by one block independent from blocks indicating DMRS configurations of four UE. A first stage of scrambling may be performed on the information of the total layer number with only the group common identifier MU-PDCCH RNTI, and thus only the user equipment which is configured with the group common identifier can decode the information on the total layer number from GC-PDCCH.

It should be noted that, the example that interference information in MU-MIMO transmission of the control channel is indirectly inferred based on the information of the total layer number for MU-MIMO transmission is described with reference to FIG. 32A and FIG. 32B above, but the example is not intended to be limiting. Those skilled in the art may make appropriate modification on the schematic schemes shown in FIG. 32A and FIG. 32B according to the principle of the present disclosure, and such modification should be regarded as falling within the scope of the present disclosure.

In addition, it should be noted that the example of combination of the first embodiment and the second embodiment is described with respect to the first schematic scheme in the first embodiment and the second schematic scheme in the second embodiment, but the example is only schematic rather than restrictive. Those skilled in the art may make other appropriate combination on the first embodiment and the second embodiment according to the principle of the present disclosure, and such combination shall be regarded as falling within the scope of the present disclosure.

2-4. Third Schematic Scheme

Generally, after an RRC connection is established, the base station configures, via RRC signaling, a control resource set (CORESET) in which GC-PDCCH and UE-specific PDCCH may appear, for the user equipment. Then, the user equipment detects and receive GC-PDCCH and UE-specific PDCCH from the base station respectively according to the CORESET configured by the base station.

Figure 33:
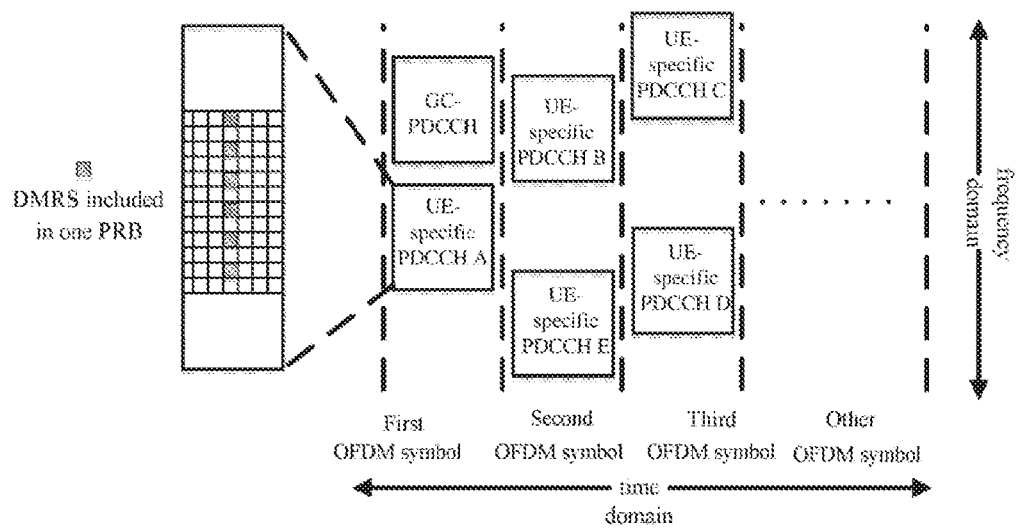
FIG. 33 is a schematic diagram showing a relationship between GC-PDCCH and UE-specific PDCCH on time-frequency domain according to the second embodiment of the present disclosure.

FIG. 33 is a schematic diagram showing a relationship between GC-PDCCH and UE-specific PDCCH in a time-frequency domain according to the second embodiment of the present disclosure.

As shown in FIG. 33, the control channel generally appears on first three OFDM symbols, and GC-PDCCH generally appears before UE-specific PDCCH. The base station generally configures a wide range of time-frequency resources via RRC signaling. With advancement of the communication process, the base station will better know resource allocation and utilization condition of the network, and may expect to narrow a range of the previously configured CORESET, so as to improve the resource utilization efficiency.

In addition, it should be noted that. FIG. 33 shows a case where RE group carrying UE-specific PDCCH includes DMRSs, and the DMRSs and control information for UE-specific PDCCH are placed on different REs in the same physical resource block (PRB). This differs from the existing communication system in which PDCCH does not carry DMRS. Therefore, in the existing communication system, MU-MIMO transmission cannot be performed for the control channel.

In view of this, in a third schematic scheme of the present disclosure, indication information of the control resource set in which UE-specific PDCCH may appear may be carried in GC-PDCCH, to narrow the range of CORESET for UE-specific PDCCH that is previously configured by the base station via RRC. In this way, resource waste, which is due to failing to predict accurate scheduling information by the base station when configuring the CORESET resource via RRC, can be greatly reduced. That is, a search space of the user equipment for UE-specific PDCCH can be dynamically adjusted by using GC-PDCCH, thereby reducing computation complexity and power consumption of the UE, reducing a time delay of detecting PDCCH, and thus optimizing the system performance and resource utilization efficiency.

Configuration examples of the UE side and the base station side for implementing the third schematic scheme are described in detail below.

Figure 34:
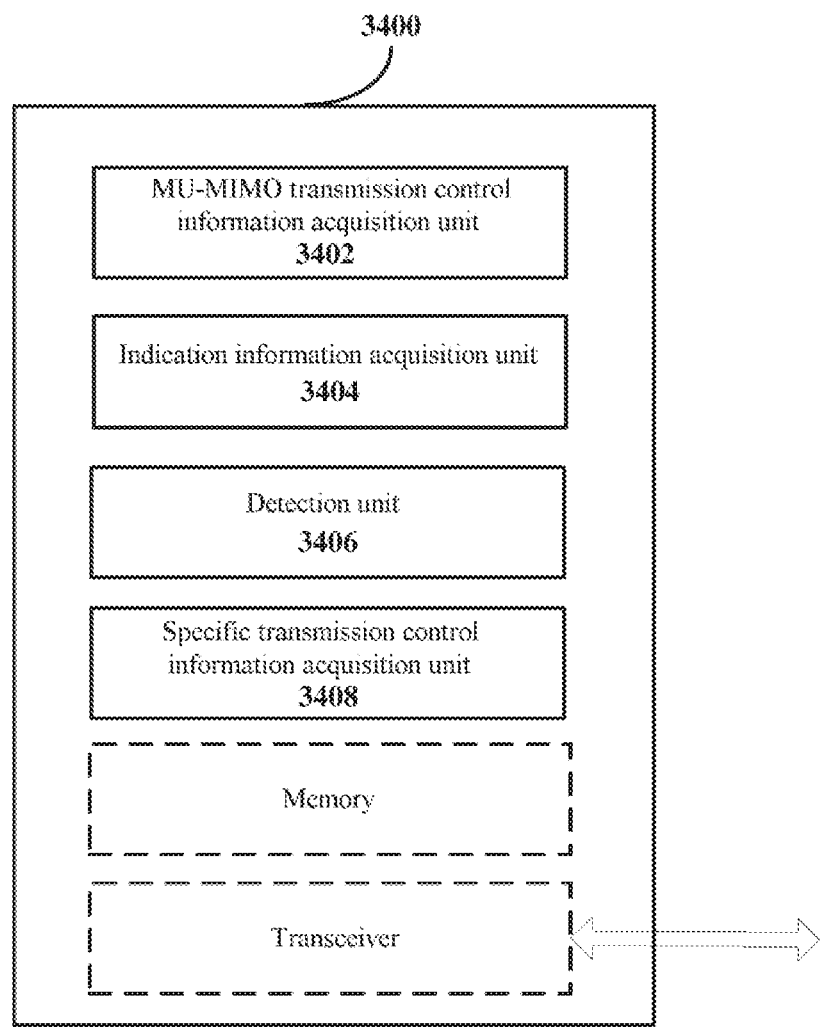
FIG. 34 is a block diagram of another example showing the functional configuration of the device at the UE side according to the second embodiment of the present disclosure.

FIG. 34 is a block diagram showing another example of the functional configuration of the device at the UE side according to the second embodiment of the present disclosure.

As shown in FIG. 34, a device 3400 according to this example may include a MU-MIMO transmission control information acquisition unit 3402, an indication information acquisition unit 3404, a detection unit 3406 and a specific transmission control information acquisition unit 3408. Functional configuration examples of the MU-MIMO transmission information acquisition unit 3402 and the specific transmission control information acquisition unit 3408 are substantially the same as the functional configuration examples of the MU-MIMO transmission control information acquisition unit 2302 and the specific transmission control information acquisition unit 2304 described above with reference to FIG. 23. Details are not repeated here.

The indication information acquisition unit 3404 may be configured to decode GC-PDCCH to obtain indication information of a control resource set to which a transmission resource for transmitting UE-specific PDCCH belongs.

GC-PDCCH from the base station further includes indication information of CORESET in which UE-specific PDCCH may appear. Preferably, the indication information may include indication related to OFDM symbols occupied by CORESET in which UE-specific PDCCH may appear, that is, indicating which OFDM symbol among first three OFDM symbols on which UE-specific PDCCH may appear.

The detection unit 3406 may be configured to detect on a corresponding control resource set according to the acquired indication information, to receive UE-specific PDCCH of the user equipment.

Figure 35:
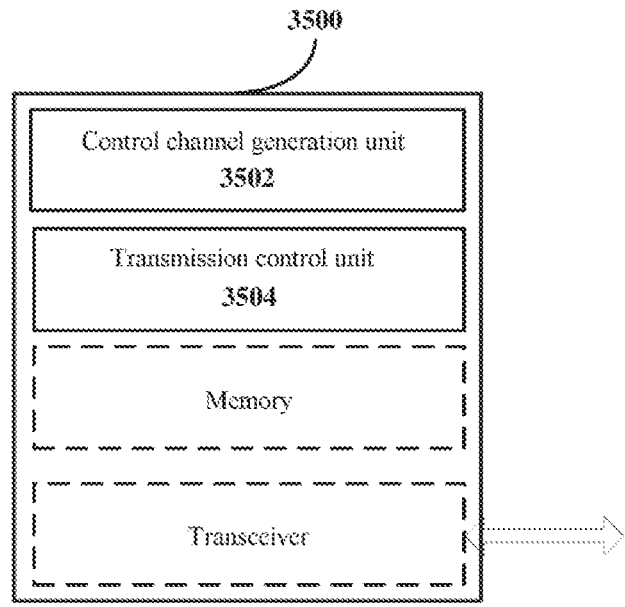
FIG. 35 is a block diagram of another example showing the functional configuration of the device at the base station side according to the second embodiment of the present disclosure.

Corresponding to the configuration example of the device at the UE side shown in FIG. 34, a configuration example at the base station side is further provided according to the present disclosure. FIG. 35 is a block diagram showing another example of the functional configuration of the device at the base station side according to the second embodiment of the present disclosure.

As shown in FIG. 35, a device 3500 according to this example may include a control channel generation unit 3502 and a transmission control unit 3504. A functional configuration example of the transmission control unit 3504 is substantially the same as the functional configuration example of the transmission control unit 2404 described above with reference to FIG. 24. Details are not repeated here.

The control channel generation unit 3502 may be configured to include information indicating a control resource set to which transmission resources of UE-specific PDCCH of each UE belongs in GC-PDCCH, so that each UE receives and detects respective UE-specific PDCCH by decoding GC-PDCCH.

In addition to control information of MU-MIMO transmission for the control channel of a group of use equipment, the GC-PDCCH from the base station may further include indication information of CORESET in which UE-specific PDCCH of each UE may appear. Compared with the time when configuring the CORESET in which GC-PDCCH and UE-specific PDCCH may appear via RRC, the base station now can perform more accurate resource scheduling, and thus it can narrow a range of CORESET in which UE-specific PDCCH may appear, and include related indication information in GC-PDCCH that appears earlier than UE-specific PDCCH, so that the user equipment can detect and receive UE-specific PDCCH on the narrowed range of CORESET according to the indication information included in GC-PDCCH.

Preferably, the indication information may include indication related to OFDM symbols occupied by CORESET to which transmission resources for transmitting UE-specific PDCCH belong, that is, indicating OFDM symbols on which UE-specific PDCCH may appear.

It may be seen that, according to the third schematic scheme of the present disclosure, detailed information of CORESET in which UE-specific PDCCH may appear is included in GC-PDCCH, so that the search space of the user equipment for UE-specific PDCCH can be narrowed, for example, narrowed from three OFDM symbols to two OFDM symbols even one OFDM symbol, thereby greatly reducing the processing load and power consumption of the user equipment and reducing a time delay of detecting UE-specific PDCCH. In addition, the base station can perform more accurate resource scheduling, thereby greatly improving the resource utilizing efficiency.

According to the second embodiment, multiple specific implementation schemes for MU-MIMO transmission of the control channel are provided. Compared with the solution in the conventional technology that only a control channel for certain UE is transmitted on a certain transmission resource, the resource utilization is greatly improved according to the schemes shown the second embodiment.

It should be noted that, although the device embodiments of the present disclosure are described above with reference to the block diagrams shown in the above drawings, the device embodiments are only schematic rather than restrictive. Those skilled in the art may add, delete, modify, combine and/or change various functional modules according to the principle of the present disclosure, and all such variations shall be regarded as falling within the scope of the present disclosure.

3. Method Embodiments of the Present Disclosure

3-1. First Embodiment

Corresponding to the device embodiments above, method embodiments of the present disclosure are provided in the following.

Figure 36:
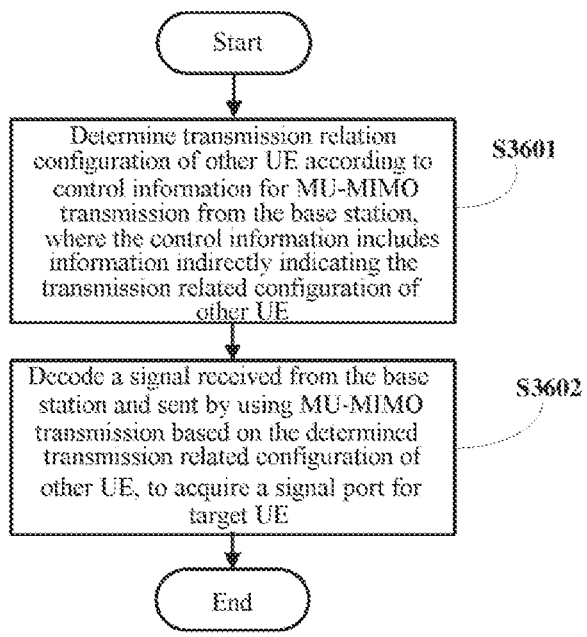
FIG. 36 is a flowchart of an example showing a method at a UE side according to the first embodiment of the present disclosure.

FIG. 36 is a flowchart showing an example of a method at the UE side according to a first embodiment of the present disclosure.

As shown in FIG. 36, the method according to the embodiment starts from step S3601. In step S3601, according to control information, which is related to MU-MIMO transmission performed by user equipment and other user equipment scheduled simultaneously, from a base station, transmission related configuration of the other user equipment is determined. The control information include information indirectly indicating the transmission related configuration of the other user equipment.

Preferably, the transmission related configuration may include DMRS configuration. For the process of indirectly inferring DMRS configuration of other user equipment by the target user equipment according to information indirectly indicating DMRS configuration of other user equipment included in the control information, one may refer to the description of the device at the UE side in the first to the fourth schematic schemes according to the first embodiment. Details are not repeated here.

Subsequently, the method proceeds to step S3602. In step S3602, based on the determined transmission related configuration of the other user equipment, a signal received from the base station and sent by using MU-MIMO transmission is decoded, to obtain a signal portion for the user equipment.

According to the acquired DMRS configuration of other user equipment, the signal portion of the other user equipment as interference is removed from the received superposed data flow by the above linear interference removing manner, to recover the signal portion for target UE. For the specific process, one may refer to the description of the device embodiments at the corresponding position, and details are not repeated here.

Figure 37:
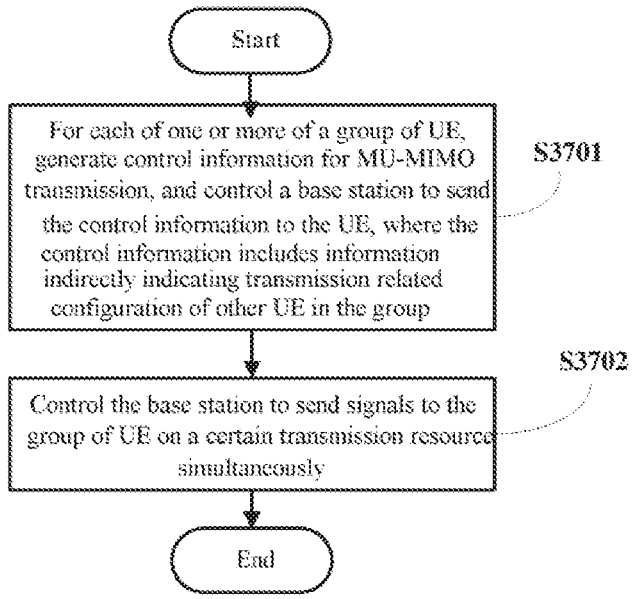
FIG. 37 is a flowchart of an example showing a method at a base station side according to the first embodiment of the present disclosure.

FIG. 37 is a flowchart showing a process of a method for the base station side according to the first embodiment of the present disclosure.

As shown in FIG. 37, the method according to the embodiment starts from step S3701. In step S3701, for each of one or more of a group of user equipment which is scheduled simultaneously to perform MU-MIMO transmission, control information on MU-MIMO transmission is generated, and a base station is controlled to send the control information to the user equipment. The control information include information indirectly indicating transmission related configuration of user equipment other than the user equipment in the group of user equipment.

The "one or more user equipment" may refer to all or a part of the group of user equipment. In other words, the base station may indirectly indicate the transmission related configuration of other user equipment to a part of user equipment in the group of user equipment, to support hybrid configuration of "transparent" and "non-transparent" transmission for the data channel.

In addition, it should be noted that, for the implementation example of generating control information including information indirectly indicating the transmission related configuration of other user equipment, one may refer to the description of the device at the base station side in the first to the fourth schematic scheme according to the first embodiment. Details are not repeated here.

Subsequently, the method proceeds to step S3702. In step S3702, the base station is controlled to send a signal simultaneously to the group of user equipment on a certain transmission resource.

It should be noted here that, the methods at the UE side and the base station side in the first embodiment described here respectively correspond to the devices at the UE side and the base station side in the first embodiment described above. One may refer to the description at the above corresponding position, and details are not repeated here.

3-2. Second Embodiment

Figure 38:
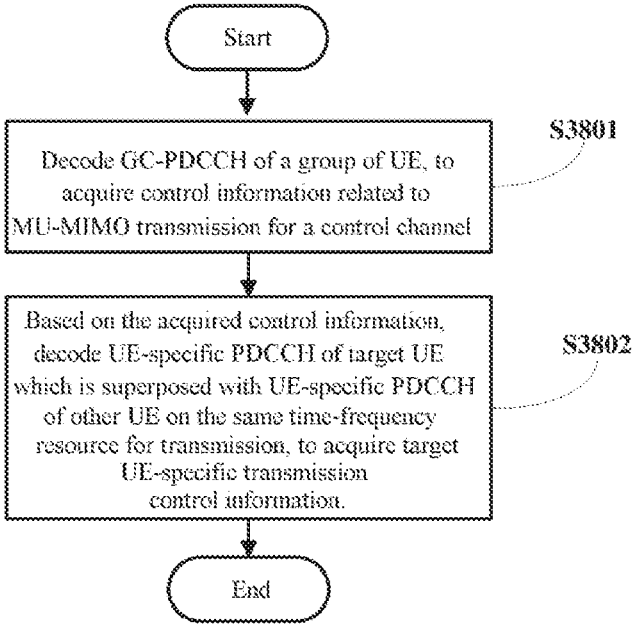
FIG. 38 is a flowchart of an example showing a method at a UE side according to the second embodiment of the present disclosure.

FIG. 38 is a flowchart showing a process of a method at the UE side according to the second embodiment of the present disclosure.

As shown in FIG. 8, the method according to the embodiment starts from step S3801. In step S3801, a group common physical downlink control channel (GC-PDCCH) for a group of user equipment including target user equipment is decoded, to obtain control information of MU-MIMO transmission for a control channel. The MU-MIMO transmission for the control channel here refers to that UE-specific PDCCHs of multiple user equipment are superposed on the same time-frequency resource to perform transmission.

For the implementation example of decoding GC-PDCCH to obtain DMRS configuration of all of the group of user equipment or obtain only DMRS configuration of the target UE, one may refer to the description of the device at the UE side in the first to the third schematic schemes according to the second embodiment described above. Details are not repeated.

Subsequently, the method proceeds to step S3802. In step S3802, based on the acquired control information of MU-MIMO transmission for the control channel, UE-specific PDCCH of the target UE which is superposed with UE-specific PDCCH of other UE on the same time-frequency resource to be transmitted, is decoded, to obtain target UE-specific transmission control information.

Preferably. GC-PDCCH is decoded to obtain indication information of CORESET to which transmission resources for transmitting UE-specific PDCCH by the base station belongs, and thus detection is performed on a corresponding time-frequency resource according to the indication information, to receive UE-specific PDCCH.

Figure 39:
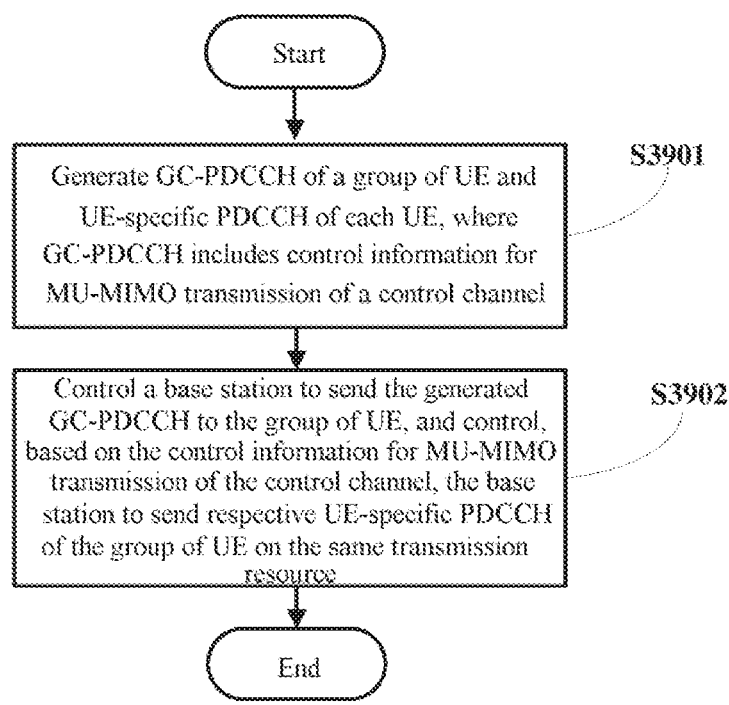
FIG. 39 is a flowchart showing an example of a method at a base station side according to the second embodiment of the present disclosure.

FIG. 39 is a flowchart showing a process of the method at the base station side according to the second embodiment of the present disclosure.

As shown in FIG. 39, the method according to the embodiment starts from step S3901. In step S3901, GC-PDCCH of a group of user equipment and UE-specific PDCCH of each user equipment are generated. Preferably, the GC-PDCCH includes control information of MU-MIMO transmission for the control channel of the group of user equipment. For the specific scrambling process for the control information of MU-MIMO transmission included in GC-PDCCH, one may refer to the description of the device at the base station side in the first to the third schematic schemes according to the second embodiment, and details are not repeated here.

In addition, preferably, GC-PDCCH further includes information indicating CORESET in which UE-specific PDCCH of each UE may appear, to narrow a search space of the user equipment for UE-specific PDCCH.

Subsequently, the method proceeds to step S3902. In step S3902, the base station is controlled to send the generated GC-PDCCH to the group of user equipment, and the base station is controlled, based on the control information related to MU-MIMO transmission for the control channel, to send UE-specific PDCCH of each of the group of user equipment on the same transmission resource.

It should be noted here, the methods at the UE side and the base station side in the second embodiment described here respectively correspond to the device at the UE side and the base station side in second embodiment described above. For content not described in detail here, one may refer to the description at the above corresponding position, and details are not repeated here.

In addition, it should be noted that although the method embodiments of the present disclosure are described with reference to the flowcharts shown in FIG. 36 to FIG. 39, the method embodiments are schematic rather than restrictive. Those skilled in the art may add, delete, combine and/or change steps according to the principles of the present disclosure, and may make appropriate amendments on an order of the steps. All such variation shall be regarded as falling within the scope of the present disclosure.

In addition, an electronic device is further provided according to an embodiment of the present disclosure. The electronic device may include a transceiver and one or more processors. The one or more processors may be configured to perform functions of corresponding units in the method or device for a wireless communication system according to the embodiment of the present disclosure. The transceiver may carry corresponding communication functions.

It should be understood that, a machine executable instruction in a storage medium and a program product according to embodiments of the present disclosure may be configured to perform the method corresponding to the device embodiments. Therefore, for content not described in detail here, one may refer to the description at the above corresponding position, and details are not repeated here.

Accordingly, the storage medium for carrying the program product including the machine executable instruction is also included in the present disclosure. The storage medium includes but not limited to a floppy disk, an optical disk, a magnetic-optical disk, a storage card, and a storage stick and so on.

Figure 40:
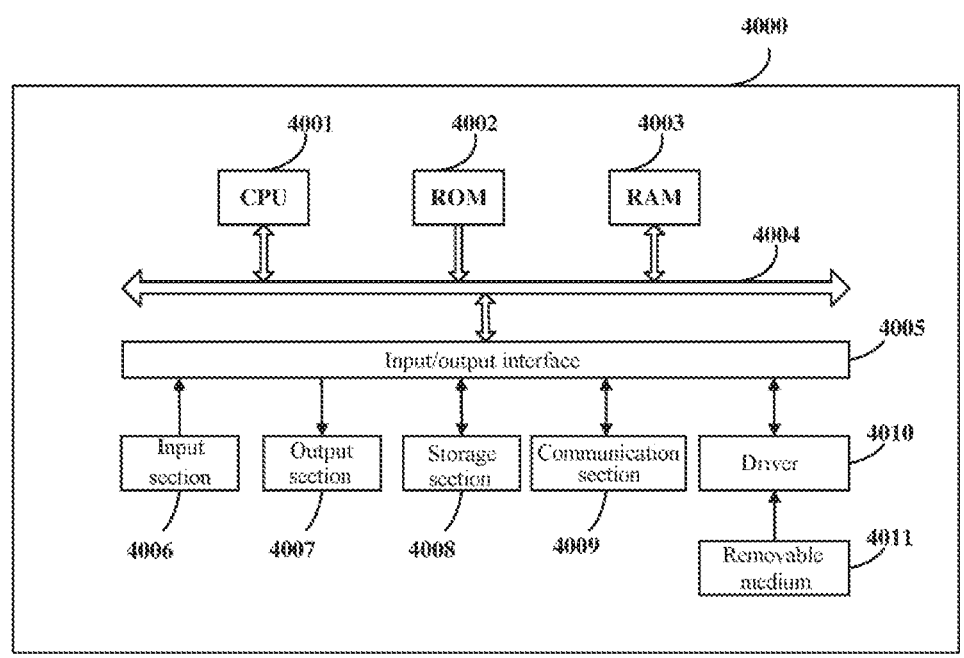
FIG. 40 is a block diagram showing a schematic structure of a personal computer as an available information processing device which can be used according to an embodiment of the present disclosure.

4. Computing Device for Implementing Embodiments of the Device and the Method According to the Present Disclosure In addition, it is further to be noted that the above-described series of processing and apparatuses may also be implemented by software and/or firmware. In the case of implementation in software and/or firmware, a program constituting the software is installed from a storage medium or a network to a computer with a dedicated hardware structure, e.g., a general purpose personal computer 4000 illustrated in FIG. 140, which can perform various functions when various programs are installed thereon. FIG. 40 is a block diagram showing an exemplary structure of a personal computer that can be used as an information processing device according to an embodiment of the present disclosure.

In FIG. 140, a central processing unit (CPU) 4001 executes various processes according to the program stored in a read only memory (ROM) 4002 or the program loaded from the storage section 4008 to a random access memory (RAM) 4003. In the RAM 4003, the data required by CPU 4001 to execute various processing is also stored as necessary.

The CPU 4001, the ROM 4002 and the RAM 4003 are connected with each other via a bus 4004. An input/output interface 4005 is also connected to the bus 4004.

The following sections are connected to the input/output interface 4005: an input section 4006 including a keyboard, a mouse and the like; an output section 4007 including a display such as a cathode ray tube (CRT), a liquid crystal display (LCD) and the like, a loudspeaker, and the like; a memory section 4008 including a hard disc and the like; and a communication section 4009 including a network interface card such as a LAN card, a modem and the like. The communication section 4009 performs communication processing via a network such as the Internet.

A driver 4010 may also be connected to the input/output interface 4005 as needed. A removable medium 14011, e.g., a magnetic disk, an optical disk, an magneto optical disk, a semiconductor memory, etc., can be installed on the driver 4010 as needed so that a computer program fetched therefrom can be installed into the storage section 4008 as needed.

In the case that the foregoing series of processes are performed in software, a program constituting the software is installed from a network, e.g., the Internet, or a storage medium, e.g., the removable medium 4011.

It is to be understood by those skilled in the art that the storage medium is not limited to the removable medium 4011 shown in FIG. 40 in which the program is stored and which is distributed separately from the apparatus so as to provide the program to the user. The removable medium 4011, for example, may include a magnetic disk including a Floppy Disk (registered trademark); an optical disk including a Compact Disk Read Only Memory (CD-ROM) and a Digital Versatile Disc (DVD); a magneto-optical disk including a MiniDisc (MD) (registered trademark); and a semiconductor memory. Alternatively, the storage medium may be a ROM 4002, a hard disk included in the storage section 4008, etc., which has a program stored therein and is distributed to the user along with an apparatus in which it is incorporated.

5. Application Examples of the Technology According to the Present Disclosure The technology of the present disclosure may be applied to various products. For example, a base station described in the present disclosure may be realized as gNodeB (gNB), an evolved Node B (eNB) of any type (such as a macro eNB and a small eNB), a transmission reception point (TRP), enterprise long term evolution (eLTE), eNB and so on. The small eNB may be an eNB such as a pico eNB, a micro eNB and a home (femto) eNB that covers a cell smaller than a macro cell. Alternatively, the base station may also be implemented as a base station of any other type, such as a NodeB and a base transceiver station (BTS). The base station may include a main body (that is also referred to as a base station device) configured to control wireless communication, and one or more remote radio heads (RRH)

disposed in a different place from the main body. In addition, various types of terminals, which will be described below, may each operate as the base station by temporarily or semi-persistently executing a base station function.

The user equipment described in the present disclosure may be realized as, a vehicle, a mobile terminal (such as a smartphone, a tablet personal computer (PC), a notebook PC, a portable game terminal, a portable/dongle type mobile router, and a digital camera), an in-vehicle terminal (such as a car navigation device), an unmanned aerial vehicle, and a mobile station. The user equipment may also be realized as a terminal (that is also referred to as a machine type communication (MTC) terminal) that performs machine-to-machine (M2M) communication. Furthermore, the user equipment may be a wireless communication module (such as an integrated circuit module including a single die) mounted on each of the terminals.

Application examples according to the present disclosure are described below with reference to FIGS. 41 to 44.

5-1. Application Examples of a Base Station

First Application Example

Figure 41:
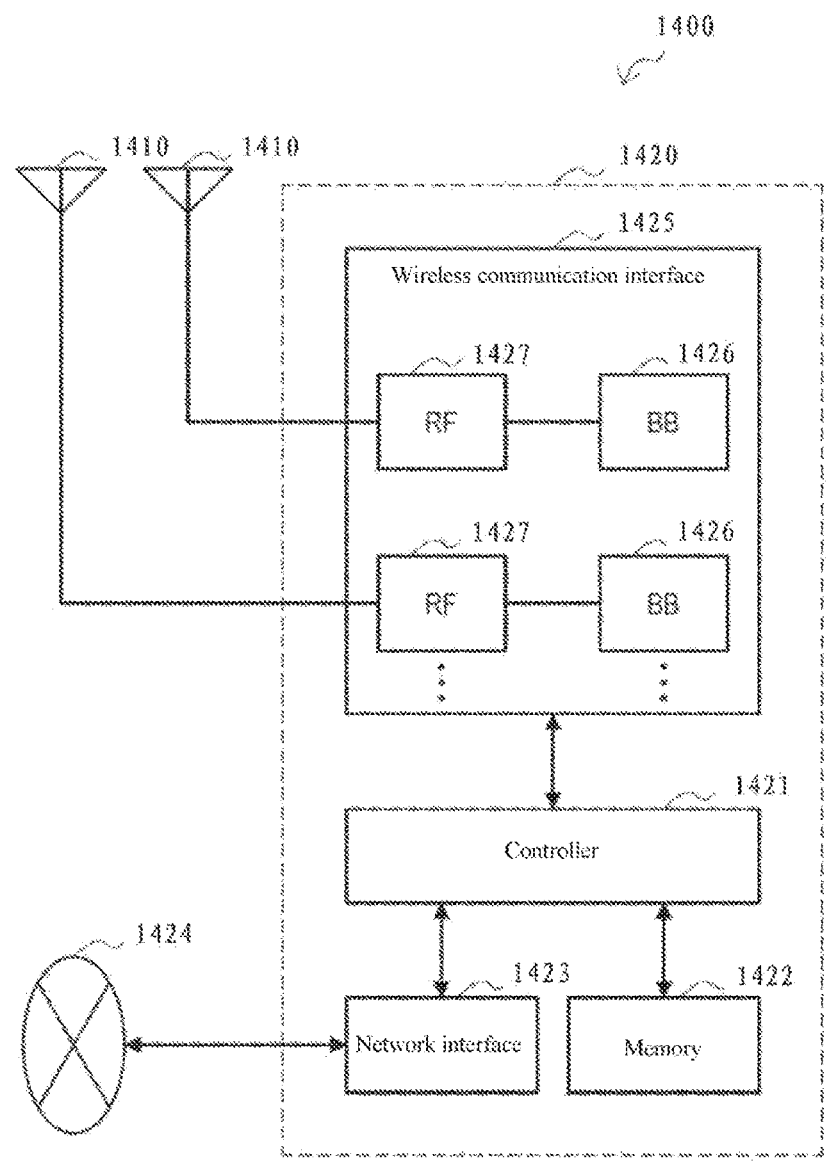
FIG. 41 is a block diagram of a first example showing a schematic configuration of evolved node (eNB) to which the technology according to the present disclosure may be applied.

FIG. 41 is a block diagram showing a first example of a schematic configuration of an eNB to which the technology of the present disclosure may be applied. An eNB 1400 includes one or more antennas 1410 and a base station device 1420. The base station device 1420 and each of the antennas 1410 may be connected with each other via an RF cable.

Each of the antennas 1110 includes one or more antenna elements (such as multiple antenna elements included in a multiple-input multiple-output (MIMO) antenna), and is used for transmitting and receiving a radio signal by the base station device 1420. The eNB 1400 may include the multiple antennas 1410, as shown in FIG. 41. For example, the multiple antennas 1410 may be compatible with multiple frequency bands used by the eNB 1400. Although FIG. 41 illustrates an example in which the eNB 1400 includes multiple antennas 1410, the eNB 1400 may also include a single antenna 1410.

The base station device 1420 includes a controller 1421, a memory 1422, a network interface 1423, and a wireless communication interface 1425.

The controller 1421 may be a CPU or a DSP and control various functions of higher layers of the base station device 1420. For example, the controller 1421 generates a data packet based on data in a signal processed by the wireless communication interface 1425, and transfers the generated packet via a network interface 1423. The controller 1421 may bundle data from multiple baseband processors to generate bundled packet, and transfer the generated bundled packet. The controller 1421 may have logical functions of performing control such as radio resource control, radio bearer control, mobility management, admission control, and scheduling. The control may be performed in conjunction with an adjacent eNB or a core network node. The memory 1422 includes RAM and ROM, and stores a program that is executed by the controller 1421, and various types of control data (such as a terminal list, transmission power data, and scheduling data).

The network interface 1423 is a communication interface for connecting the base station device 11420 to a core network 1424. The controller 1421 may communicate with a core network node or another eNB via the network interface 1423. In that case, the eNB 1400 and the core network node or the other eNB may be connected to each other through a logical interface (such as an Si interface and an X2 interface). The network interface 1423 may also be a wired communication interface or a wireless communication interface for radio backhaul. If the network interface 1423 is a wireless communication interface, it may use a higher frequency band for wireless communication than a frequency band used by the wireless communication interface 1425.

The wireless communication interface 1425 supports any cellular communication scheme (such as Long Term Evolution (LTE) and LTE-Advanced), and provides wireless connection to a terminal positioned in a cell of the eNB 1400 via the antenna 1410. The wireless communication interface 1425 may typically include, for example, a base band (BB) processor 1426 and an RF circuit 1427. The BB processor 1426 may perform, for example, coding/decoding, modulation/demodulation and multiplexing/de-multiplexing, and perform various types of signal processes of the layers (for example L1, media access control (MAC), radio link control (RLC) and packet data convergence protocol (PDCP)). Instead of the controller 1421, the BB processor 1426 may have a part or all of the above-described logical functions. The BB processor 1426 may be a memory that stores the communication control program, or a module that includes a processor and related circuitry configured to perform the program. In this way, the function of the BB processor 1426 may be changed when the programs are updated. The module may be a card or a blade that is inserted into a slot of the base station device 1420. Alternatively, the module may be a chip that is mounted on the card or the blade. Meanwhile, the RF circuit 1427 may include, for example, a frequency mixer, a filter and an amplifier, and transmit and receive a radio signal via the antenna 1410.

As shown in FIG. 41, the wireless communication interface 1425 may include multiple BB processors 1426. For example, multiple BB processors 1426 may be compatible with multiple frequency bands used by the eNB 1400. As shown in FIG. 41, the wireless communication interface 1425 may include multiple RF circuits 1427. For example, the multiple RF circuits 1427 may be compatible with multiple antenna elements. Although an example in which the wireless communication interface 1425 includes multiple BB processors 1426 and multiple RF circuits 1427 is shown in FIG. 41, the wireless communication interface 1425 may also include a single BB processor 1426 or a single RF circuit 1427.

Second Application Example

Figure 42:
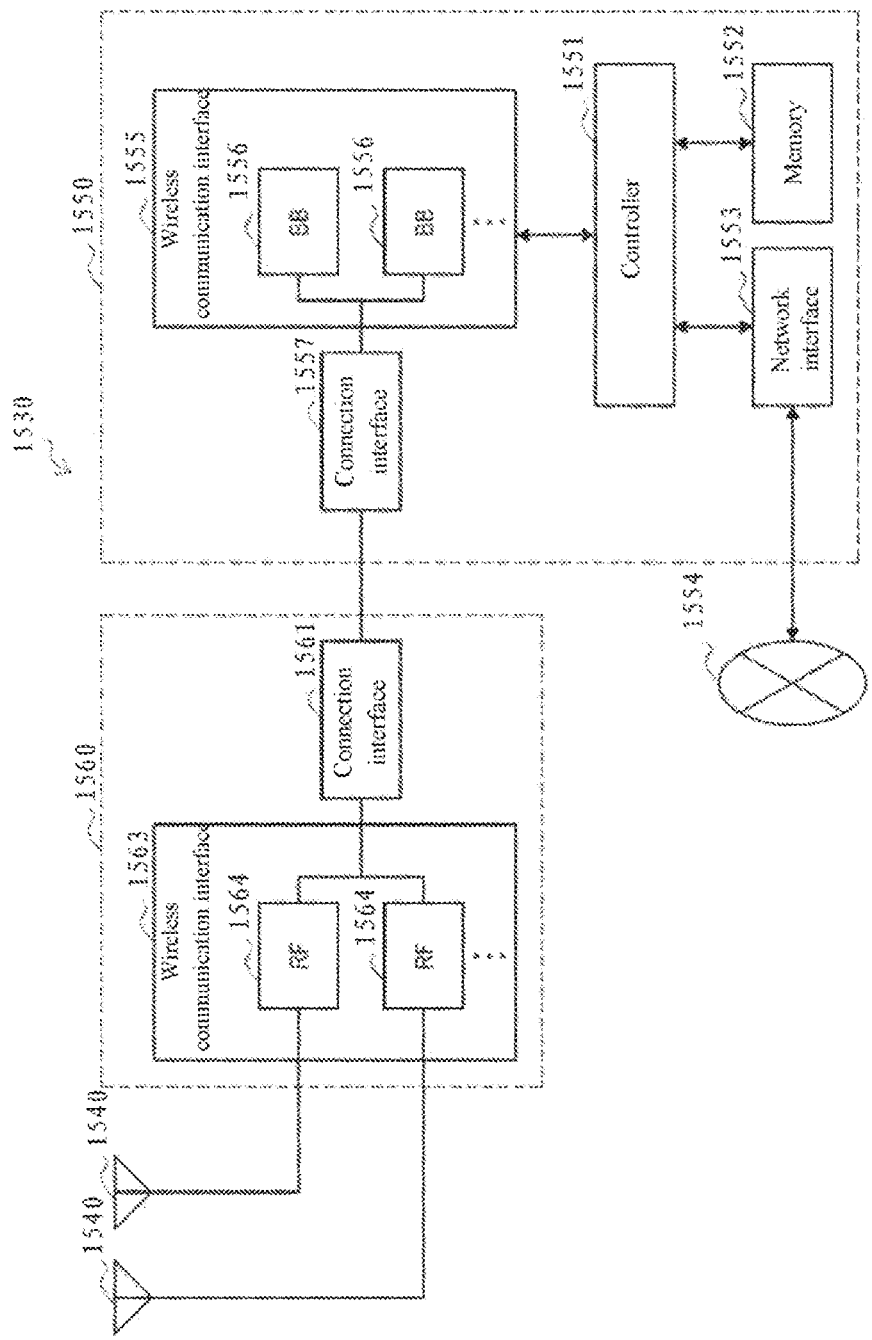
FIG. 42 is a block diagram of a second example showing the schematic configuration of the eNB to which the technology according to the present disclosure may be applied.

FIG. 42 is a block diagram showing a second example of a schematic configuration of an eNB to which the technology according to the present disclosure may be applied. An eNB 1530 includes one or more antennas 1540, a base station device 1550 and an RRH 1560. Each antenna 1540 and the RRH 1560 may be connected to each other via an RF cable. The base station device 1550 and the RRH 1560 may be connected to each other via a high-speed line such as a fiber cable.

Each of the antennas 1540 includes one or more antenna elements (such as the multiple antenna elements included in the MIMO antenna), and is used for transmitting and receiving the radio signal by the RRH 1560. As shown in FIG. 42, the eNB 1530 may include multiple antennas 1540. For example, the multiple antennas 1540 may be compatible with multiple frequency bands used by the eNB 1530. Although an example in which the eNB 1530 includes multiple antennas 1540 is shown in FIG. 42, the eNB 1530 may also include a single antenna 1540.

The base station device 1550 includes a controller 1551, a memory 1552, a network interface 1553, a wireless communication interface 1555, and a connection interface 1557. The controller 1251, the memory 1552, and the network interface 1553 are the same as the controller 1421, the memory 1422, and the network interface 1423 described with reference to FIG. 41.

The wireless communication interface 1555 supports any cellular communication solution (such as LTE and LTE-advanced), and provides wireless communication with a terminal located in a sector corresponding to the RRH 1560 via the RRH 1560 and the antenna 1540. The wireless communication interface 1555 may typically include, for example, a BB processor 1556. Other than connecting to an RF circuit 1564 of the RRH 1560 via the connection interface 1557, the BB processor 1556 is the same as the BB processor 1426 described with reference to FIG. 41. As show in FIG. 42, the wireless communication interface 1555 may include multiple BB processors 1556. For example, the multiple BB processors 1556 may be compatible with the multiple frequency bands used by the eNB 1530. Although FIG. 42 illustrates an example in which the wireless communication interface 1555 includes multiple BB processors 1556, the wireless communication interface 1555 may also include a single BB processor 1556.

The connection interface 1557 is an interface for connecting the base station device 1550 (the wireless communication interface 1555) to the RRH 1560. The connection interface 1557 may also be a communication module for communication in the above-described high-speed line that connects the base station device 1550 (the wireless communication interface 1555) to the RRH 1560.

The RRH 1560 includes a connection interface 1561 and a wireless communication interface 1563.

The connection interface 1561 is an interface for connecting the RRH 1560 (the wireless communication interface 1563) to the base station device 1550. The connection interface 1561 may also be a communication module for the communication in the above high-speed line.

The wireless communication interface 1563 transmits and receives a radio signal via the antenna 1540. The wireless communication interface 1563 may generally include, for example, the RF circuit 1564. The RF circuit 1564 may include, for example, a frequency mixer, a filter and an amplifier, and transmit and receive a radio signal via the antenna 1540. The wireless communication interface 1563 may include multiple RF circuits 1564, as shown in FIG. 42. For example, the multiple RF circuits 1564 may support multiple antenna elements. Although FIG. 42 illustrates the example in which the wireless communication interface 1563 includes the multiple RF circuits 1564, the wireless communication interface 1563 may also include a single RF circuit 1564.

In the eNB 1400 shown in FIG. 41 and the eNB 1530 shown in FIG. 42, the transceiver in the device at the base station side may be implemented by the wireless communication interface 1425 and the wireless communication interface 1555 and/or the wireless communication interface 1563. At least part of the functions of the device at the base station side may also be realized by the controller 1421 and the controller 1551.

5-2. Application Examples of User Equipment

First Application Example

Figure 43:
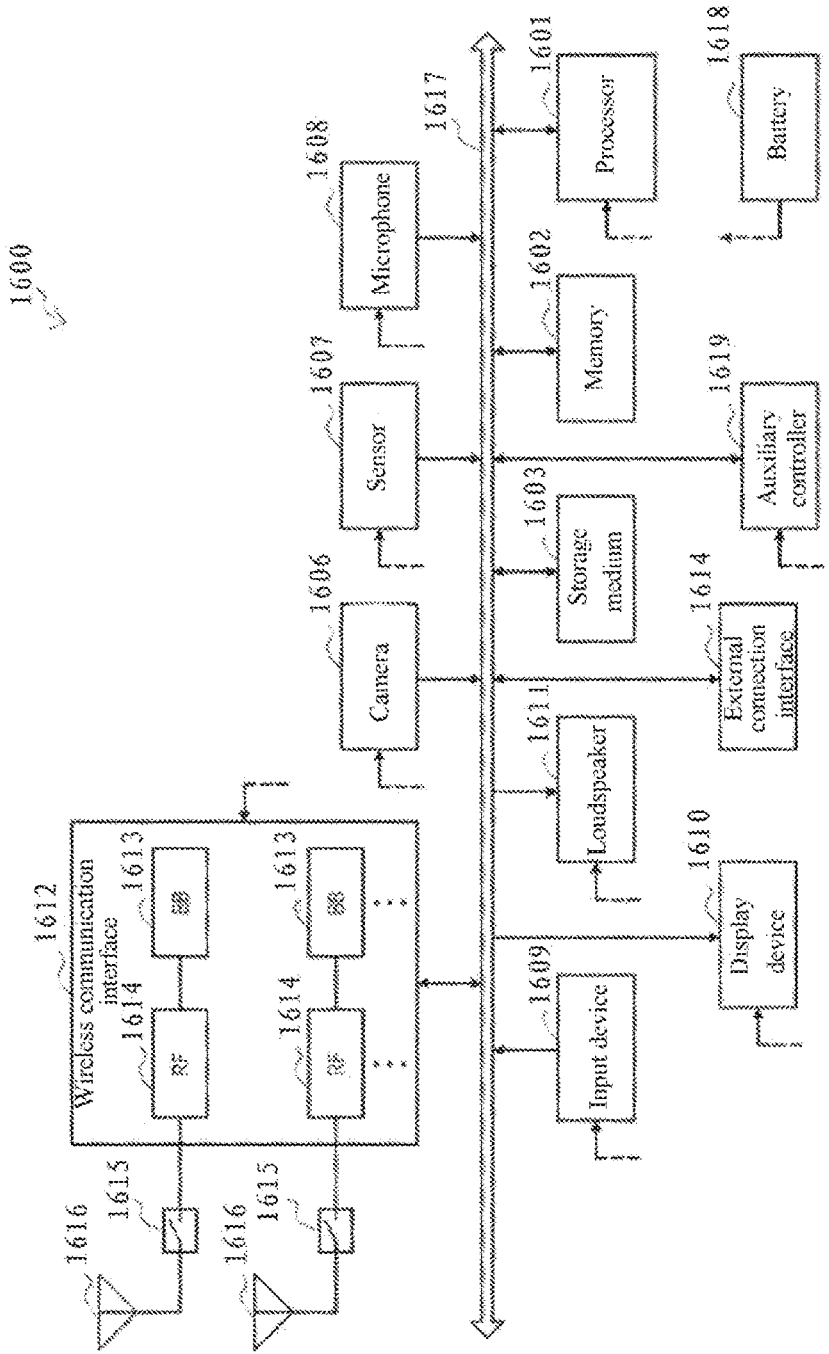
FIG. 43 is a block diagram of an example showing a schematic configuration of a smart phone to which the technology according to the present disclosure may be applied.

FIG. 43 is a block diagram showing an example of exemplary configuration of a smartphone 1600 to which the technology of the present disclosure may be applied. The smart phone 1600 includes a processor 1601, a memory 1602, a storage device 1603, an external connection interface 1604, a camera 1606, a sensor 1607, a microphone 1608, an input device 1609, a display device 1610, a speaker 1611, a wireless communication interface 1612, one or more antenna switches 1615, one or more antennas 1616, a bus 1617, a battery 1618 and an auxiliary controller 1619.

The processor 1601 may be, for example, a CPU or a system on chip (SoC), and control functions of an application layer and other layers of the smart phone 1600. The memory 1602 includes a RAM and a ROM, and stores a program that is executed by the processor 1601, and data. The storage device 1603 may include a storage medium such as a semiconductor memory and a hard disk. The external connection interface 1604 is an interface for connecting an external device (such as a memory card and a universal serial bus (USB) device) to the smart phone 1600.

The camera 1606 includes an image sensor such as a charge coupled device (CCD) and a complementary metal oxide semiconductor (CMOS), and generates a captured image. The sensor 1607 may include a group of sensors such as a measurement sensor, a gyro sensor, a geomagnetic sensor, and an acceleration sensor. The microphone 1608 converts sounds that are inputted to the smart phone 1600 into audio signals. The input device 1609 includes, for example, a touch sensor configured to detect touch onto a screen of the display device 1610, a keypad, a keyboard, a button, or a switch, and receive an operation or information inputted from a user. The display device 1610 includes a screen such as a liquid crystal display (LCD) and an organic light-emitting diode (OLED) display, and displays an output image of the smart phone 1600. The speaker 1611 converts audio signals that are outputted from the smartphone 1600 to sounds.

The wireless communication interface 1612 supports any cellular communication scheme (such as LTE and LTE-Advanced), and performs wireless communication. The wireless communication interface 1612 may typically include, for example, a base band (BB) processor 1613 and a RF circuit 1614. The BB processor 1613 may perform encoding/decoding, modulating/demodulating and multiplexing/demultiplexing, for example, and perform various types of signal processing for wireless communication. The RF circuit 1614 may include a frequency mixer, a filter and an amplifier, for example, and transmit and receive a radio signal via the antenna 1616. The wireless communication interface 1612 may be a chip module having the BB processor 1613 and the RF circuit 1614 integrated thereon. The wireless communication interface 1612 may include multiple BB processors 1613 and multiple RF circuits 1614, as shown in FIG. 43. Although FIG. 43 illustrates the example in which the wireless communication interface 1612 includes the multiple BB processors 1613 and the multiple RF circuits 1614, the wireless communication interface 1612 may also include a single BB processor 1613 or a single RF circuit 1614.

Moreover, in addition to a cellular communication scheme, the wireless communication interface 1612 may also support a wireless communication scheme of another type, such as a short-distance wireless communication scheme, a near field communication scheme, and a wireless local area network (LAN) scheme. In this case, the wireless communication interface 1612 may include a BB processor 1613 and an RF circuit 1614 for each wireless communication scheme.

Each of the antenna switches 1615 switches connection destinations of the antennas 1616 among multiple circuits (such as circuits for different wireless communication schemes) included in the wireless communication interface 1612.

Each of the antennas 1616 includes one or more antenna elements (such as multiple antenna elements included in an MIMO antenna), and is used for the wireless communication interface 1612 to transmit and receive radio signals. The smartphone 1600 may include the multiple antennas 1616, as shown in FIG. 43. Although FIG. 43 illustrates the example in which the smartphone 1600 includes the multiple antennas 1616, the smartphone 1600 may also include a single antenna 1616.

In addition, the smart phone 1600 may include an antenna 1616 for each wireless communication scheme. In this case, the antenna switches 1615 may be omitted from the configuration of the smart phone 16).

The bus 1617 connects the processor 1601, the memory 1602, the storage device 1603, the external connection interface 1604, the camera 1606, the sensor 1607, the microphone 1608, the input device 1609, the display device 1610, the speaker 1611, the wireless communication interface 1612, and the auxiliary controller 1619 to each other. The battery 1618 supplies power to each block of the smartphone 1600 shown in FIG. 43 via feeders which are partially shown by dashed lines in the figure. The auxiliary controller 1619 operates a minimum necessary function of the smartphone 1600, for example, in a sleep mode.

In the smartphone 1600 shown in FIG. 43, the transceiver in the device at the UE side may be implemented by the wireless communication interface 1612. At least a part of the functions of device at the UE side may also be implemented by the processor 1601 or the auxiliary controller 1619.

Second Application Example

Figure 44:
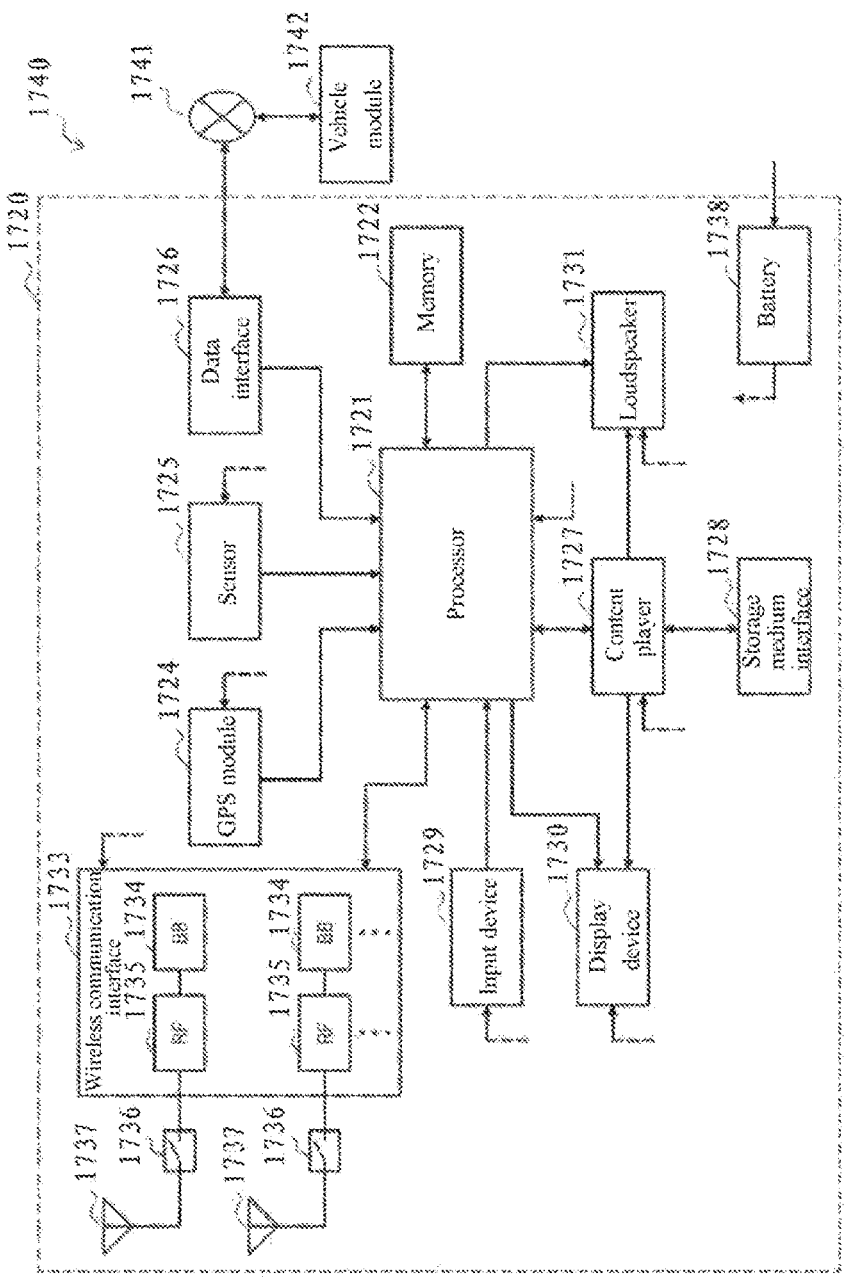
FIG. 44 is a block diagram of an example showing a schematic configuration of a vehicle navigation device to which the technology according to the present disclosure may be applied.

FIG. 44 is a block diagram showing an example of a schematic configuration of a car navigation device 1720 to which the technology according to the present disclosure may be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, a wireless communication interface 1733, one or more antenna switches 1736, one or more antennas 1737, and a battery 1738.

The processor 1721 may be for example the CPU or the SoC, and control the navigation function and other functions of the car navigation device 1720. The memory 1722 includes a RAM and a ROM, and stores a program that is executed by the processor 1721 and data.

The GPS module 1724 determines a position (such as latitude, longitude, and altitude) of the car navigation device 1420 by using GPS signals received from a GPS satellite. The sensor 1725 may include a group of sensors such as a gyroscope sensor, a geomagnetic sensor and an air pressure sensor. The data interface 1726 is connected to, for example, an in-vehicle network 1741 via a terminal that is not shown, and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or information inputted from a user. The display device 1730 includes a screen such as a LCD or an OLED display, and displays an image of the navigation function or content that is reproduced. The speaker 1731 outputs sounds of the navigation function or the content that is reproduced.

The wireless communication interface 1733 supports any cellular communication scheme (such as LTE and LTE-advanced) and performs wireless communication. The wireless communication interface 1733 may typically include, for example, a BB processor 1734 and an RF circuit 1735. The BB processor 1734 may perform encoding/decoding, modulating/demodulating and multiplexing/demultiplexing, for example, and perform various types of signal processing for wireless communication. The RF circuit 1735 may include a mixer, a filter and an amplifier, for example, and transmit and receive a radio signal via the antenna 1737. The wireless communication interface 1733 may also be one chip module that has the BB processor 1734 and the RF circuit 1735 integrated thereon. The wireless communication interface 1733 may include multiple BB processors 1734 and multiple RF circuits 1735, as shown in FIG. 44. Although FIG. 44 shows the example in which the wireless communication interface 1733 includes the multiple BB processors 1734 and the multiple RF circuits 1735, the wireless communication interface 1733 may also include a single BB processor 1734 or a single RF circuit 1735.

In addition to the cellular communication scheme, the wireless communication interface 1733 may also support a wireless communication scheme of another type, such as a short-distance wireless communication scheme, a near field communication scheme, and a wireless LAN scheme. In this case, the wireless communication interface 1733 may include a BB processor 1734 and a RF circuit 1735 for each wireless communication scheme.

Each of the antenna switches 1736 switches connection destinations of the antenna 1737 among multiple circuits (such as circuits for different wireless communication schemes) included in the wireless communication interface 1733.

Each of the antennas 1737 includes one or more antenna elements (such as multiple antenna elements included in the MIMO antenna), and is used for the wireless communication interface 1733 to transmit and receive a radio signal. The car navigation device 1720 may include multiple antennas 1737, as shown in FIG. 44. Although FIG. 44 illustrates the example in which the car navigation device 1720 includes the multiple antennas 1737, the car navigation device 1720 may also include a single antenna 1737.

Furthermore, the car navigation device 1720 may include the antenna 1737 for each wireless communication scheme. In that case, the antenna switches 1736 may be omitted from the configuration of the car navigation device 1720.

The battery 1738 supplies power to each block of the car navigation device 1720 shown in FIG. 44 via feeders which are partially shown by dashed lines in the figure. The battery 1738 accumulates power supplied form the vehicle.

In the car navigation device 1720 shown in FIG. 44, the communication unit in the device at the UE side may be implemented by the wireless communication interface 1733. At least a part of the functions of the device at the UE side may also be implemented by the processor 1721.

The technology of the present disclosure may also be implemented as an in-vehicle system (or a vehicle) 1740 including one or more of the blocks of the car navigation device 1720, an in-vehicle network 1741 and a vehicle module 1742. The vehicle module 1742 generates vehicle data such as vehicle speed, engine speed, and fault information, and outputs the generated data to the in-vehicle network 1741.

Preferred embodiments of the disclosure have been described above with reference to the drawings, but the disclosure is not limited to the above examples of course. Those skilled in the art may make various changes and modifications within the scope of the appended claims, and it is to be understood that such changes and modifications naturally fall within the technical scope of the present disclosure.

For example, multiple functions of one unit in the above embodiment may be realized by separate devices. Alternatively, multiple functions implemented by multiple units in the above embodiments may be respectively implemented by separate devices. Furthermore, one of the above functions may be implemented by multiple units. Needless to say, such configurations are included in the technical scope of the present disclosure.

In the specification, steps described in the flowchart include not only the processing performed chronologically, but also the processing performed in parallel or individually rather than chronologically. Further, even in the steps processed chronically, without saying, the order may be appropriately changed.

Although the present disclosure and its advantages have been described in detail, it is to be understood that various changes, substitutions and alterations may be made without departing from the spirit and scope of the disclosure as defined by the appended claims. Moreover, the term "include", "comprise" or any variant thereof in the embodiments of the present disclosure is intended to encompass nonexclusive inclusion, so that a process, a method, an article or a device including a series of elements includes not only those elements but also other elements that are not expressively listed or an element) inherent to the process, the method, the article or the device. The elements defined by the statement "comprising one . . . " do not exclude that there are other identical elements in the process, method, article, or device that includes the elements, if not specifically limited otherwise.

The invention claimed is:

1. A device in a wireless communication system, the device comprising processing circuitry configured to:
   decode a group common physical downlink control channel for a group of user equipment comprising target user equipment to obtain control information related to Multi-User Multiple Input Multiple Output (MU-MIMO) transmission of control channel, the group common physical downlink control channel being generated at a base station by respectively scrambling the control information related to MU-MIMO transmission of control channel of each user equipment in the control information using a group common identifier and a specific identifier of each user equipment, the group common identifier and the specific identifier of the target user equipment being transmitted from the base station; and
   decode, based on the control information, user equipment specific physical downlink control channel (UE-specific PDCCH) of the target user equipment to obtain specific transmission control information for the target user equipment,
   wherein the UE-specific PDCCH of the target user equipment and UE-specific PDCCH of other user equipment in the group of user equipment are superposed on same transmission resource to be transmitted,
   wherein the processing circuitry is configured to decode the group common physical downlink control channel using one of the group common identifier and the specific identifier of the target user equipment to obtain a first content, the first content regarding the target user equipment being generated at the base station by scrambling the control information related to MU-MIMO transmission of control channel of the target user equipment; and
   wherein the processing circuitry is configured to decode the first content using another one of the group common identifier and the specific identifier of the target user equipment to obtain the control information.

2. The device according to claim 1, wherein the processing circuitry is further configured to:
   decode the group common physical downlink control channel using the group common identifier to obtain control information related to MU-MIMO transmission of control channel of all user equipment in the group of user equipment as the control information; and
   decode the UE-specific PDCCH of the target user equipment based on the control information and the specific identifier of the target user equipment to obtain the specific transmission control information for the target user equipment.

3. The device according to claim 2, wherein the processing circuitry is further configured to:
   blind decode, based on the obtained control information, the UE-specific PDCCH of the target user equipment by processing the UE-specific PDCCH of the other user equipment as interference; and
   verify decoded information using the specific identifier of the target user equipment and obtain the decoded information for which the verification is successful as the specific transmission control information for the target user equipment.

4. The device according to claim 1, wherein the processing circuitry is further configured to:
   decode the group common physical downlink control channel using the group common identifier and the specific identifier of the target user equipment to obtain control information related to MU-MIMO transmission of control channel of the target user equipment as the control information; and
   decode the UE-specific PDCCH of the target user equipment based on the obtained control information to obtain the specific transmission control information for the target user equipment.

5. The device according to claim 1, wherein the processing circuitry is further configured to:
   obtain indication information of a control resource set to which the transmission resource belongs by decoding the group common physical downlink control channel; and
   perform detection on the control resource set according to the indication information to receive the UE-specific PDCCH of the target user equipment.

6. The device according to claim 5, wherein the indication information comprises indication related to OFDM symbols occupied by the control resource set.

7. The device according to claim 2, wherein the group common identifier is a group common radio network temporary identifier, and the specific identifier is a cell-radio network temporary identifier (C-RNTI).

8. The device according to claim 1,
wherein the control information comprises information related to demodulation reference signal (DMRS) configuration;
wherein the control information comprises a total layer number of the MU-MIMO transmission of control channel of the group of user equipment; or
wherein the device operates as the target user equipment and further comprises a memory and a transceiver.

9. The device according to claim 8, wherein the total layer number of the MU-MIMO transmission of control channel of the group of user equipment comprises 2 and 4.

10. A device in a wireless communication system, the device comprising processing circuitry configured to:
generate a group common physical downlink control channel for a group of user equipment and user equipment specific physical downlink control channel (UE-specific PDCCH) of each of the group of user equipment, the group common physical downlink control channel comprising control information related to Multi-User Multiple Input Multiple Output (MU-MIMO) transmission of control channel of all user equipment in the group of user equipment, and the group common physical downlink control channel being generated by respectively scrambling the control information related to MU-MIMO transmission of control channel of each user equipment in the control information using a group common identifier and a specific identifier of each user equipment;
control a base station to transmit the group common physical downlink control channel to the group of user equipment;
control, based on the control information, the base station to transmit the UE-specific PDCCH of each of the group of user equipment on same transmission resource; and
control, for each user equipment, the base station to transmit to respective user equipment the group common identifier and the specific identifier of the respective user equipment, for the respective user equipment to obtain control information related to MU-MIMO transmission of control channel of the respective user equipment included in the control information by decoding the group common physical downlink control channel,
wherein the processing circuitry is configured to generate, for each user equipment, a first content regarding the respective user equipment by scrambling the control information related to MU-MIMO transmission of control channel of the respective user equipment in the control information using one of the group common identifier and the specific identifier of this user equipment, and
wherein the processing circuitry is configured to generate the group common physical downlink control channel by scrambling, for each user equipment, the first content of the respective equipment using another one of the group common identifier and the specific identifier of the respective user equipment.

11. The device according to claim 10, wherein the processing circuitry is further configured to:
generate the group common physical downlink control channel by scrambling the control information using the group common identifier; and
control the base station to transmit the group common identifier to the group of user equipment, for each of the group of user equipment to obtain the control information by decoding the group common physical downlink control channel.

12. The device according to claim 10, wherein the processing circuitry is further configured to: comprise in the group common physical downlink control channel, information indicating a control resource set to which transmission resource for transmitting the UE-specific PDCCH of each user equipment belongs, for each user equipment to perform reception detection on its UE-specific PDCCH by decoding the group common physical downlink control channel.

13. The device according to claim 12, wherein the information indicating the control resource set comprises indication related to OFDM symbols occupied by the control resource set.

14. The device according to claim 11, wherein the group common identifier is a group common radio network temporary identifier, and the specific identifier is a cell-radio network temporary identifier (C-RNTI).

15. The device according to claim 10,
wherein the control information comprises information related to demodulation reference signal (DMRS) configuration;
wherein the control information comprises a total layer number of the MU-MIMO transmission of control channel of the group of user equipment; or
wherein the device operates as the base station and further comprises a memory and a transceiver.

16. A method in a wireless communication system, the method comprising:
decoding a group common physical downlink control channel for a group of user equipment comprising target user equipment to obtain control information related to Multi-User Multiple Input Multiple Output (MU-MIMO) transmission of control channel, the group common physical downlink control channel being generated at a base station by respectively scrambling the control information related to MU-MIMO transmission of control channel of each user equipment in the control information using a group common identifier and a specific identifier of each user equipment, the group common identifier and the specific identifier of the target user equipment being transmitted from the base station; and
decoding, based on the control information, user equipment specific physical downlink control channel (UE-specific PDCCH) of the target user equipment to obtain specific transmission control information for the target user equipment,
wherein the UE-specific PDCCH of the target user equipment and UE-specific PDCCH of other user equipment in the group of user equipment are superposed on same transmission resource to be transmitted,
wherein, decoding the group common physical downlink control channel using one of the group common identifier and the specific identifier of the target user equipment to obtain a first content, the first content regarding the target user equipment being generated at the base station by scrambling the control information related to MU-MIMO transmission of control channel of the target user equipment, and
wherein, decoding the first content using another one of the group common identifier and the specific identifier of the target user equipment to obtain the control information.

* * * * *